United States Patent
Lee

(10) Patent No.: US 12,461,333 B2
(45) Date of Patent: Nov. 4, 2025

(54) LENS DRIVING UNIT, AND CAMERA MODULE AND OPTICAL DEVICE COMPRISING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 21 days.

(21) Appl. No.: 18/085,209

(22) Filed: Dec. 20, 2022

(65) Prior Publication Data

US 2023/0122356 A1      Apr. 20, 2023

Related U.S. Application Data

(63) Continuation of application No. 16/635,977, filed as application No. PCT/KR2018/008417 on Jul. 25, 2018, now Pat. No. 11,561,363.

(30) Foreign Application Priority Data

Aug. 1, 2017 (KR) .................. 10-2017-0097725
Aug. 1, 2017 (KR) .................. 10-2017-0097728
(Continued)

(51) Int. Cl.
*G02B 7/09*   (2021.01)
*G03B 13/36*   (2021.01)
*H02K 41/035*   (2006.01)

(52) U.S. Cl.
CPC ............. *G02B 7/09* (2013.01); *G03B 13/36* (2013.01); *H02K 41/0356* (2013.01)

(58) Field of Classification Search
CPC . G02B 7/09; G02B 7/005; G02B 7/04; G02B 7/10; G02B 27/64; G02B 27/646;
(Continued)

(56) References Cited

U.S. PATENT DOCUMENTS 7,262,927 B1 *   8/2007   Shyu ................. G02B 7/08
                                               369/44.14
8,611,734 B2   12/2013   Lim et al.
(Continued)

FOREIGN PATENT DOCUMENTS

CN       201107448 Y       8/2008
CN       101563836 A      10/2009
(Continued)

OTHER PUBLICATIONS

English language machine translation of Choi et al. "Yoke-Free Automatic Focus Control Device for a Camera", KR 101072404 B1 (Year: 2011).*

*Primary Examiner* — Marin Pichler
(74) *Attorney, Agent, or Firm* — Birch, Stewart, Kolasch & Birch, LLP

(57) ABSTRACT

A lens moving apparatus including a base comprising a first post, a second post, a third post and a fourth post; a bobbin disposed inside the first to fourth posts; a coil disposed on the bobbin; a magnet comprising a first magnet unit disposed between the first post and the second post and a second magnet unit disposed between the third post and the fourth post; and a lower elastic member coupled to a lower portion of the bobbin and to the base, wherein the lower elastic member comprises a first portion coupled to a first region of the base positioned between the first post and the fourth post, and wherein the first portion of the lower elastic member does not overlap the magnet in a direction parallel to an optical axis.

19 Claims, 38 Drawing Sheets

(30) Foreign Application Priority Data

Aug. 1, 2017 (KR) .................. 10-2017-0097731
Aug. 30, 2017 (KR) .................. 10-2017-0109960

(58) Field of Classification Search
CPC ........ G02B 13/001; G02B 7/023; G02B 7/08;
G03B 5/00; G03B 13/34; G03B 13/36;
G03B 13/32; G03B 2205/0069; G03B
2205/0015; G03B 2205/0007; G03B
2205/0046; G03B 19/22; G03B 3/10;
G03B 17/02; H04N 5/2328; H04N
5/2253; H04N 5/2254; H05K 1/18; H02K
41/0354; H02K 41/0356
USPC ........... 359/822, 823, 824, 694, 813; 396/89
See application file for complete search history.

(56) References Cited

U.S. PATENT DOCUMENTS

| | | | |
|---|---|---|---|
| 2009/0237815 A1 | 9/2009 | Kim | |
| 2012/0025633 A1 | 2/2012 | Lee et al. | |
| 2015/0155768 A1* | 6/2015 | Hsu | G01J 1/0403 |
| | | | 250/234 |
| 2015/0323758 A1 | 11/2015 | Lee et al. | |
| 2016/0048033 A1* | 2/2016 | Kim | H04N 23/67 |
| | | | 348/357 |
| 2016/0139425 A1 | 5/2016 | Park et al. | |
| 2016/0154249 A1 | 6/2016 | Yeo | |
| 2016/0178924 A1 | 6/2016 | Lim et al. | |
| 2017/0038600 A1 | 2/2017 | Hee et al. | |
| 2017/0115463 A1 | 4/2017 | Osaka et al. | |
| 2018/0017842 A1* | 1/2018 | Hsu | G03B 17/12 |
| 2019/0101722 A1* | 4/2019 | Aranai | G03B 15/00 |

FOREIGN PATENT DOCUMENTS

| | | |
|---|---|---|
| CN | 101578755 A | 11/2009 |
| CN | 102347679 A | 2/2012 |
| CN | 104902149 A | 9/2015 |
| CN | 105093475 A | 11/2015 |
| CN | 105324711 A | 2/2016 |
| CN | 105607213 A | 5/2016 |
| CN | 105988177 A | 10/2016 |
| CN | 105988262 A | 10/2016 |
| EP | 3086154 A1 | 10/2016 |
| JP | 2007-121695 A | 5/2007 |
| JP | 2015-129960 A | 7/2015 |
| JP | 2016-17977 A | 2/2016 |
| KR | 10-2008-0010861 A | 1/2008 |
| KR | 10-1068124 B1 | 9/2011 |
| KR | 10-1072404 B1 | 10/2011 |
| KR | 10-2012-0051492 A | 5/2012 |
| KR | 10-2012-0065492 A | 6/2012 |
| KR | 10-2012-0090382 A | 8/2012 |
| KR | 10-2012-0117236 A | 10/2012 |
| KR | 10-1220713 B1 | 1/2013 |
| KR | 10-2015-0128265 A | 11/2015 |
| KR | 10-2016-0000773 A | 1/2016 |
| KR | 10-2016-0073843 A | 6/2016 |
| KR | 10-2016-0075154 A | 6/2016 |
| KR | 10-2017-0018136 A | 2/2017 |
| KR | 10-2017-0029984 A | 3/2017 |
| KR | 10-2017-0062437 A | 6/2017 |
| WO | WO 2008/072892 A1 | 6/2008 |
| WO | WO2016/126061 A1 | 8/2016 |
| WO | WO 2017/022995 A1 | 2/2017 |

\* cited by examiner

LENS DRIVING UNIT, AND CAMERA MODULE AND OPTICAL DEVICE COMPRISING SAME

CROSS REFERENCE TO RELATED APPLICATIONS

This application is a Continuation of U.S. application Ser. No. 16/635,977 filed on Jan. 31, 2020, which is the National Phase of PCT International Application No. PCT/KR2018/008417, filed on Jul. 25, 2018, which claims priority under 35 U.S.C. 119(a) to Patent Application Nos. 10-2017-0097725, 10-2017-0097728, 10-2017-0097731 filed in the Republic of Korea on Aug. 1, 2017 and 10-2017-0109960 filed in the Republic of Korea on Aug. 30, 2017, all of which are hereby expressly incorporated by reference into the present application.

TECHNICAL FIELD

Embodiments relate to a lens moving apparatus and to a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. A camera for mobile phones is on a trend of increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocus, handshake correction, and zooming, are required.

DISCLOSURE

Technical Problem

Embodiments provide a lens moving apparatus capable of simplifying the structure thereof and reducing manufacturing costs, and a camera module and an optical device each including the same. Furthermore, embodiments provide a lens moving apparatus capable of stably securing a magnet and reducing the number of components, and a camera module and an optical device each including the same.

Technical Solution

A lens moving apparatus according to an embodiment includes a base including a body having an opening, and a first post, a second post, a third post and a fourth post, which project from the body; a bobbin disposed on the body; a coil disposed at the bobbin; a first magnet disposed between the first post and the second post; a second magnet disposed between the third post and the fourth post; a lower elastic member coupled both to a lower portion of the bobbin and to the base; and an upper elastic member coupled both to an upper portion of the bobbin and to the first to fourth posts, wherein the lower elastic member is positioned inside the first to fourth posts of the base, and wherein the lower elastic member is coupled to the base between the first post and the fourth post, which is adjacent to the first post.

The base may include a first stepped portion, which has a depth from an outer surface of the body and which is positioned between the first post and the second post, and wherein the first magnet may be disposed at the first stepped portion.

Each of the first post and the second post may further include a second stepped portion having a depth from each of outer surfaces of the first and second posts, the first magnet being disposed at the second stepped portion.

A surface of the first magnet may abut both the first stepped portion and the second stepped portion, the first stepped portion abutting the second stepped portion.

The lower elastic member may be coupled to the base between the second post and the third post adjacent to the second post, and the lower elastic member may not be coupled to the base between the first post and the second post and between the third post and the fourth post.

The base may include first protrusion projecting from upper surfaces of the first to fourth posts, the upper elastic member being coupled to the first protrusion, and the base may include projections, which are positioned between the first and fourth posts and between the second and third posts and which project from the body, and second protrusion disposed on upper surfaces of the projections, the lower elastic member being coupled to the second protrusion.

The body of the base may include a first corner section, at which the first post is disposed, a second corner section, at which the second post is dispose, a third corner section, at which the third post is disposed, and a fourth corner section, at which the fourth post is disposed, and the base may further include a first stepped portion, which is positioned between the first corner portion and the second corner portion with a depth from an outer surface of the body and at which the first magnet is disposed; a first groove formed in an upper surface of the first stepped portion of the body between the first and second corner portions so as to face the first magnet; and a first adhesive injection recess formed in the outer surface of the body so as to be connected to the first stepped portion.

The base may further include second stepped portions, each of which has a depth from an outer surface of a corresponding one of the first and second posts; second grooves, each of which is disposed in the second stepped portion of a corresponding one of the first and second posts so as to face the first magnet; and second adhesive injection recesses, each of which is formed in the outer surface of a corresponding one of the first and second posts so as to be connected to the second stepped portion.

The body of the base may include a first corner section, at which the first post is disposed, a second corner section, at which the second post is disposed, a third corner section, at which the third post is disposed, and a fourth corner section, at which the fourth post is disposed, wherein the base includes a first projection projecting from a first side surface of at least one of the first to fourth posts, and wherein a minimum distance between a first outer surface of the bobbin and the first projection is smaller than a minimum distance between the first outer surface of the bobbin and the first side surface of the at least one post, the first outer surface of the bobbin being an outer surface that faces the at least one post, and the first side surface of the at least one post being an inner surface that faces the first outer surface of the bobbin.

The base may include second projections, which are respectively positioned between the second and third posts and between the first and fourth posts and which project from an upper surface of the body, the lower elastic member being coupled to the second projections, and, based on the upper surface of the body, a height of the first projection may be larger than a height of the second projections and is smaller than a height of each of the first to fourth posts.

Advantageous Effects

Embodiments are able to simplify a structure and reduce manufacturing costs.

Furthermore, embodiments are able to reduce the number of components by virtue of omission of a housing and stably secure a magnet by means of projections of a base, thereby making the structure compact and stably securing the magnet.

BEST MODEL

Figure 1:
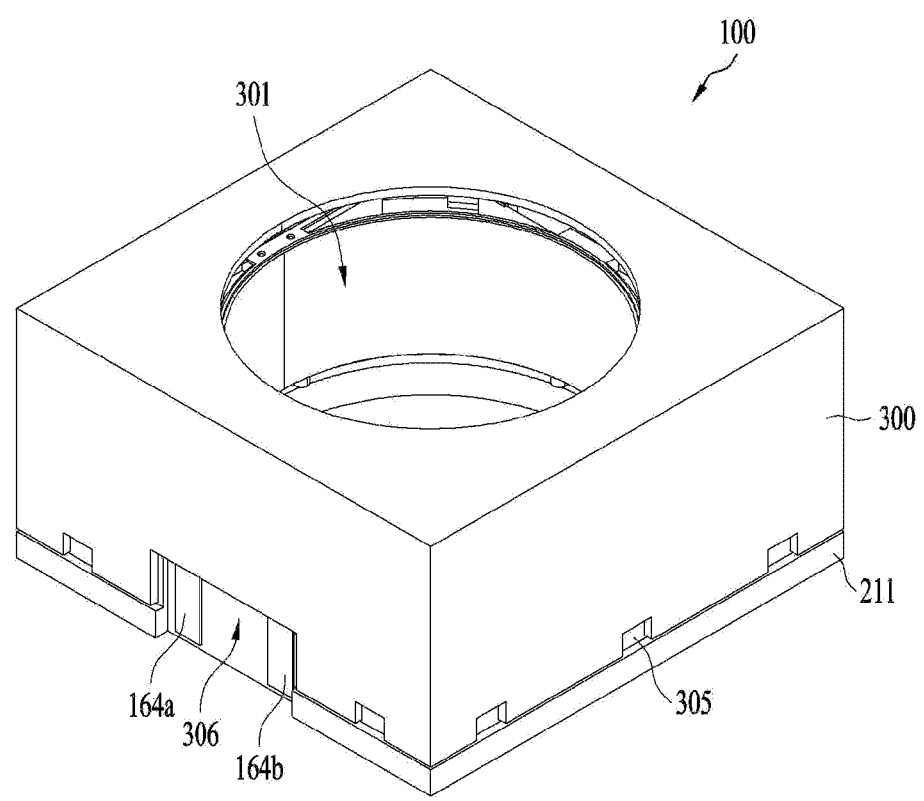
FIG. 1 is a perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element from another substance or element without requiring or implying any physical or logical relationship or sequence between these substances or elements. The same reference numeral designates the same element throughout all of the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof.

Further, when describing the components of the present disclosure, terms such as "first", "second", "A", "B", "(a)" or "(b)" may be used. Since these terms are provided merely for the purpose of distinguishing components from other components, they do not limit the nature, sequence or order of the components. If it is described that a component is "linked", "coupled" or "connected" to another component, it should be understood that, although the component may be directly linked, coupled or connected to the another component, the component and the another component may also be "linked", "coupled" or "connected" indirectly via a further component.

Hereinafter, lens moving apparatuses according to embodiments of the present disclosure will be described with reference to the accompanying drawings. For the convenience of description, although the lens moving apparatus is described using a rectangular coordinate system (x, y, z), the lens moving apparatus may be described using some other coordinate systems, and the embodiments are not limited with regard thereto. In the respective drawings, the X-axis and the Y-axis mean directions perpendicular to an optical axis, i.e. the Z-axis, and the optical-axis OA direction or a direction parallel to the optical axis OA may be referred to as a "first direction", the X-axis direction may be referred to as a "second direction", and the Y-axis direction may be referred to as a "third direction".

The term "optical-axis direction" is defined as the optical-axis direction of a lens or a lens module, which is in the state in which it is coupled to the lens moving apparatus. Here, the term "optical-axis direction" may also be used to indicate the up-and-down direction or the vertical direction.

An "auto-focusing device", which is applied to a subminiature camera module of a mobile device such as, for example, a smart phone or a tablet PC, is a device that automatically focuses an image of a subject on an image sensor surface. The auto-focusing device may be configured in various ways, and the lens moving apparatus according to an embodiment may move an optical module, which is constituted of at least one lens, in the first direction, so as to perform auto-focusing.

Figure 2:
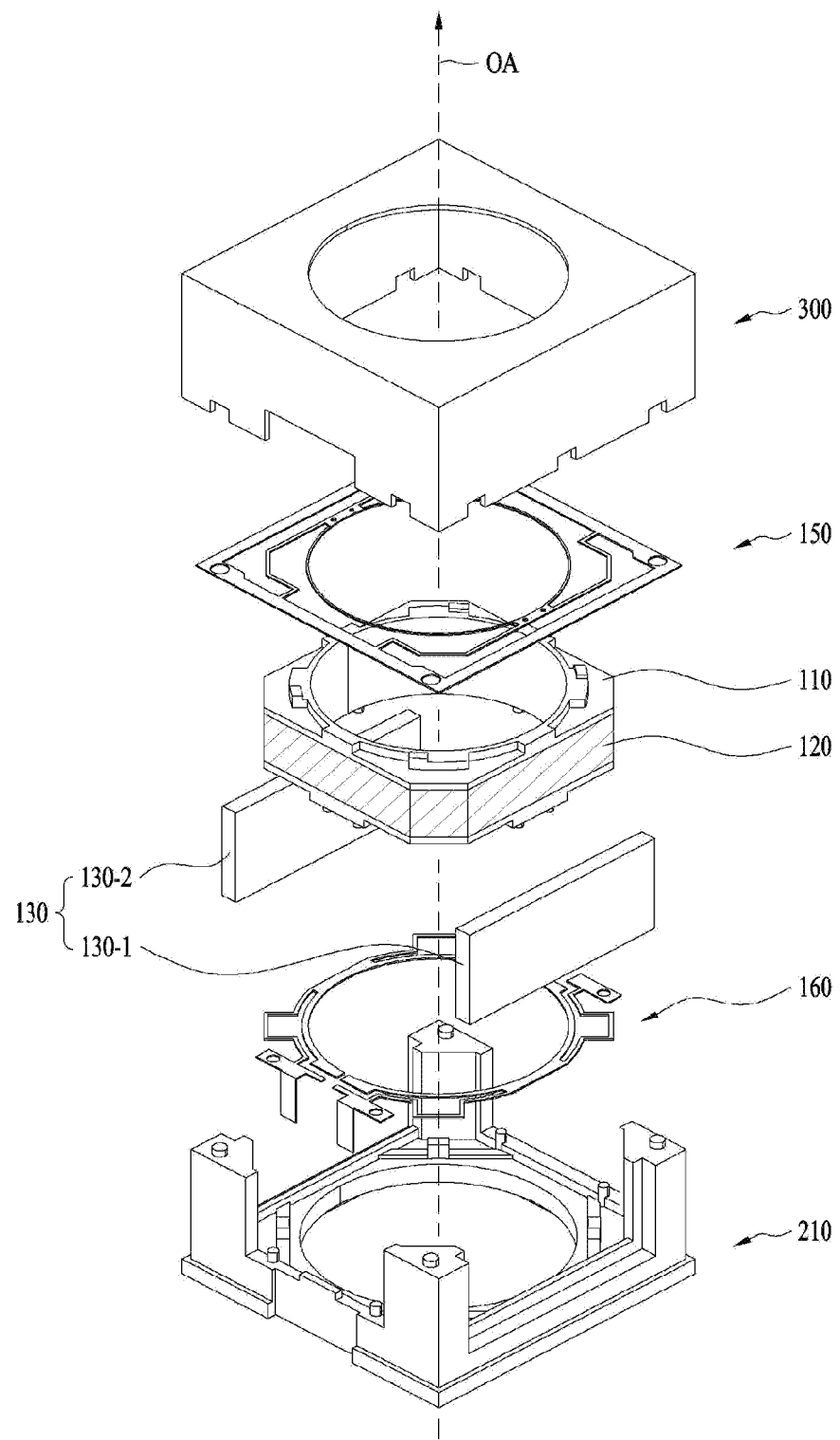
FIG. 2 is an exploded view of the lens moving apparatus shown in FIG. 1.
Figure 3:
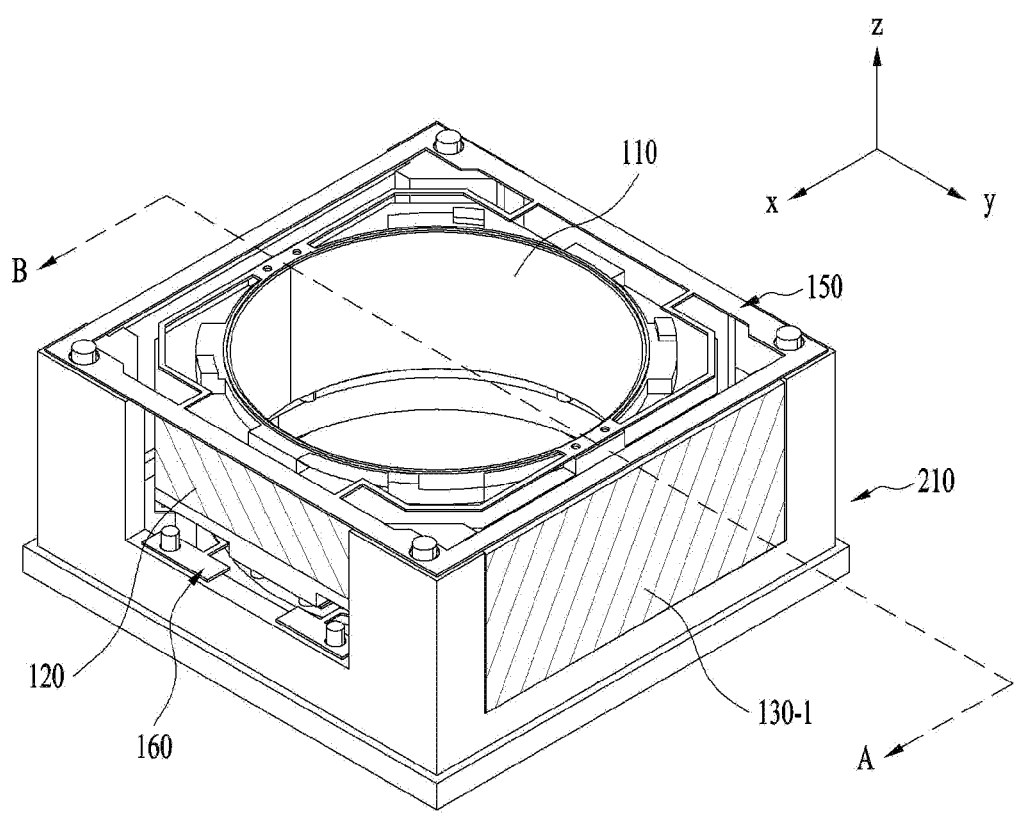
FIG. 3 illustrates the lens moving apparatus shown in FIG. 1, from which a cover member is removed.

FIG. 1 is a perspective view of a lens moving apparatus 100 according to an embodiment. FIG. 2 is an exploded view of the lens moving apparatus 100 shown in FIG. 1. FIG. 3 illustrates the lens moving apparatus 100 shown in FIG. 1, from which a cover member 300 is removed.

Referring to FIGS. 1 to 3, the lens moving apparatus 100 may include a cover member 300, a bobbin 110, a coil 120, magnets 130, an upper elastic member 150, a lower elastic member 160, and a base 210.

The cover member 300 will first be described.

The cover member 300 accommodates the components 110, 120, 130, 140, 150, 160, and 400, in the space defined between the cover member 300 and the base 210.

The cover member 300 may take the form of a box that has an open bottom and includes a top plate and side plates. The lower ends of the side plates of the cover member 300 may be coupled to the top of the base 210. The top plate of the cover member 300 may have a polygonal shape, for example, a square or octagonal shape.

The cover member 1300 may be provided in the upper plate thereof with an opening, through which the lens unit 400 coupled to the bobbin 110 is exposed to external light.

For example, the cover member 300 may be made of a nonmagnetic material, such as SUS, aluminum (Al), copper (Cu), tin (Sn), or platinum. Because a cover member 300 made of the nonmagnetic material is used, the embodiment is capable of preventing a phenomenon in which the magnets 130 attract the cover member 300. In another embodiment, the cover member 300 may be made of a magnetic material or a plastic material.

Adhesive injection recesses 305 may be provide in the lower end of at least one of the side plates of the cover member 300.

The lower end of one of the side plates of the cover member 300 may have formed therein a groove 205, through which first and second connection terminals 164a and 164b of lower springs 160a and 160b are exposed.

Next, the bobbin 110 will be described.

Figure 4A:
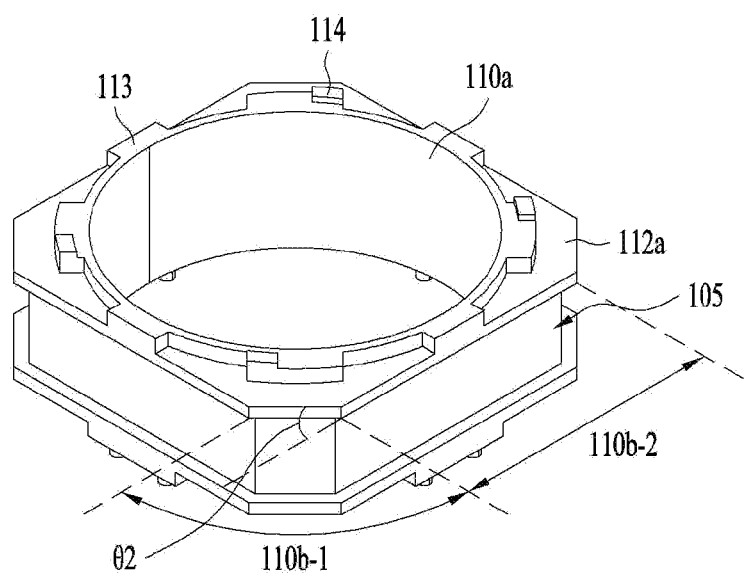
FIG. 4A is a perspective view of the bobbin shown in FIG. 2.
Figure 4B:
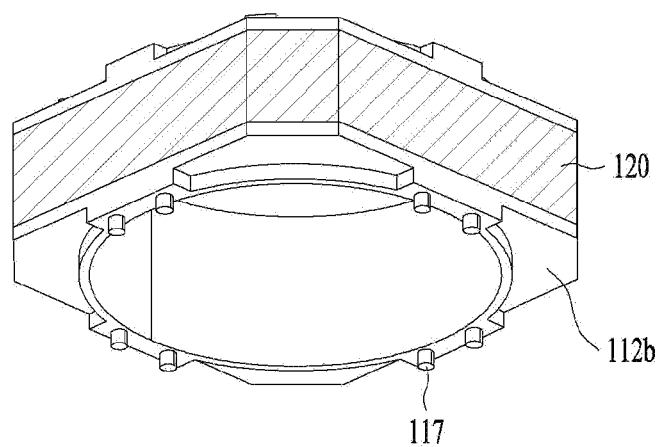
FIG. 4B is a perspective view of the bobbin and the coil shown FIG. 4A.

FIG. 4A is a perspective view of the bobbin 110 shown in FIG. 2. FIG. 4B is a perspective view of the bobbin 110 and the coil shown FIG. 4A.

Referring to FIGS. 4A and 4B, the bobbin 110 may be positioned inside posts 216a to 216d of the base 210, and may be moved in the first direction (for example, in the Z-axis direction) by the electromagnetic interaction between the coil 120 and the magnets 130.

For example, the bobbin 110 may be moved in two directions, for example, in the upward direction (in the +Z-axis direction) or in the downward direction (in the −Z-axis direction) from the initial position thereof. In another embodiment, the bobbin 110 may be moved in one direction, for example, in the upward direction from the initial position thereof.

The bobbin 110 may have an opening in which the lens or the lens barrel is mounted.

The shape of the opening in the bobbin 110 may correspond to the shape of the lens and the lens barrel mounted in the bobbin. For example, the shape of the opening may be circular, oval, or polygonal. However, the disclosure is not limited thereto.

The bobbin 110 may include at least one first coupling portion 113, placed at the upper surface thereof and coupled and fixed to an inner frame 151 of the upper elastic member 150, and at least one second coupling portion 117, placed at the lower surface thereof and coupled and fixed to an inner frame 161 of the lower elastic member 160.

Although the first coupling portion 113 of the bobbin 110 may have, for example, a flat surface, the disclosure is not limited thereto. In another embodiment, the first coupling portion 113 may have the form of a protrusion or a groove. Although the second coupling portion 117 of the bobbin 110 may have the form of a protrusion, the disclosure is not limited thereto. In another embodiment, the second coupling portion may have the form of a groove or a flat surface.

The bobbin 110 may have an upper escape recess 112a, which is provided in a region of the upper surface thereof that corresponds to or is aligned with a first frame connection portion 153 of the upper elastic member 150.

In addition, the bobbin 110 may have a lower escape recess 112b, which is provided in a region of the lower surface thereof that corresponds to or is aligned with a second frame connection portions 163-1 and 163-2 of the lower elastic member 160.

When the bobbin 110 is moved in the first direction, spatial interference between the first frame connection portion 153 and the bobbin 110 and between the second frame connection portions 163-1 and 163-2 and the bobbin 110 may be avoided by the upper escape recess 112a and the lower escape recess 112b of the bobbin 110, whereby the first frame connection portion 153 of the upper elastic member 150 and the second frame connection portions 163-1 and 163-2 of the lower elastic member 160 may be easily elastically deformed.

The bobbin 110 may be provided in the outer surface 110b thereof with at least one mount recess 105, and the coil 120 may be placed or mounted in the mount recess 105 in the bobbin 110. For example, as shown in FIG. 4A, the mount recess 105 may have the shape of a ring disposed about the optical axis OA; however, the disclosure is not limited thereto.

The shape and number of mount recesses 105 may correspond to the shape and number of coils disposed around the outer surface 110b of the bobbin 110. In another embodiment, the bobbin 110 may have no recess for mounting the coil.

The bobbin 110 may include first outer sections 110b-1 that correspond to the posts 216a to 216d of the base 210, and second outer sections 110b-2 that correspond to the regions between the posts 216a to 216d.

Next, the coil 120 will be described.

The coil 120 is disposed around the outer portion and the outer surface of the bobbin 1110, and electromagnetically interacts with the magnet 130, which is disposed at the base 210.

In order to generate electromagnetic force due to electromagnetic interaction with the magnet 130, a driving signal may be applied to the coil 120. At this time, the driving signal may be a direct-current signal, or may have a voltage or current form.

An AF operation unit, which is elastically supported by the upper elastic member 150 and the lower elastic member 160 by virtue of electromagnetic force resulting from the electromagnetic interaction between the coil 120 and the magnets 130, may be moved in the first direction. By controlling the electromagnetic force, it is possible to control the movement of the bobbin 110 in the first direction, thereby performing an autofocus function.

The AF operation unit may include the bobbin 110, which is elastically supported by the upper and lower elastic members 150 and 160, and components that are mounted on the bobbin 110 and are moved therewith. For example, the AF operation unit may include the bobbin 110 and the coil 120.

Referring to FIG. 4B, the coil 120 may be wound or disposed around the outer peripheral surface of the bobbin 110 in a clockwise or counterclockwise direction about the optical axis OA.

For example, the coil 120 may be disposed or wound in the mount recess 105 provided in the outer surface of the bobbin 110.

For example, the coil 120 may have the shape of a ring that surrounds the outer surface of the bobbin 110 about the optical axis OA in the clockwise direction or in the counterclockwise direction. In FIG. 4B, the coil 120 may have the shape of a single ring; however, the disclosure is not limited thereto.

In another embodiment, the coil 120 may be embodied as a coil ring, which is wound in a clockwise or counterclockwise direction about an axis perpendicular to the optical axis OA. Although the number of coil rings may be equal to the number of magnets 130, the disclosure is not limited thereto.

The coil 120 may be conductively connected to at least one of the upper elastic member 150 or the lower elastic member 160. For example, the coil 120 may be conductively connected to lower springs 160a and 160b, and a driving signal may be applied to the coil 120 through the lower springs 160a and 160b.

Next, the base 210 will be described.

Figure 5A:
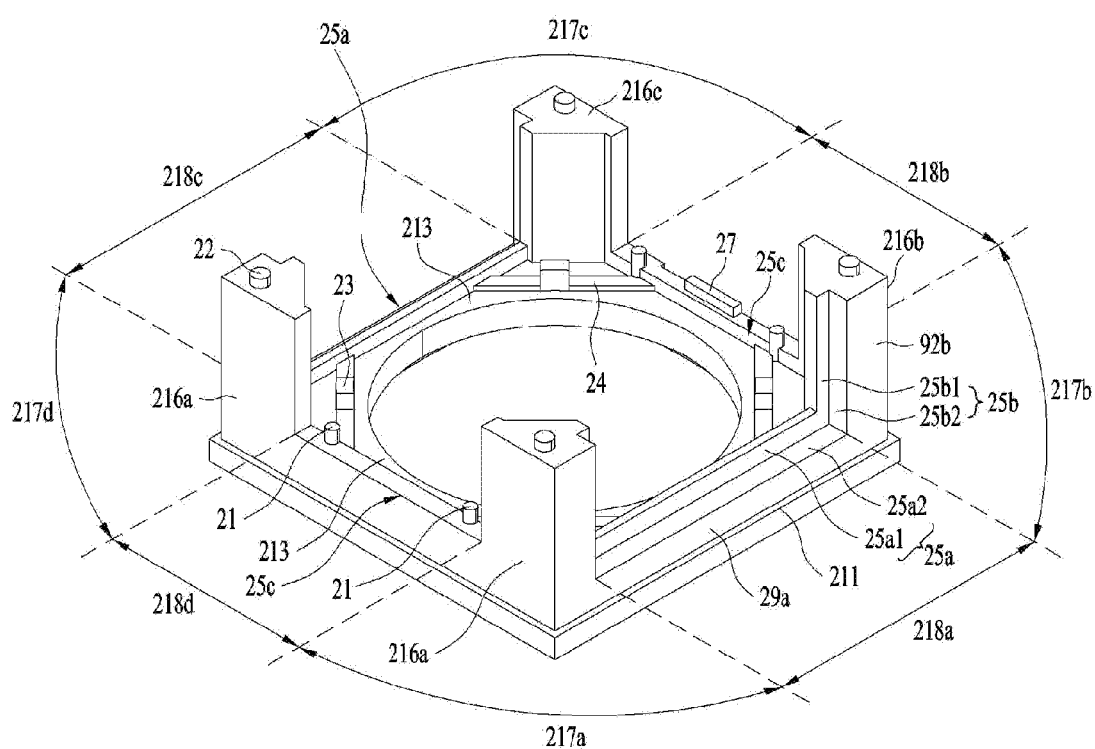
FIG. 5A is a first perspective view of the base shown in FIG. 2.
Figure 5B:
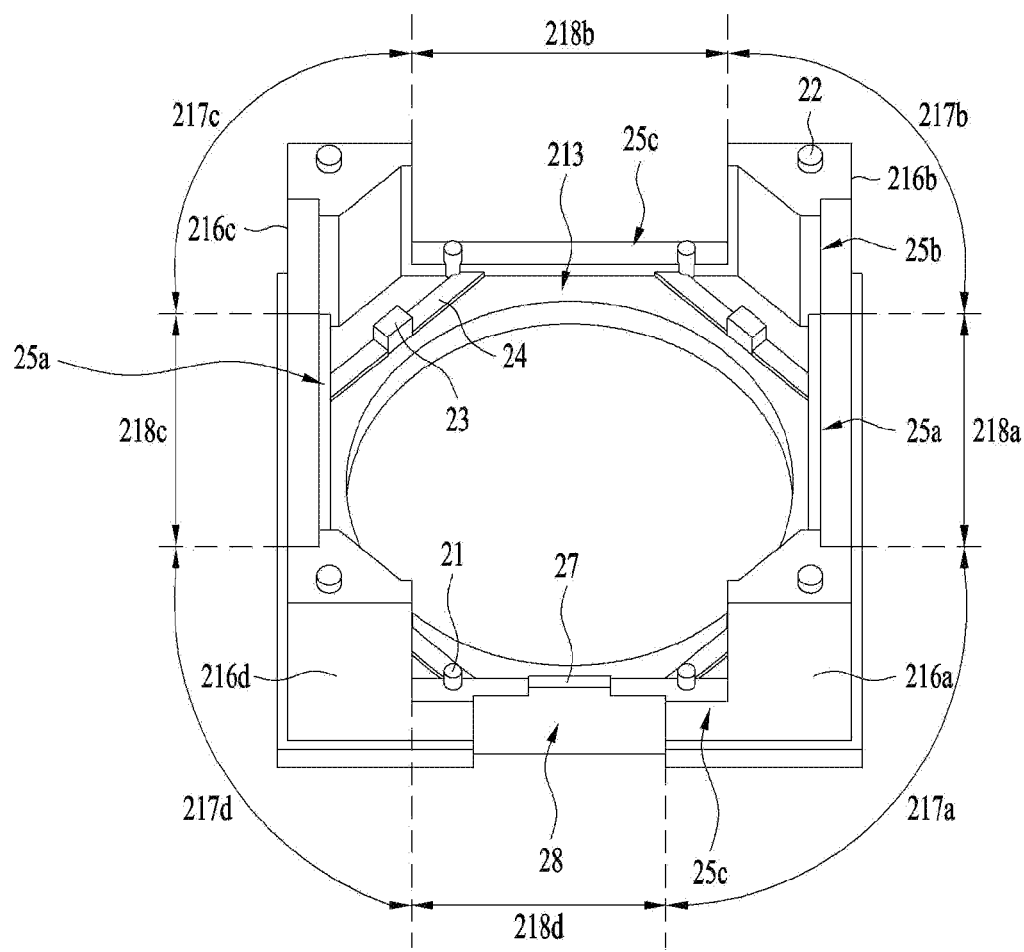
FIG. 5B is a second perspective view of the base shown in FIG. 2.
Figure 5C:
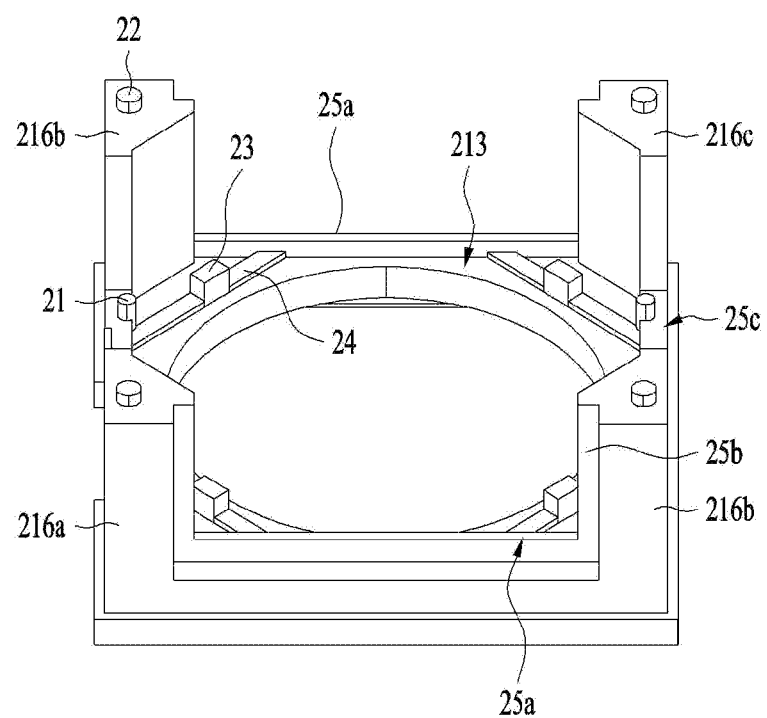
FIG. 5C is a third perspective view of the base shown in FIG. 2.
Figure 6:
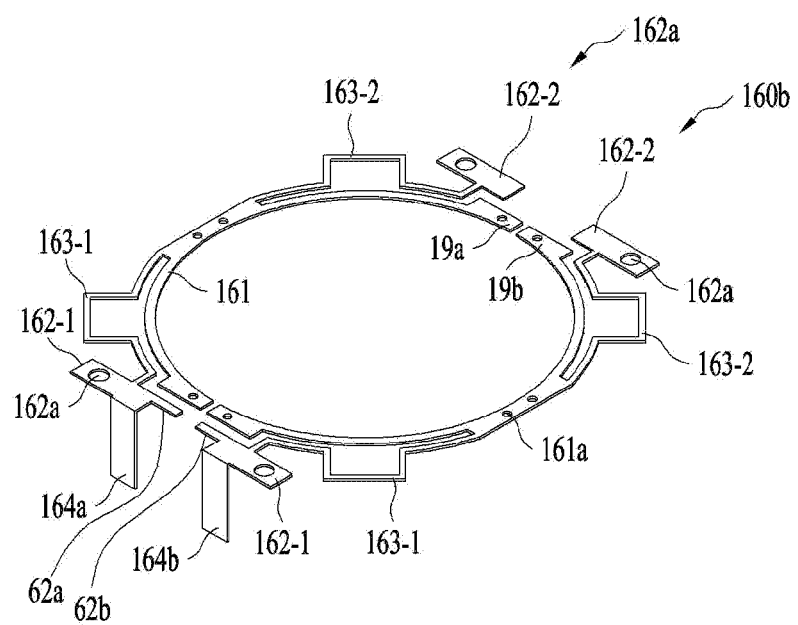
FIG. 6 is a perspective view of the lower elastic member shown in FIG. 2.
Figure 7:
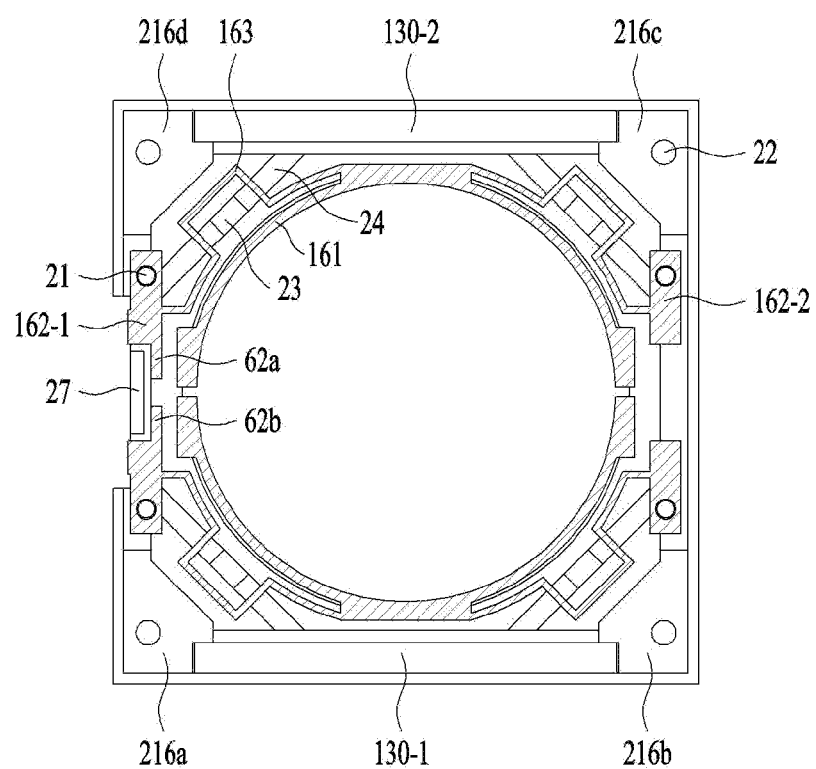
FIG. 7 illustrates the magnets coupled to the base and the lower elastic member.
Figure 8:
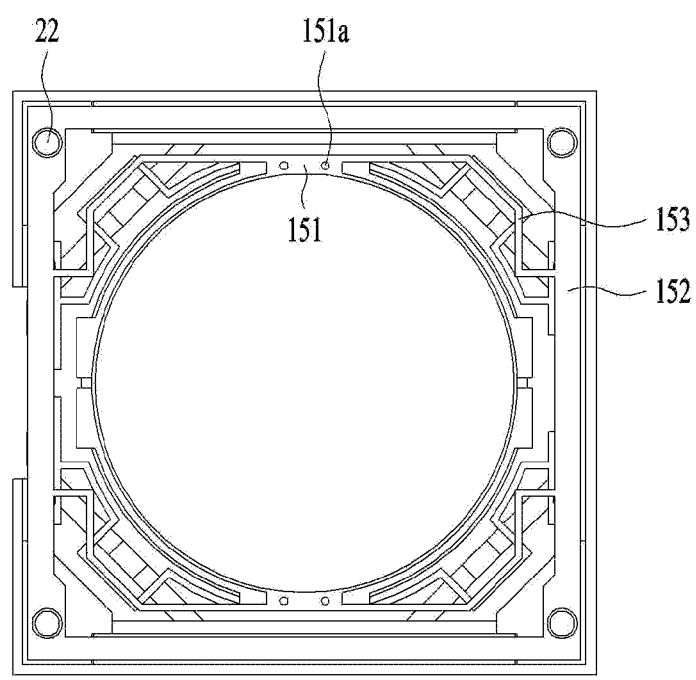
FIG. 8 illustrates the upper elastic member coupled to the base.
Figure 9:
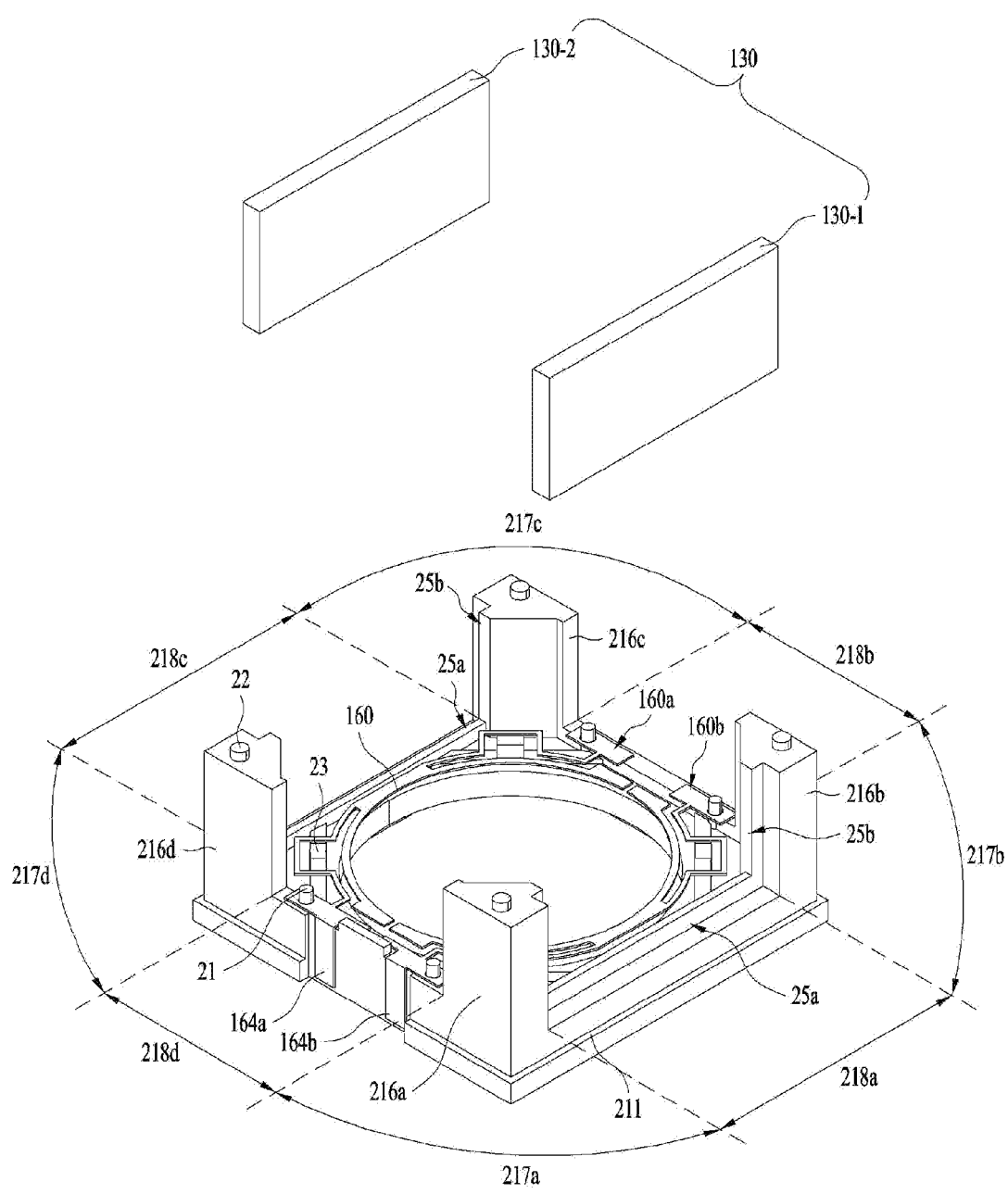
FIG. 9 is an exploded perspective view of the base and the magnet.
Figure 10:
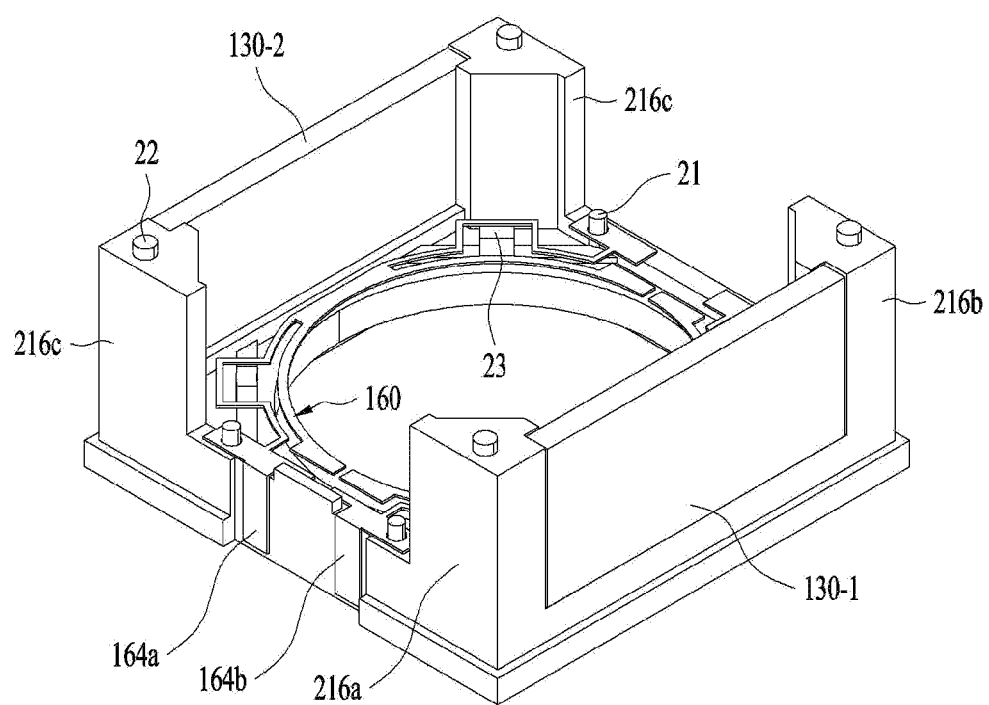
FIG. 10 is an assembled perspective view of the base and the magnet.
Figure 11:
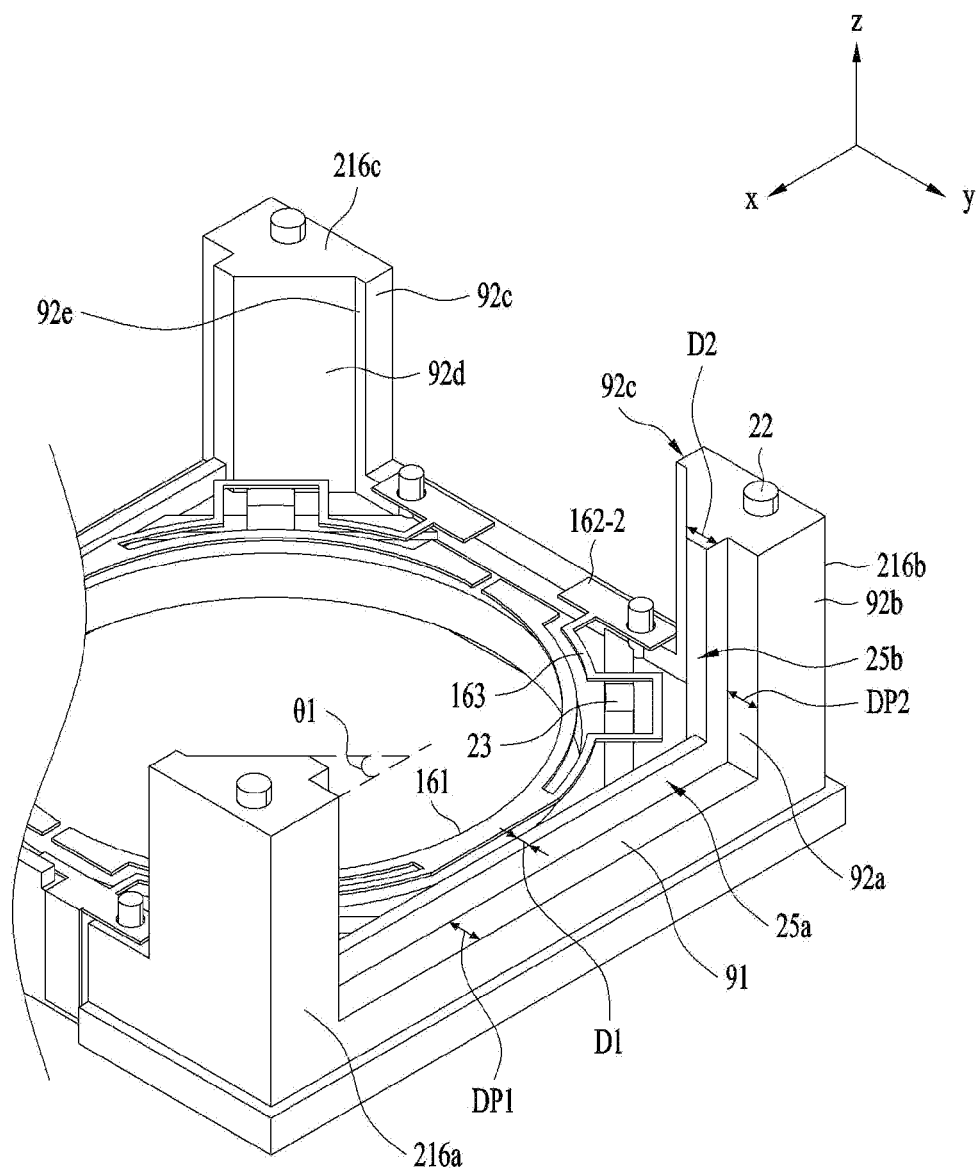
FIG. 11 is an exploded enlarged view of the base with the lower elastic member coupled thereto.
Figure 12:
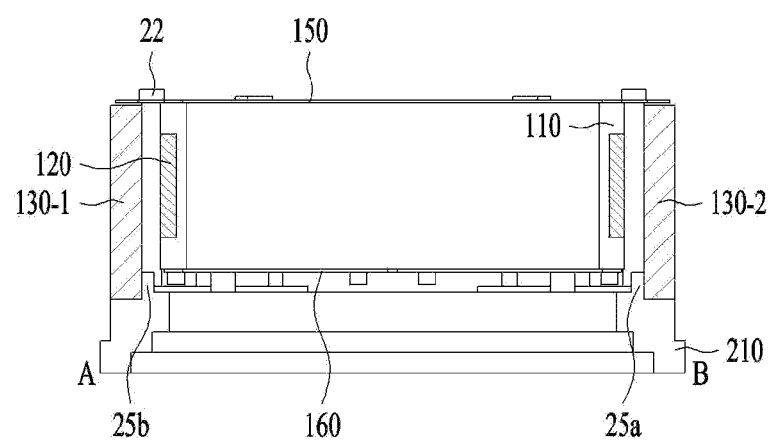
FIG. 12 is a cross-sectional view of the lens moving apparatus shown in FIG. 3, which is taken in the A-B direction.

FIG. 5A is a first perspective view of the base 210 shown in FIG. 2. FIG. 5B is a second perspective view of the base 210 shown in FIG. 2. FIG. 5C is a third perspective view of the base 210 shown in FIG. 2. FIG. 6 is a perspective view of the lower elastic member 160 shown in FIG. 2. FIG. 7 illustrates the magnets 130-1 and 130-2 coupled to the base 210 and the lower elastic member 160. FIG. 8 illustrates the upper elastic member 150 coupled to the base 210. FIG. 9 is an exploded perspective view of the base 210 and the magnet 130. FIG. 10 is an assembled perspective view of the base 210 and the magnet 130. FIG. 11 is an exploded enlarged view of the base 210 with the lower elastic member 160 coupled thereto. FIG. 12 is a cross-sectional view of the lens moving apparatus shown in FIG. 3, which is taken in the A-B direction.

Referring to FIGS. 5A to 5C, the base 210 may be coupled to the cover member 300, and may define a space for accommodating the bobbin 110, in cooperation with the cover member 300.

The base 210 may have an opening that corresponds the opening in the cover member and/or the opening in the bobbin 110. The base 210 may have a shape, for example, a square shape that coincides with or corresponds to the cover member 300.

The base 210 may include a body 213 having the opening and the posts 216a to 216d projecting from the body 213.

The body 213 may include corner sections 217a to 217d and side sections 218a to 218d positioned between the corner sections 217a to 217d.

Each of the posts 216a to 216d may be disposed at a corresponding one of the corner sections 217a to 217d of the body 213.

For example, the base 210 may include a first post 216a, a second post 216b, a third post 216c and a fourth post 216d, which project upwards a predetermined height from the first to fourth corner sections 217a to 217d.

The term "posts" of the base 210 may be used interchangeably with the term "projections".

Although each of the posts 216a to 216d may have, for example, a polygonal shape projecting vertically from the upper surface of the body 213 of the base 210, the disclosure is not limited thereto. Although the posts 216a to 216d may have, for example, a cross section of an "L" shape or a polygonal shape, the disclosure is not limited thereto.

The body 213 of the base 210 may include an upper surface and outer side surfaces, and may include a first surface positioned inside the first to fourth posts 216a to 216d around the opening, and a second surface, which is positioned outside the first surface and higher than the first surface.

For example, the first surface of the upper surface of the body 213 of the base 210 may be a surface that serves as a reference surface for the projecting height of the posts 216a to 216d or the height of the first stepped portions 25a.

For example, the second surface of the body 213 of the base 210 may be the upper surface of a projecting portion 25c, and the lower elastic member 160 may be coupled to the second surface of the upper surface of the body 213 of the lower elastic member 160.

Each of the side sections 218a to 218d of the body 213 of the base 210 may be disposed between two adjacent ones of the corner sections 217a to 217d.

Although the length of each of the side sections 218a to 218d of the body 213 of the base 210 in a transverse direction may be larger than the length of each of the corner sections 217a to 217d of the body 213 of the base 210, the disclosure is not limited thereto.

The base 210 may include openings, which are positioned between two adjacent posts 216a and 216b, 216b and 216c, 216c and 216d and 216d and 216a and are positioned on the first stepped portions 25a and the projecting portions 25c.

The first magnet 130-1 may be disposed between the first post 216a and the second post 216b, and the second magnet 130-2 may be disposed between the third post 216c and the fourth post 216d.

For example, the first magnet 130-1 may be disposed on the first side section 218a, and the second magnet 130-2 may be disposed on the third side section 218c.

Each of the first side section 210a and the third side section 218c of the base 210 may be provided with the first stepped portion 25a, and each of the posts 216a to 216d of the base 210 may be provided with a second stepped portion 25b.

The first and second magnets 130-1 and 130-2 may be disposed at the first stepped portion 25a and the second stepped portion 25b. The first and second stepped portions 25a and 25b may function to support the first and second magnets 1301- and 130-2 so as to prevent the first and second magnets 130-1 and 130-2 from being inclined inwards.

The first stepped portion 25a may have a depth DP1 from the outer surface of the body 213, and the second stepped portion 25b may have a depth DP2 from the outer surfaces of the posts 216a to 216d.

For example, each of the first stepped portions 25a may include a first surface 25a1, which is a stepped surface having a depth from a corresponding one of the outer surfaces 29a of the side sections 218a and 218c of the body 213, and a second surface 25a2, which is disposed between a corresponding one of the outer surfaces 29a of the side sections 218a and 218c of the body 213 and the first surface 25a1.

For example, each of the second stepped portions 25b may include a first surface 25b1, which is a stepped surface having a depth from a corresponding one of the outer surfaces 92b of the posts 216a to 216d, and a second surface 25b2, which is positioned between a corresponding one of the outer surfaces 92b of the posts 216a to 216d and the first surface 25b1.

For example, the base 210 may include the first stepped portions 25a, each of which has a depth DP1 from the first outer surface of the body 213 (for example, the outer surface of the first side section 218a of the body 213) and is positioned between the first post 216a and the second post 216b. For example, the outer surface of the body 213 may be the outer surface of the side section among the outer surfaces of the body 213, on which the first magnet 130-1 is disposed.

For example, each of the first post 216a and the second post 216b may include the second stepped portion 25b, which has the depth DP2 from the first outer surface 92b of each of a first post 216a and the second post 216b. For example, the outer surface 92b of each of the first post 216a and the second post 216b may be the outer surface that abuts the first side section 218a of the body 213, among the outer surfaces of the first post 216a and the second post 216b.

Furthermore, the base 210 may include a third stepped portion that has a depth from the second outer surface of the body 213 (for example, the outer surface of the third side section 218c of the body 213) and is positioned between the third post 216c and the fourth post 216d.

Each of the third post 216c and the fourth post 216d may include a fourth stepped portion, which has a depth from the first outer surface of each of the third post 216c and the fourth post 216d. For example, the outer surface of each of the third post 216c and the fourth post 216d may be the outer surface that abuts the third side section 218c of the body 213.

For example, the first magnet 130-1 may be disposed at the first stepped portion 25a and the second stepped portion 25b, and a surface of the first magnet 130-1 may be in contact with the first surface 25a1 of the first stepped portion 25a and the first surface 25b1 of the second stepped portion 25b.

For example, the second magnet 130-2 may be disposed at the third stepped portion and the fourth stepped portion, and a surface of the second magnet 130-2 may be in contact with the first surface of the third stepped portion and the first surface of the fourth stepped portion.

For example, the first depth PD1 may be equal to the second depth DP2. In order to mount the first and second magnets 130-1 and 130-2, the first depth DP1 and the second depth DP2 may be equal to or larger than the length of each of the first and second magnets 130-1 and 130-2. Here, the length of each of the first and second magnets may be the length of each of the first and second depths DP1 and DP2 in the direction of the step.

The first surface 25a1 of the first stepped portion 25a and the first surface 25b1 of the second stepped portion 25b may prevent an adhesive member 75 (see FIG. 15), which is injected through adhesive injection recesses 47a and 47b in order to attach the first and second magnets 130-1 and 130-2 to the base 210, from flowing toward the bobbin 110 of the lens moving apparatus 100.

The first stepped portion 25a may be referred to using the term "first projection (or first step)", and the second stepped portion 25b may be referred to using the term "second projection (or second step)".

For example, the "first projection" may be positioned between the first post 216a and the second post 216b and between the third post 216c and the fourth post 216d, and may project vertically from the upper surface of the side section of the body. For example, the vertical direction may be a direction toward the upper surface of the base 210 (for example, the upper surface of the body 213) from the lower surface of the base 210 (for example, the lower surface of the body 213).

The "second projection" may project in a first horizontal direction from the side surface of each of the posts 216a to 216d. For example, the first horizontal direction may be a direction toward the first magnet 130-1 or the second magnet 130-2 from each of the posts 216a to 216d.

Although the first height of the first projection may be equal to the second height of the second projection from the side surface 92a each of the posts 216a to 216d, the disclosure is not limited thereto. In another embodiment, the first height may be larger than the second height. In a further embodiment, the first height may be smaller than the second height. The side surface 92a of each of the posts 216a to 216d may be the second surface 25b2 of the second stepped portion 25b.

The first length or thickness D1 of the first projection in the direction of the first depth PD1 may be smaller than the first depth DP1. The thickness D1 of the first projection may be different from the length or thickness D2 of the second projection in the direction of the second depth DP2. For example, D1 may be smaller than D2.

The thickness D2 of the second projection may be gradually decreased moving in the projecting direction of the second projection. The reason for this is to avoid spatial interference between the bobbin 110 and the posts 216a to 216d of the base 210 during movement of the bobbin 110.

For example, the side surfaces 92a of the posts (for example, 216a and 216b, 216c and 216d) may be the side surfaces of two adjacent posts (for example, 216a and 216b, 216c and 216d) that face each other.

The side surface 92b of each of the posts 216a to 216d may be one of the outer surfaces of the post, and may be the side surface that is perpendicular to the side surface 92a of each of the posts 216a to 216d and is parallel to the outer surface of the first side section or the third side section of the base 210.

For example, the first projection may abut the side surfaces of the first post 216a and the second post 216b, and may abut the side surfaces 92a of the third post and the fourth post. However, the disclosure is not limited thereto. In another embodiment, the first projection may be spaced apart from the side surfaces 92a of two adjacent posts.

Although the first projection may abut, for example, the second projection, the disclosure is not limited thereto. In another embodiment, the first projection and the second projection may be spaced apart from each other.

Although one first projection is illustrated as being disposed at each of the first and third side sections 218a and 218c of the base 210 and one second projection is illustrated as being disposed at each of the side surface 92a of each of the posts 216a to 216d in FIGS. 5A to 5C, the disclosure is not limited thereto.

In another embodiment, two or more first projections, which are spaced apart from each other, may be disposed at each of the first and third side sections 218a and 218c of the base 210, and two or more second projections, which are spaced apart from each other, may be disposed at the side surface 92a of each of the posts 218a to 218d.

Based on the upper surface of the body 213 of the base 210, the height of the posts 216a to 216d may be larger than the height of the first projection.

Each of the second and fourth side sections 218b and 218d of the body 213 of the base 210 may be provided with a projection 25c, which projects in a vertical or optical-axis direction from the upper surface of the body 213 of the base 210. The projection 25c may project from the upper surface around the opening in the body 213.

For example, the projection 25c may be positioned between the second post 216b and the third post 216c, and may be positioned between the first post 216a and the fourth post 216d. The upper surface of the projection 25c may be positioned higher than the upper surface of the body.

Although the projection 25c may abut side surfaces of two adjacent posts (for example, 216a and 216d, 216b and 216c), the disclosure is not limited thereto.

Each of the posts 216a to 216d may further include a side surface 92d positioned between the second stepped portion 25b and the side surface 92c. The side surface of each of the posts 216a to 216d may be the surface that faces the first side section 110b-1 of the bobbin 110.

A surface of the second projection may be positioned so as to be flush with the side surface 92d of each of the posts 216a to 216d, and the side surface 92d of each of the posts 216a to 216d may be positioned so as to face a first stopper 23.

For example, the side surface 92d of each of the posts 216a to 216d may be a surface that is inclined at a predetermined angle θ1 (see FIG. 11) with respect to the side surface 92b of each of the posts 216a to 216d or an imaginary plane or line parallel to the side surface 92b of each of the posts 216a to 216d.

Although the angle θ1 of the side surface 92d of each of the posts 216a to 216d may be equal to, for example, the angle θ2 of the outer surface of the first side section 110b-1 of the bobbin 110 that corresponds to the side surface 92d of each of the posts 216a to 216d, the disclosure is not limited thereto.

The angle θ1 of the side surface 92d of each of the posts 216a to 216d may be within a range of 25-60 degrees. For example, the angle θ1 of the side surface 92d of each of the posts 216a to 216d may be within a range of 40-50 degrees.

Each of the posts 216a to 216d may further include a side surface 92e, which is positioned between the side surface 92c and the side surface 92d.

Although the side surface 92e of each of the posts 216a to 216d may be parallel to, for example, the side surface 92b of each of the posts 216a to 216d, the disclosure is not limited thereto.

For example, each of the posts 216a to 216d may include a bent surface, which is defined by the side surface 92d and the side surface 92e.

The base 210 may include the first stoppers 23 projecting from the upper surface of the body 213. Although the stoppers 23 may be respectively provided at the posts 216a to 216d, the disclosure is not limited thereto. The first stopper 23 may also be referred to as a "lower stopper".

For example, the first stoppers 23 may be disposed so as to respectively correspond to the second frame connection portions 163-1 and 163-2 of the lower elastic member 160.

In order to avoid spatial interference between the bobbin 110 and the lower elastic member 160, the first stoppers 23 may be positioned higher than the second frame connection portions 163-1 and 163-2 of the lower springs 160a and 160b coupled to the base 210.

The first stoppers 23 of the base 210 may prevent the lower surface or the lower end of the bobbin 210 from directly colliding with the body 213 of the base 210 upon application of external impact.

The base 210 may include support projections 24 projecting from the upper surface of the body 213.

Each of the support projections 24 may connect the first stepped portion (or the first projections), disposed between two adjacent side sections of the body 213, to the projection 25c.

For example, each of the support projections 24 may connect the inner surface of the first stepped portion (or the first projection) 25a to the inner surface of the projection 25c.

Each of the support projections 24 may serve to support the first stepped portion (or the first projection) 25a to the projection 25c. Based on the upper surface of the body of the base 210, the height of the support projection 24 may be smaller than the height of the first surface 25a1 of the first stepped portion 25a (or the height of the first projection) and the height of the projection 25c.

The support projections 24 may be positioned between the posts 216a to 216d and the opening in the base 210, and the first stoppers 23 may be respectively positioned on the support projections 24.

For coupling to the upper elastic member 150, the base 210 may include a first protrusion 22 disposed on at least one upper portion or upper surface of the posts 216a to 216d.

For example, the base 210 may include at least one first protrusion 22 projecting from the upper surfaces of the posts 216a to 216d.

The lower elastic member 160 may be coupled to the base 210 between the first post 216a and the fourth post 216d adjacent to the first post 216a.

Furthermore, the lower elastic member 160 may be coupled to the base 210 between the second post 216b and the third post 216c adjacent to the second post 216b.

The lower elastic member 160 may not be coupled to the base 210 between the first post 216a and the second post 216b and between the third post 216c and the fourth post 216d.

The base 210 may include the projections 25c, which are positioned between the first post 216a and the fourth post 216d and between the second post 216b and the third post 216c and project from the body 213, and at least one second protrusion 21 disposed on the upper surfaces of the projections 25c.

Although the number of second protrusions 21 is two in this embodiment, the disclosure is not limited thereto. The number of second protrusions 21 may be one or more.

For example, two second protrusions 21 may be disposed at the projection 25c of the base 210 so as to be spaced apart from each other, and each of the second protrusions 21 may project from the upper surface of the projection 25c.

For example, in order to avoid spatial interference with the magnets 130I and 130-2, the second protrusions 21 may be disposed at the second and fourth side sections 218b and 218d of the body 213, at which the magnets 130-1 and 130-2 are not disposed.

The fourth side section 218d of the body 213 of the base 210 may be provided thereon with a guide protrusion 27. The guide protrusion 27 may be disposed at the protrusion 25c disposed at the fourth side section 218d of the body 213. The guide protrusion 27 may serve to stably secure portions of the second outer frames of the lower springs 160-1 and 160-2 adjacent to the connection terminals 164a and 164b by increasing the contacting area with extensions 62a and 62b of the second outer frames of the lower springs 160-1 and 160-2.

For example, the guide protrusion 27 may be disposed between the protrusions 21 disposed on the projection 25c.

The outer surface of the fourth side section 218d of the body 213 of the base 210 may have formed therein a mount recess 28, in which the connection terminals 164a and 164b of the lower springs 160a and 160b are disposed.

The lower end of the outer surface of the body 213 of the base 210 may be provided with a step 211. The step 211 may be in contact with the lower ends of the side plates of the cover member 300, and may guide the cover member 300. The step 211 of the base 210 and the lower ends of the side plates of the cover member 300 may be adhesively and sealably secured to each other and sealed using an adhesive or the like.

Next the lower elastic member 160 and the upper elastic member 150 will be described.

Referring to FIGS. 6 and 8, the upper elastic member 150 and the lower elastic member 160 may be coupled to the bobbin 110 and the base 210, and may flexibly support the bobbin 110.

The upper elastic member 150 may be coupled to the upper portion, the upper surface or the upper end of the bobbin 110 and to the upper portions, the upper surfaces or the upper ends of the posts 216a to 216d of the base 210.

The lower elastic member 160 may be coupled to the lower portion, the lower surface or the lower end of the bobbin 110 and to the side sections 218b and 218d of the base 210.

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

The upper elastic member 150 may include a first inner frame 151 coupled to the first coupling portions 113 of the bobbin 110, a first outer frame 152 coupled to the first protrusions 22 of the base 210, and a first frame connector 153 connecting the first inner frame 151 to the first outer frame 152.

The first outer frame 152 may be disposed on the upper surfaces of the posts 216a to 216d and on the upper surfaces of the first and second magnets 130-1 and 130-2.

Although the upper elastic member 150 is embodied as a single upper spring in FIG. 8, the disclosure is not limited thereto. In another embodiment, the upper elastic member may include a plurality of upper springs, which are spaced apart from or separated from each other.

The first inner frame 151 of the upper elastic member 150 may be provided with through holes or grooves 151a so as to be coupled to the first coupling portions 113 of the bobbin 110, and the first outer frame 152 may be provided with through holes or grooves so as to be coupled to the first protrusions 22 of the base 210.

The upper elastic member 150, coupled to the base 210, may be spaced apart from the inner surface of the cover member 300.

Furthermore, the first inner frame 151 of the upper elastic member 150 coupled to the bobbin 110 may be inclined or bent lower than the first outer frame 152 secured to the posts 216a to 216d.

The lower elastic member may include the first lower spring 160a and the second lower spring 160b, which are positioned inside the posts 126a to 126d and are spaced apart from each other. The first and second lower springs 160a and 160b may be spaced apart from each other, and may be conductively isolated from each other.

Each of the first and second lower springs 160a and 160b may include the second inner frame 161, which is to be coupled to the second coupling portions 117 of the bobbin 110, second outer frames 162-1 and 162-2, and the second frame connection portions 163-1 and 163-2 configured to connect the second inner frame 161 to the second outer frames 162-1 and 162-2.

For example, the second outer frame 162 may be disposed on the upper surfaces of the side sections 218b and 218d and/or the upper surfaces 25c of the body 213 of the base 210.

Although each of the first and second lower springs 160a and 160b may include, for example, a single second inner frame 161, two second outer frames 162-1 and 162-2 and two second frame connection portion 163-1 and 163-2, the number of second inner frames, the number of second outer frames and the number of second frame connection portions are not limited thereto.

Each of the two outer frames 162-1 and 162-2 may be coupled to a corresponding one of the second protrusions 21 provided on the projections 25c of the base 210.

For example, the second inner frame 161 of each of the first and second lower springs 160a and 160b may be provided with through holes or grooves so as to be coupled to the second coupling portions 117 of the bobbin 110, and the second outer frames 162-1 and 162-2 may be provided with through holes or grooves 162a so as to be coupled to the second protrusions 21 of the base 210.

By means of adhesive or thermal fusion, the first coupling portions 113 and the through holes 151a in the first inner frame 151, the second coupling portions 117 of the bobbin 110 and the through holes 161a in the second inner frame 152, the first protrusions 22 of the base 210 and the through holes 152a in the first outer frame 152, and the second protrusions 21 of the base 210 and the through holes 162a in the second outer frames 162-1 and 162-2 may be bonded to each other.

Each of the first and second frame connectors 153, 163-1 and 163-2 may be bent or curved at least once so as to define a predetermined pattern.

The upward and/or downward movement of the bobbin 110 in the first direction may be elastically (or flexibly) supported by virtue of positional variation and fine deformation of the first and second frame connectors 153 and 163.

The second frame connection portion 163 may be a portion (or a bent portion) surrounding at least a portion of the side surface of the first stopper 23.

Although the portion that is surrounded by the bent portion of the second frame connection portion 163 may include at least one of the side surfaces of the first stopper 23, the disclosure is not limited thereto.

In another embodiment, the portion that is surrounded by the bent portion of the second frame connection portion 163 may include at least one partial region of the side surfaces of the first stopper 23.

For example, the portion that is surrounded by the bent portion of the second frame connection portion 163 may include at least one of the side surfaces of the first stopper 230 and a partial region of other side surfaces.

For example, the bent portion of the second frame connection portion 163 may include portions positioned between the first stoppers 23 and the side surfaces 92d of the posts 216a to 216d.

For example, the second frame connection portion 163 may include a portion (or a bent portion), which surrounds the remaining side surfaces other than the first side surface of the first stopper 23. The first side surface of the first stopper 23 may be the side surface that faces the opening in the base 210.

The coil 120 may be coupled to the inner frames 161 of the first and second lower springs 160a and 160b, and may be conductively connected to the first and second lower springs 160a and 160b.

Referring to FIG. 6, one end of the second inner frame 161 of the first lower spring 160a may be provided on the upper surface thereof with a first bonding portion 19a, to which one end of the coil 120 is bonded, and one end of the second inner frame 161 of the lower spring 160b may be provided on the upper surface thereof with a second bonding portion 19b, to which the other end of the coil 120 is bonded.

Each of the first bonding portion 19a and the second bonding portion 19b may also have a groove (not shown) configured to guide the coil 120.

The coil 120 may be bonded to the second bonding portions 19a and 19b by means of a conductive adhesive member such as solder. The term "bonding portion" in the first and second bonding portions 19a and 19b may be replaced with the term "pad portion", "connection terminal", "solder portion" or "electrode portion".

In order to prevent an oscillation phenomenon when the bobbin 110 is moved, a damper may be disposed between the first frame connection portion 153 of the upper elastic member 150 and the upper surface of the bobbin 110 (for example, the first escape recess 112a).

Furthermore, a damper (not shown) may also be disposed between the second frame connection portions 163-1 and 163-2 of the lower elastic member 160 and the lower surface of the bobbin 110, e.g. the second escape recess 112b.

In addition, a damper may be applied to a coupling portion between the upper elastic member 150 and each of the bobbin 110 and the base 210 and/or to a coupling portion between the lower elastic member 160 and each of the bobbin 110 and the base 210. Although the damper may be, for example, gel-type silicon, the disclosure is not limited thereto.

Each of the first and second lower springs 160a and 160b may be disposed on the upper surface of the base 210.

Each of the first and second lower springs 160a and 160b may include a corresponding one of the first and second connection terminals 164a and 164b for conductive connection to an external component. The term "connection terminal" in the first and second connection terminals 164a and 164b may be used interchangeably with the term "pad portion', "bonding portion", "solder portion" or "electrode portion".

Each of the first lower spring 160-1 and the second lower spring 160-2 may include a corresponding one of the connection terminals 164a and 164b, which is connected to the second outer frame 162 and which is bent toward the outer surface of the side section 218d of the body 213 of the base 210 and extends therefrom.

For example, the first lower spring 160a may include the first connection terminal 164a, which is connected to the outer surface of the second outer frame 162-1 and which is bent toward the outer surface of the projection 25c positioned at the side section 218d of the body 213 and extends therefrom.

For example, the second lower spring 160b may include the second connection terminal 164b, which is connected to the outer surface of the second outer frame 162-1 and which is bent toward the outer surface of the projection 25c positioned at the side section 218d of the body 213 and extends therefrom.

For example, the outer surface of the fourth side section 218d of the body 213 may be a surface, which is different from the outer surface of the first side section 218a of the body 213, at which the first magnet 130-1 is disposed, and the outer surface of the third side section 218c of the body 213, at which the second magnet 130-2 is disposed. For example, the outer surface of the fourth side section 218d of the body 213 may be perpendicular to the first side section 218a of the body 213 or the outer surface of the third side section 218c.

The first and second connection terminals 164a and 164b of the first and second lower springs 160a and 160b may be disposed in the mount recess 28, which is formed in the outer surface of the projection 25c disposed at the fourth side section 218d of the body 213 of the base 210 and the outer surface of the fourth side section 218d of the body 213, in the state of being spaced apart from each other, and may be in contact with the mount recess 28 in the base 210.

For example, the first and second connection terminals 164a and 164b may be disposed at the outer surface of the projection 25c of the fourth side section 218d of the body 213 of the base 210. The reason for this is to make it easy to perform a soldering operation for conductive connection to an external component. However, the disclosure is not limited thereto. In another embodiment, the first and second connection terminals of the first and second lower springs may also be disposed at outer surfaces of two different side sections of the base 210.

Each of the first and second lower springs 160a and 160b may include a corresponding one of extensions 62a and 62b, extending toward the guide protrusion 27 from the other end of the second outer frame 162-1.

The second outer frame of the first lower spring 160a may be disposed at one side of the guide protrusion 27 of the base 210, and the second outer frame of the second lower spring 160b may be disposed at the outer side of the guide protrusion 27 of the base 210.

The extension 62a of the second outer frame of the first lower spring 160a may extend toward the second outer frame of the second lower spring 160b from the second outer frame of the first lower spring 160a.

Furthermore, the extension 62b of the second outer frame of the second lower spring 160b may extend toward the second outer frame of the first lower spring 160a from the second outer frame of the second lower spring 160b. An adhesive member may be disposed between the guide protrusion 27 and the extensions 62a and 62b.

The extensions 62a and 62b may increase the bonding area with respect to the guide protrusion 27 in order to improve the bonding force between the second outer frame 162-1 and the base 210 and to suppress displacement of the second outer frames 162-1 of the lower springs 160a and 160b, thereby preventing the second outer frame 162-1 from escaping from the base 210.

Next, the magnet 130 will be described.

Referring to FIGS. 9 and 10, the magnet 130 may be disposed at at least one of the side sections 218a to 218d of the body 213 of the base 210, and may move the bobbin 110 in the first direction by electromagnetic interaction with the coil 120.

For example, the magnet 130 may include the first magnet 130-1, which is disposed at one of the two side sections 218a and 218c of the body 213 of the base 210, which face each other, and the second magnet 130-2, which is disposed at the other of the two side sections 218a and 218c.

At the initial position of the AF operation unit, for example, the bobbin 110, the first and second magnets 130-1 and 130-2 disposed at the base 210 may overlap at least a portion of the coil 120 in a direction perpendicular to the optical axis. Here, the initial position of the AF operation unit, for example, the bobbin 110, may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the AF operation unit may be the position at which the AF operation unit is located when gravity acts in the direction from the bobbin 110 to the base 210 or when gravity acts in the direction from the base 210 to the bobbin 110.

Although each of the first and second magnets 130 may have a shape corresponding to the shape of each of the side sections 218a and 218c of the body 213 of the base 210, for example, the shape of a rectangular parallelepiped, the disclosure is not limited thereto.

For example, each of the first and second magnets 130-1 and 130-2 may be a monopolar magnetized magnet, which is disposed such that a first surface thereof facing the coil 120 has an S pole and a second surface opposite the first surface has an N pole. In another embodiment t, the first surface of each of the first and second magnets 130-1 and 130-2 may have an N pole and the second surface may have an S pole.

As illustrated in FIG. 10, the upper surfaces of the first and second magnets 130-1 and 130-2, which are respectively disposed at the first and second side sections 218a and 218c of the body 213 of the base 210, may be positioned lower than or flush with the upper surfaces of the posts 216a to 216d.

In addition, for example, the magnet 130 may be a bipolar magnetized magnet divided into two parts in a direction perpendicular to the optical axis. At this time, the magnet 130 may be embodied by a ferrite, alnico, rare-earth magnet or the like.

The magnet 130 having a bipolar magnetized structure may include a first magnet portion including an N pole and an S pole, a second magnet portion including an N pole and an S pole, and a nonmagnetic partition. The first magnet portion and the second magnet portion may be spaced apart from each other, and the nonmagnetic partition may be located between the first magnet portion and the second magnet portion. The nonmagnetic partition may be a portion having substantially no magnetism, may include a section having little polarity, and may be filled with air or may be made of a nonmagnetic material.

Although the number of magnets 130 is two in this embodiment, the disclosure is not limited thereto. In another embodiment, the number of magnets 130 may be at least two. Although the surface of each of the magnets 130 that faces the coil 120 may be planar, the disclosure is not limited thereto. The surface of each magnet may be curved.

A typical lens moving apparatus is constructed so as to include three kinds of injection-molded components, that is, a bobbin on which a lens is mounted, a housing on which a magnet is mounted, and a base.

In contrast, this embodiment is constructed such that the base 210 also has the function and role of a housing, thereby obviating a housing and simplifying the structure of the lens moving apparatus. Accordingly, since the lens moving apparatus includes no housing component, it is possible to reduce the number of manufacturing process and resources required for processing, for example, human labor and material costs, and thus to reduce manufacturing costs.

Figure 13:
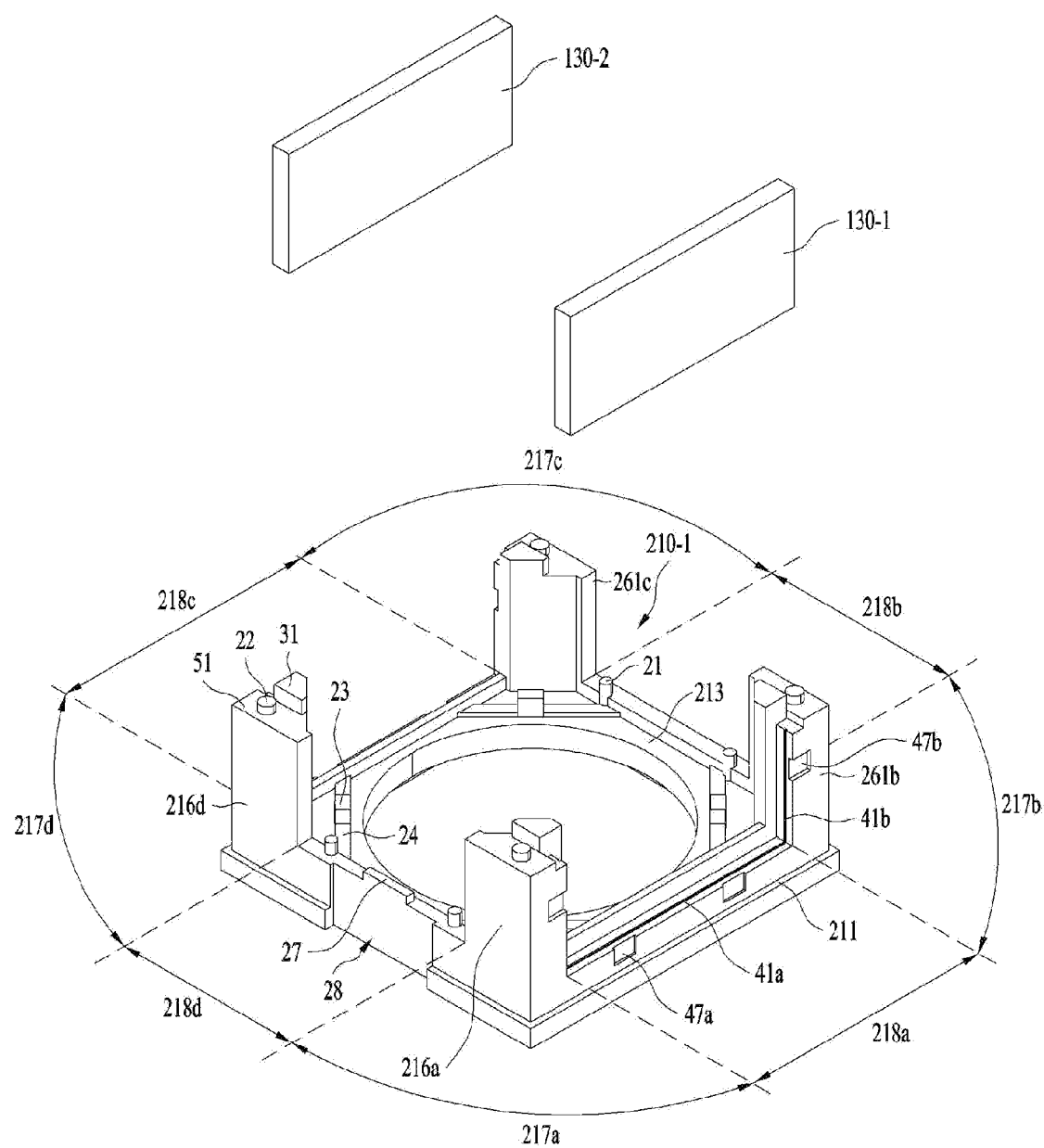
FIG. 13 is an exploded perspective view of a base and the first and second magnets, according to another embodiment.
Figure 14:
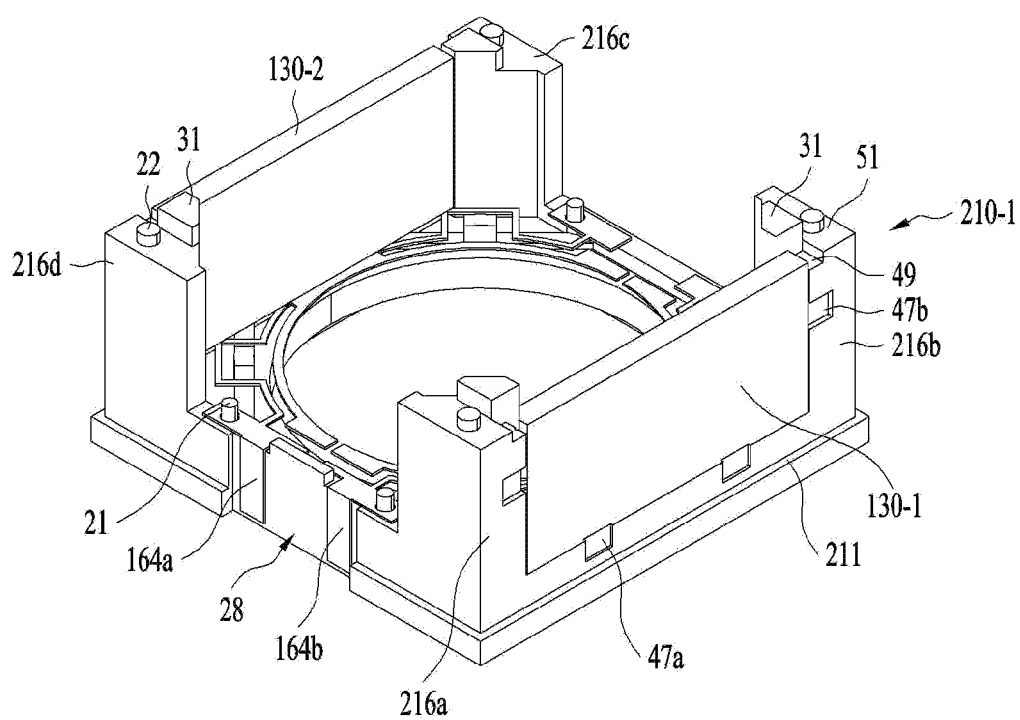
FIG. 14 is an assembled perspective view of the base and the first and second magnets shown in FIG. 13.
Figure 15:
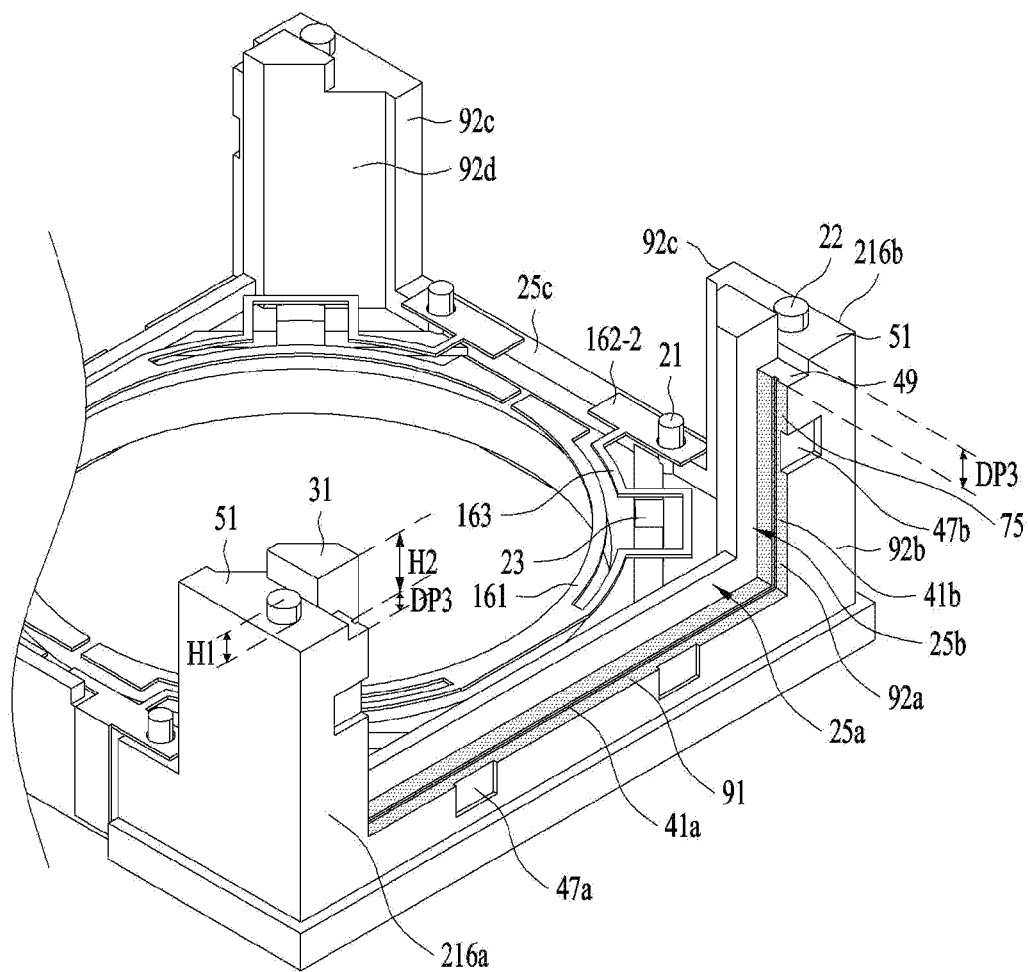
FIG. 15 is an exploded enlarged view of the base shown in FIG. 13.
Figure 16:
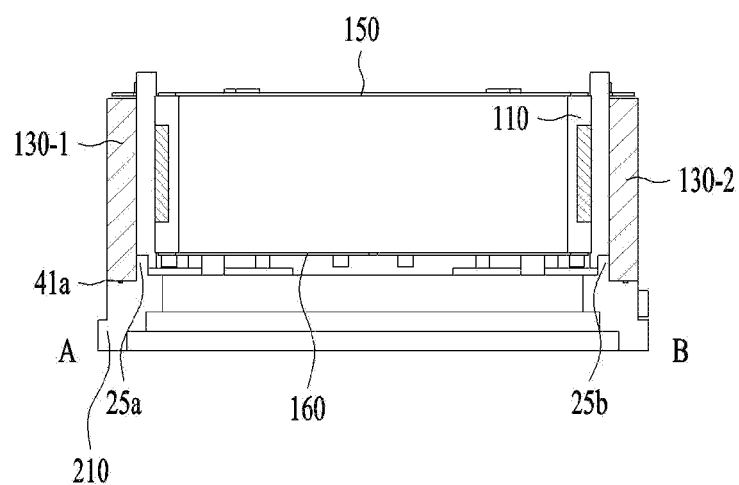
FIG. 16 is a cross-sectional view of the lens moving apparatus on which the base shown in FIG. 13 is mounted, which is taken along in the A-B direction in FIG. 3.

FIG. 13 is an exploded perspective view of a base 210-1 and the first and second magnets 130-1 and 130-2, according to another embodiment. FIG. 14 is an assembled perspective view of the base 210-1 and the first and second magnets 130-1 and 130-2 shown in FIG. 13. FIG. 15 is an exploded enlarged view of the base 210-1 shown in FIG. 13. FIG. 16 is a cross-sectional view of the lens moving apparatus on which the base 210-1 shown in FIG. 13 is mounted, which is taken along in the A-B direction in FIG. 3. Among the reference numerals shown in FIGS. 13 to 16, the descriptions disclosed in FIGS. 1 to 12 may also be described using the same reference numerals as those in FIGS. 1 to 12.

Referring to FIGS. 13 to 16, the base 210-1 may further include second stoppers 31, which are disposed on the upper surfaces or the upper ends of the posts 216a to 216d.

The term "second stopper 31" may also be used interchangeably with the term "upper stopper".

The second stoppers 31 may be positioned on the second stepped portions 25b (or the upper surfaces of the second projections).

For example, each of the second stoppers 31 may be configured such that one end or the upper end of the second stepped portion 25b projects vertically or in the optical-axis direction from the upper surface 51 of the posts 216a to 216d, and the cross section of the second stopper 31 in a direction perpendicular to the optical-axis direction may be the same as that of the projecting portion (or the second projection) of the first stepped portion 25b. However, the disclosure is not limited thereto, and the two cross sections may be different from each other in another embodiment.

For example, one side surface of the second stopper 31 may be an extended surface of the first surface 25b1 of the second stepped portion 25b.

Based on the upper surface 51 of each of the posts 216a to 216d, the height H2 of the second stopper 31 may be larger than the height H1 of each of the first protrusions 22 (H2>H1). In another embodiment, the height H2 may also be equal to the height H1.

Furthermore, from the upper surface 51 of each of the posts 216a to 216d, the height of the second stopper 31 may be larger than the height of the upper elastic member 150 coupled to the first protrusions 22.

The second stoppers 31 may serve to ensure a space or gap in which the bobbin 110 is movable during AF operation.

The base 210-1 may further include grooves 41*a* formed in the upper surfaces of the first and third side sections 218*a* and 218*c*, and grooves 41*b* formed or provided in the side surfaces 92*a* of the posts 216*a* to 216*d*.

The grooves 41*a* may be disposed in the upper surface of the body 213 between the first corner section 217*a* and the second corner section 217*b* and in the upper surface of the body 213 between the third corner section 217*c* and the fourth corner section 217*d*.

For example, the groove between the first corner section 217*a* and the second corner section 217*b* may be formed in the second surface 25*a*2 of the first stepped portion 25*a* so as to face the first magnet 130-1.

For example, the groove 41*a* between the third corner section 217*c* and the fourth corner section 217*d* may be formed in the second surface of the third stepped portion so as to face the second magnet 130-2.

The groove 41*a* may extend from one of two adjacent posts (for example, 216*a* and 216*b*, 216*c* and 216*d*) to the other, and may abut the two posts (for example, 216*a* and 216*b*, 216*c* and 216*d*).

The groove 41*b* may be disposed in the second stepped portion 25*b* of each of the first and second posts 216*a* and 216*b* so as to face the first magnet 130-1. Furthermore, the groove 41*b* may be disposed in the fourth stepped portion of each of the third and fourth posts 216*c* and 216*d* so as to face the second magnet 130-2.

The groove 41*b* may extend from the lower end of each of the posts 216*a* to 216*d* to the upper end thereof (or the stepped portion 49 (see FIG. 15), and may abut the lower end of each of the posts 216*a* to 216*d* and the upper end (or the stepped portion 49) thereof.

For example, each of the grooves 41*a* and the grooves 41*b* may be linear, and the grooves 41*a* and 41*b* may be directly connected to each other. Although the grooves 41*a* may be perpendicular to the grooves 41*b*, the disclosure is not limited thereto.

The grooves 41*a* may serve as channels configured to guide the adhesive member 75 so as to allow the adhesive member 75 to efficiently flow and to be uniformly distributed between the upper surfaces 91 of the side sections 218*a* and 218*c* of the body of the base 210-1 and the lower surfaces of the first and second magnets 130-1 and 130-2.

The grooves 41*b* may serve as channels configured to guide the adhesive member 75 so as to allow the adhesive member 75 to efficiently flow and to be uniformly distributed between the side surfaces 92 of posts 216*a* to 216*d* and the first and second magnets 130-1 and 130-2. Although the adhesive member 75 may be, for example, a UV-bondable member, the disclosure is not limited thereto.

The adhesive member 75 may be disposed in the groove 41*a* and the grooves 41*b*. In other words, since the adhesive member 75 is able to be uniformly supplied to the upper surfaces 91 of the side sections 218*a* and 218*c* and the side surfaces 92*a* of the posts 216*a* to 216*d*, it is possible to increase the bonding force between the base 210-1 and the first and second magnets 130-1 and 130-2.

For example, the groove 41*a* may be positioned so as to be aligned with the center (or the central line) of the upper surface 91 between the first surface 25*a*1 of the first stepped portion 25*a* (or the first projection) and each of the side sections 218*a* and 218*c* of the body 213 of the base 210-1.

The groove 41*b* may be positioned so as to be aligned with the center (or the central line) of the side surface 92*a* of each of the posts 216*a* to 216*d* or the second surface 25*b*2 of the second stepped portion 25*b*.

The base 210-1 may include the stepped portion 49 having a depth DP3 toward the lower surface from the upper surface 51 of each of the posts 216*a* to 216*d*.

The upper end of each of the posts 216*a* to 216*d* of the base 210-1 may have a double stepped structure due to the stepped portion 49. The stepped portion 49 may be positioned below the upper surface 51 of each of the posts 216*a* to 216*d*.

For example, the upper surface of the stepped portion 49 may be parallel to the upper surface of each of the posts 216*a* to 216*d*. The groove 41*b* may abut the upper surface of the stepped portion 49.

As illustrated in FIG. 14, the upper surface of the second stopper 31 may be positioned higher than the upper end or the upper surface of each of the first and second magnets 130-1 and 130-2 mounted on the base 210-1. The upper end or the upper surface of each of the first and second magnets 130-1 and 130-2 may be positioned above the upper surface of the stepped portion 49.

The adhesive member 75, which is intended to bond each of the first and second magnets 130-1 and 130-2 to the base 210-1, may be provided or supplied to the stepped portion 49. Here, the stepped portion 49 may serve to make it easy to supply or apply the adhesive member 75.

The base 210-1 may further include the adhesive injection recesses 47*a* provided in the outer surfaces of the side sections 218*a* and 218*c* of the body 213, and the adhesive injection recesses 47*b* provided in the side surfaces 92*b* of the posts 216*a* to 216*d*.

The adhesive injection recess 47*a* may be provided in the first outer surface of the body 213 of the base 210, and the first outer surface of the body 213 may be the outer surface of the first side surface or the third surface of the body 213. For example, the adhesive injection recess 47*a* may be formed in the outer surface of the body 213 adjacent to the upper surface of the body 213 in which the groove 41*a* is formed. The side surface 92*b* of each of the posts 216*a* to 216*d* may be a side surface parallel to the first outer surface of the body 213.

The adhesive injection recess 47*a* may be connected to the first stepped portion 25*a*.

For example, the adhesive injection recess 47*a* may abut the upper surface 91 of each of the side sections 218*a* and 218*c* of the body 213 of the base 210-1, and may be open at the upper surface of each of the side sections 218*a* and 218*c* of the body 213.

The adhesive injection recess 47*b* may be connected to the second stepped portion 25*b*. For example, the adhesive injection recess 47*b* may be connected to the second surface 25*b*2 of the second stepped portion 25*b*.

The adhesive injection recess 47*b* may abut the side surface of each of the posts 216*a* to 216*d*, and may be open at the side surface 92*a* of each of the posts 216*a* to 216*d*.

It is possible to further increase the bonding force between the base 210-1 and the first and second magnets 130-1 and 130-2 by securing the first and second magnets 130-1 and 130-2 to the base 210-1 and then applying the adhesive member 75 through the adhesive injection recesses 47*a* and 47*b*.

Figure 17A:
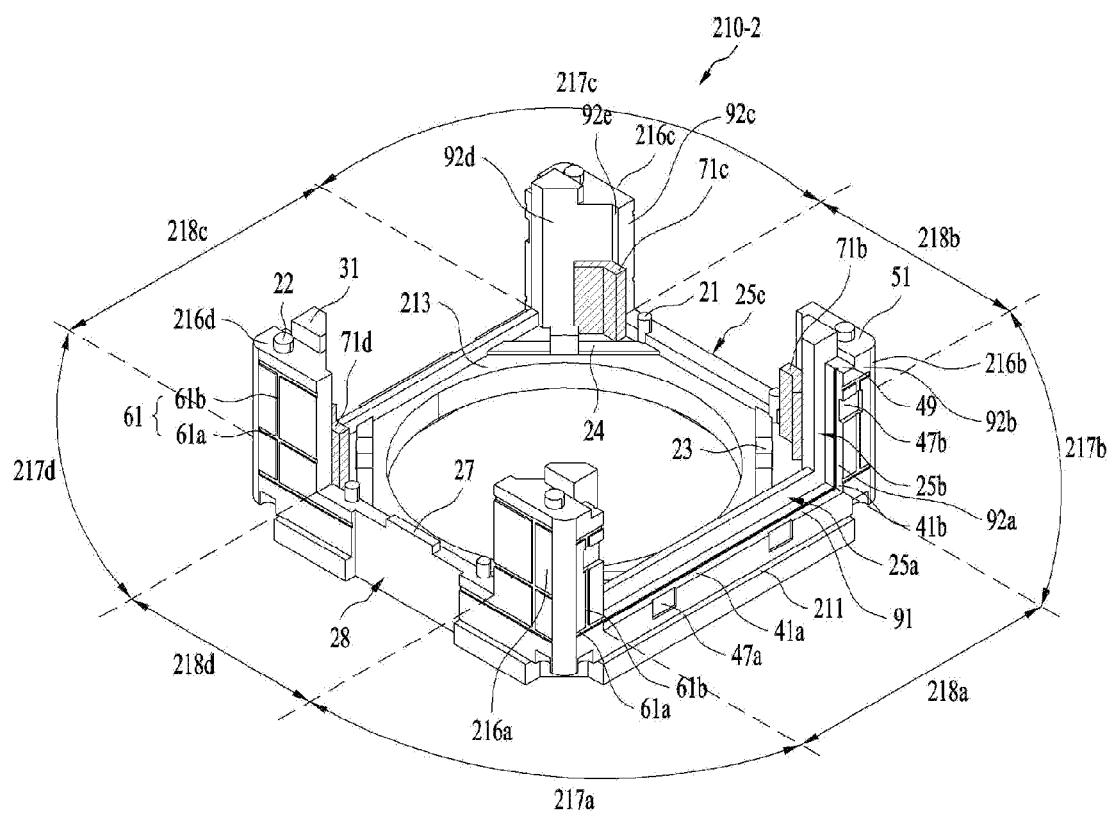
FIG. 17A is a perspective view of the base according to another embodiment.
Figure 17B:
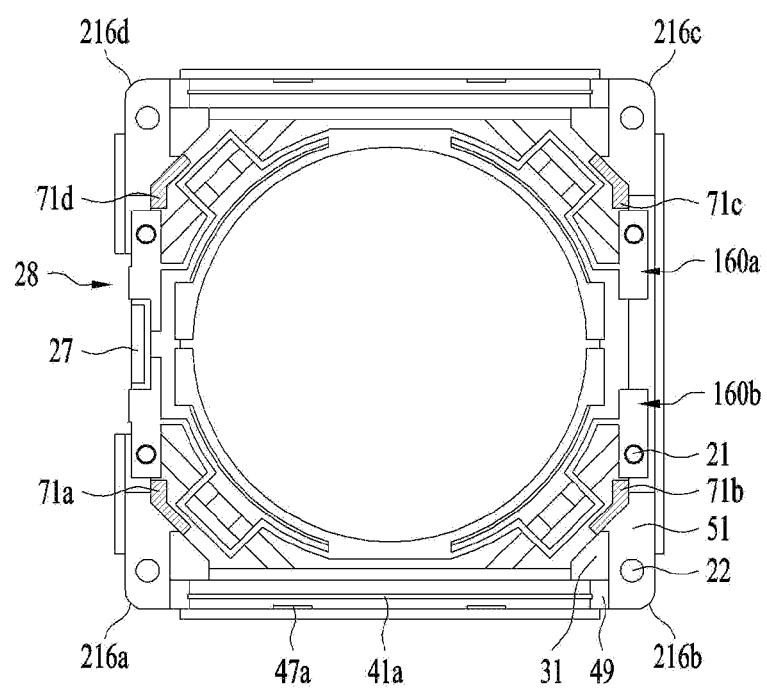
FIG. 17B is a plan view of the base shown in FIG. 17A.
Figure 18:
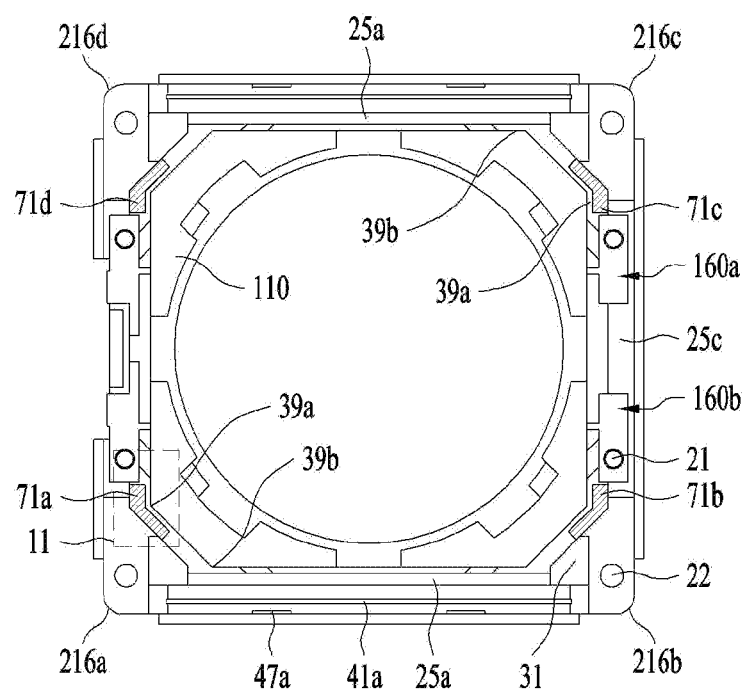
FIG. 18 is a plan view of the base and the bobbin shown in FIG. 17A.

FIG. 17A is a perspective view of the base 210-2 according to another embodiment. FIG. 17B is a plan view of the base 210-2 shown in FIG. 17A. FIG. 18 is a plan view of the base 210-2 and the bobbin 110 shown in FIG. 17A.

Referring to FIGS. 17A to 18, the base 210-2, which is a modification of the base 210-1 shown in FIG. 13, may further include projections 71a to 71d, which are disposed at the inner surface or the side surface 92d of at least one of the posts 216a to 216d.

Here, the projections 71a to 71d may serve to suppress the extent to which the bobbin 110 is rotated about the optical axis. The term "projection" used with reference to the projections 71a to 71d may be used interchangeably with the term "suppressing portion", "stopper", "support step" or the like.

For example, the base 210-2 may include the projections 71a to 71d, which correspond to the respective posts 216a to 216d. Although a single projection is illustrated in FIG. 17A as being provided to each of the posts, the disclosure is not limited thereto. In another embodiment, the projections may be provided at at least two posts among the posts.

Each of the projections 71a to 71d provided at the base 210-2 may project toward the outer surface of the first side section 110b-1 of the bobbin 110 from the inner surface or the side surface 92d of each of the posts 216a to 216d.

The distance d1 (see FIG. 19) between the outer surface of the first side section 110b-1 of the bobbin 110 and a corresponding one of the projections 71a to 71d may be smaller than the distance d2 between the outer surface of the first side section 110b-1 of the bobbin 110 and the inner surface or the side surface 92d of a corresponding one of the posts 216a to 216d (d1<d2).

For example, the distance d1 may be the minimum distance between the outer surface of the first side section 110b-1 of the bobbin 110 and a corresponding one of the projections 71a to 71d. The distance d2 may be the minimum distance between the outer surface of the first side section 110b-1 of the bobbin 110 and the inner surface or the side surface of a corresponding one of the posts 216a to 216d.

The outer surface of the first side section 110b-1 of the bobbin 110 may the outer surface that faces a corresponding one of the posts 216a to 216d, and the side surface 92d of a corresponding one of the posts 216a to 216d may be the inner surface that faces the outer surface of the first side section 110b-1.

For example, each of the projections 71a to 71d of the base 210-2 may be disposed at the side surface 92d and the side surface 92e of a corresponding one of the posts 216a to 216d, and may extend toward an adjacent one of the side sections 218b and 218d of the body 213 of the base 210.

For example, each of the projections 71a to 71d of the base 210-2 may project toward a corresponding one of the side sections 218b and 218d of the body 213 from the side surface 92c of a corresponding one of the posts 216a to 216d.

For example, each of the projections 71a to 71d of the base 210-2 may have a bent form.

Figure 19:
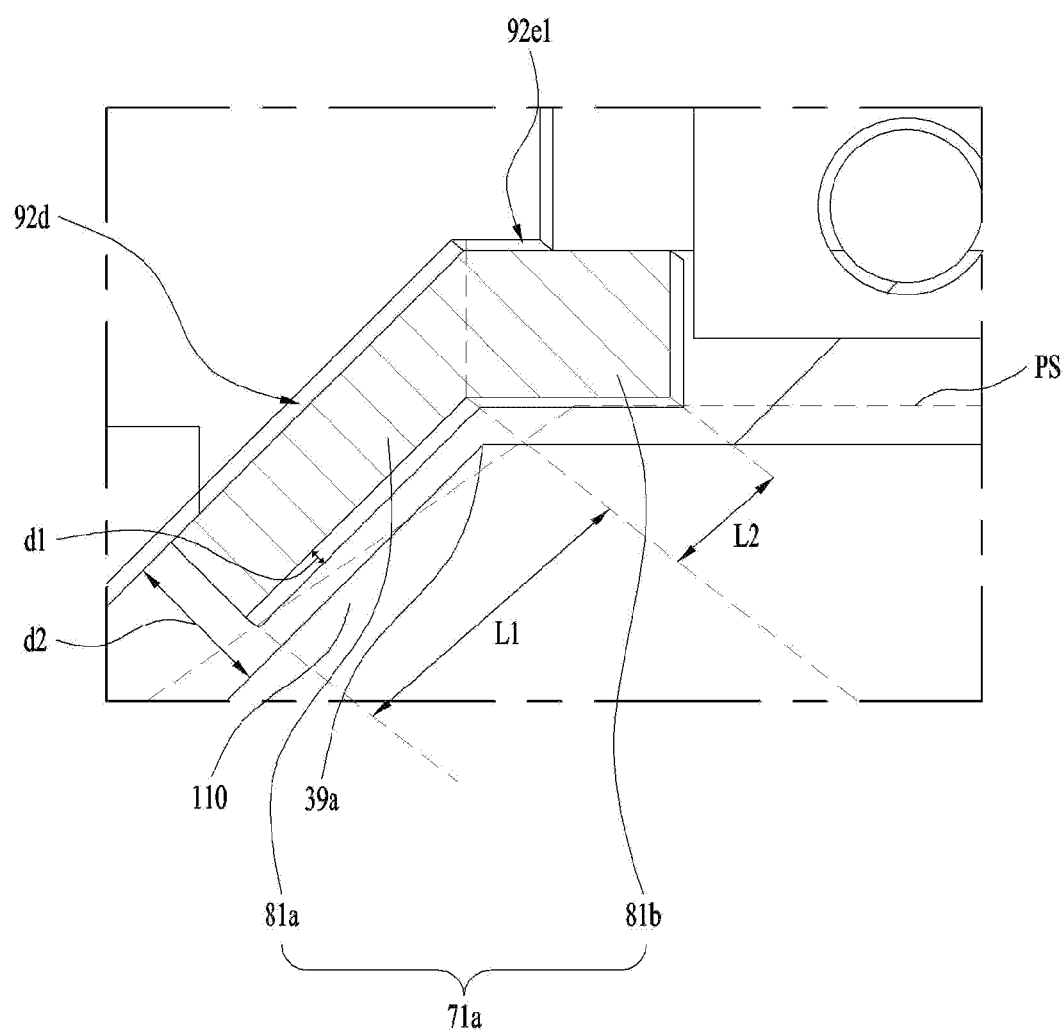
FIG. 19 is an enlarged view of the dotted area in FIG. 18.

FIG. 19 is an enlarged view of the dotted area 11 in FIG. 18.

Referring to FIG. 19, each of the projections 71a to 71d may include a first portion 81a, which is disposed on the side surface 92d of each of the posts 216a to 216d, and a second portion 81b, which is bent from the first portion 81a and extends therefrom and which projects from the side surface 92c of each of the posts 216a to 216d. For example, the side surface 92c of each of the posts 216a to 216d may be one of the side surfaces of the first post 216a and the fourth post 216d that face each other and the side surfaces of the second post 216a and the third post 216c that face each other. For example, the side surface 92c may be the side surface that faces the projection 25c.

For example, each of the projections 71a to 71d of the base 210-2 may include the first portion 81a (see FIG. 19), which is disposed at the side surface 92d of a corresponding one of the posts 216a to 216d, and the second portion 81b disposed at the side surface 92e. The second portion 81b may be bent from the first portion 81a.

Although each of the projections 71a to 71d may be spaced apart from the side surface 92a and/or the first stepped portion 25a of a corresponding one of the posts 216a to 216d in order to avoid spatial interference with a corresponding one of the first and second magnets 130-1 and 130-2, the disclosure is not limited thereto.

Although the angle of the bend between the first portion 81a and the second portion 81b of each of the projections 71a to 71d may be equal to the angle between the side surface 92d and the side surface 92e of each of the posts 216a to 216d, the disclosure is not limited thereto. For example, the angle of the bend between the first portion 81a and the second portion 81b of each of the projections 71a to 71d may be a blunt angle.

For example, the transverse length L2 of the second portion 81b of each of the projections 71a to 71d may be smaller than the transverse length L1 of the first portion 81a of each of the projections 71a to 71d (L2<L1). However, the disclosure is not limited thereto. In another embodiment, the transverse length L2 of the second portion 81b of each of the projections 71a to 71d may also be equal to or smaller than the transverse length L1 of the first portion 81a of each of the projections 71a to 71d.

Furthermore, for example, the transverse length L1 of the first portion 81a of each of the projections 71a to 71d may be smaller than the transverse length of the side surface 92d of each of the posts 216a to 216d. The reason for this is to reduce foreign substances or particles, which may be generated due to contact or collision with the bobbin 110, by reducing the surface area of the projections 71a to 71d, at which the projections may be in contact with the bobbin.

Although the thickness of the first portion 81a of each of the projections 71a to 71d may be equal to the thickness of the second portion 81b, the disclosure is not limited thereto. In another embodiment, the thickness of the first portion may be larger or smaller than the thickness of the second portion.

Although each of the projections 71a to 71d includes both the first portion 81a and the second portion 81b in the embodiment shown in FIG. 17A, the disclosure is not limited thereto. In another embodiment, each of the projections may include only one of the first portion and the second portion.

The projections 71a to 71d may abut the upper surface of the body 213 of the base 210-2, and may be connected to the projections 25c of the base 210-2.

For example, the second portions 81b of the projections 71a to 71d may be connected to the projections 25c of the base 210-2.

For example, the second portions 81b of the projections 71a to 71d may abut the inner surfaces of the projections 25c of the base 210.

Each of the projections 71a to 72d may be spaced apart from a corresponding one of the support projections 24, and may be positioned between the support projection 24 and the side surface 92d of each of the posts 216a to 216d.

Based on the upper surface of the body 213 of the base 210-2, the height of the projections 71a to 71d may be larger than the height of the projections 25c of the base 210-2 but may be smaller than the height of the upper surfaces of the posts 216a to 216d.

For example, based on the upper surface of the body 213 of the base 210-2, the height of the projections 71a to 71d may be larger than the height of the second protrusions 21 and the height of the first stoppers 23.

At the initial position of the bobbin 110, the projections 71a to 71d may overlap the coil 120 in a direction toward the second corner section from the first corner section and in a direction toward the fourth corner section from the first corner section.

Because the projections 71a to 71d overlap the coil 120, the coil 120 mounted on the bobbin 110 is in contact with the projections 71a to 71d due to rotation of the bobbin 110, thereby suppressing rotation of the bobbin 110 beyond a predetermined angle.

In another embodiment, one of the outer surfaces of the bobbin 110 is in contact with the projections 71a to 71d due to rotation of the bobbin 110, thereby suppressing rotation of the bobbin 110 beyond a predetermined angle.

Consequently, it is possible to reduce generation of foreign substances or particles attributable to collision of the projections 71a to 71d with the bobbin 110 and thus to prevent deformation or breakage of the bobbin 110 or the base 210.

The projections 71a to 71d may serve to increase the durability of the posts 216a to 216d of the base 210, and may prevent flexion or deformation of the posts 216a to 216d attributable to impact.

According to this embodiment, the projections 71a to 71d are able to suppress rotation of the bobbin 110 beyond a desired extent due to impact, and are thus able to reduce generation of foreign substances due to contact of the bobbin 110 with the posts of the base 210. Furthermore, the projections 71a to 71d may also serve as stoppers in a direction perpendicular to the optical axis, and may also serve to prevent flexion of the posts.

At the initial position of the bobbin 110, the outer surface of the first side section 110-1 of the bobbin 110 may be spaced apart from a corresponding one of the projections 71a to 71d of the base 210-2.

At the initial position of the bobbin 110, a first corner 39a of the bobbin 110 may overlap the projection (for example, projection 71a) in a direction toward the second post 216b from the first post 216a and in a direction toward the third post 216c from the second post 216b.

At the initial position of the bobbin 110, the first corner 39a of the bobbin 110 may overlap the side surface 92e of each of the posts 216a to 216d in a direction toward the second post 216b from the first post 216a.

At the initial position of the bobbin 110, the first corner 39a of the bobbin 110 may overlap the side surface 92d of each of the posts 216a to 216d in a direction toward the second post 216d from the first post 216a.

The first corner 39a of the bobbin 110 may be the corner at which the outer surface of the first side section 110b-1 of the bobbin 110 meets the outer surface of the second side section 110b-2 of the bobbin 110.

For example, the first corner 39a of the bobbin 110 may be the corner at which the first outer surface of the bobbin 110 meets the second outer surface of the bobbin 110, the first outer surface of the bobbin 110 may be the outer surface that faces a corresponding one of the posts 216a to 216d, and the second outer surface of the bobbin 110 may be the outer surface that abuts the first outer surface and extends in a direction toward the fourth post 216d from the first post 216a.

At the initial position of the bobbin 110, a second corner 39b of the bobbin 110 may overlap the first stepped portion (or the first projection) 25a of the base 210-2 in a direction toward the fourth post 216d from the first post 216a.

The second corner 39b of the bobbin 110 may be the corner at which the first side section 110b-1 of the bobbin 110 meets the second side section 110b-2 of the bobbin 110, which corresponds to each of the side sections 219a and 218c of the base 210-2.

The dotted line PS shown in FIG. 19 represents the position of the bobbin 110 when the bobbin 110 is rotated clockwise by a predetermined angle, for example an angle of 2 degrees from the initial position of the bobbin 110.

When the bobbin 110 is rotated clockwise by a predetermined angle, for example an angle of 2 degrees, the second side section 110b-2 of the bobbin 110 is in contact with the projection 71a of the base 210-2, and thus further rotation of the bobbin 110 in a clockwise direction is suppressed by means of the projection 71a.

For example, the projections 71a to 71d are able to prevent the bobbin 110 from rotating clockwise or counterclockwise beyond a predetermined angle from the initial position of the bobbin 110.

The predetermined angle may be, for example, an angle of 2-5 degrees. The predetermined angle may be, for example, 2 degrees.

The second frame connection portion 163 may include a bent portion, which surrounds three side surfaces of the first stopper 23. The bent portion may include a portion positioned between the first stopper 23 and a corresponding one of the projections 71a to 71d, and may be spaced apart from the first stopper 23 and a corresponding one of the projections 71a to 71d.

Figure 20:
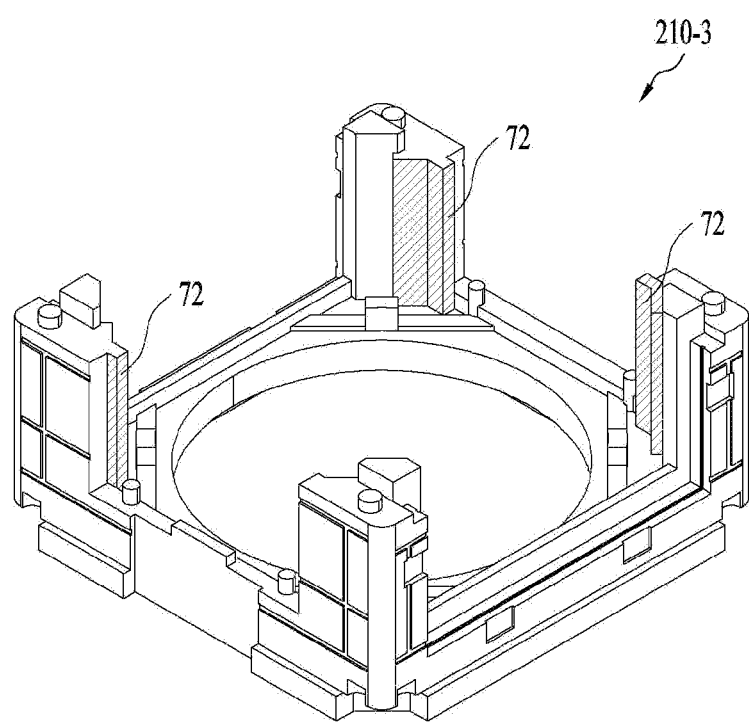
FIG. 20 is a perspective view of a base according to a further embodiment.

FIG. 20 is a perspective view of a base 210-3 according to a further embodiment.

The base 210-3 shown in FIG. 20 is a modification of the base 210-2 shown in FIG. 17A. In this embodiment, based on the upper surface of the body 213 of the base 210-3, the height of the projections 72 may be larger than the height of the projections 25c, and may be equal to the height of the upper surfaces of the posts 216a to 216d.

At the initial position of the bobbin 110, the projections 72 may overlap the coil 120 in a direction perpendicular to the optical axis.

Figure 21:
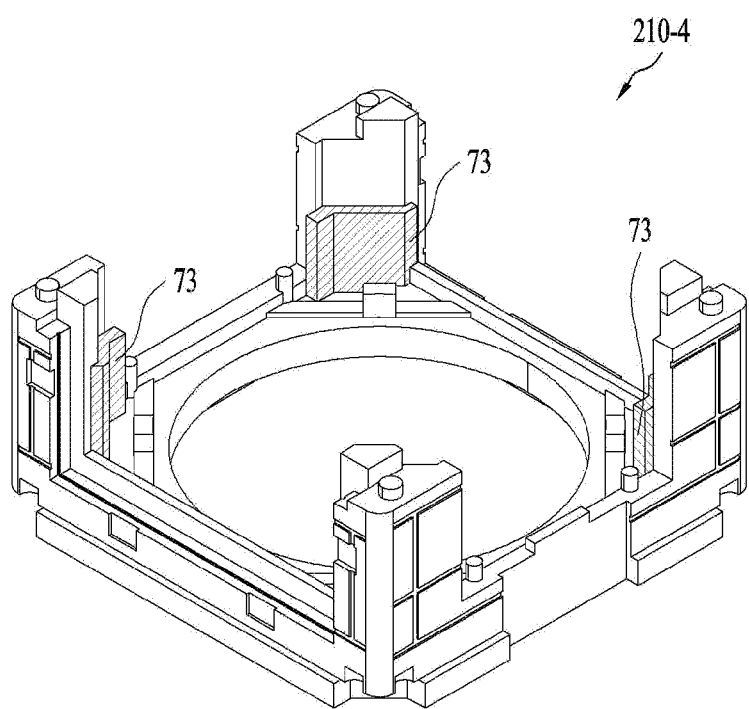
FIG. 21 is a perspective view of a base according to a further embodiment.
Figure 22:
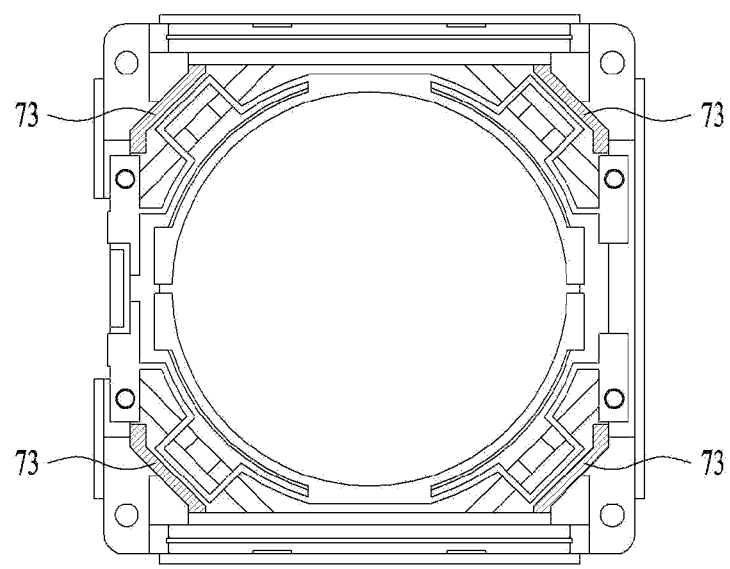
FIG. 22 is a plan view of the base shown in FIG. 21.

FIG. 21 is a perspective view of a base 210-4 according to a further embodiment. FIG. 22 is a plan view of the base 210-4 shown in FIG. 21.

The base 210-4 shown in FIGS. 21 and 22 is another modification of the base 210-2 shown in FIG. 17A. Each of the projections 73 of the base 210-4 may be disposed on the side surface 92d, the side surface 92e and the side surface 92c of a corresponding one of the posts 216a to 216d. The projection 73 may have a portion which is positioned on the second stepped portion 25b of the post.

For example, the projection 73 may include a first portion disposed at the side surface 92d of a corresponding one of the posts 216a to 216d, a second portion disposed at the side surface 92e of the post, and a third portion disposed at the side surface 92c of the post.

The second portion of the projection 73 may be bent from one end of the first portion of the projection 73, and the third portion of the projection 73 may be bent from the other end of the first portion of the projection 73.

For example, the transverse length of the first portion of the projection 73 may be equal to the transverse length of the side surface 92d of each of the posts 216a to 216d.

Based on the upper surface of the body 213 of the base 210-4, the height of the projections 73 may be larger than the height of the projections 25c of the base 210-4 but may be smaller than the height of the upper surfaces of the posts 216a to 216d.

For example, based on the upper surface of the body 213 of the base 210-4, the height of the projections 73 may be larger than the height of the second protrusions 21 and the height of the first stoppers 23.

At the initial position of the bobbin 110, the projections 73 may overlap the coil 120 in a direction perpendicular to the optical axis.

Figure 23:
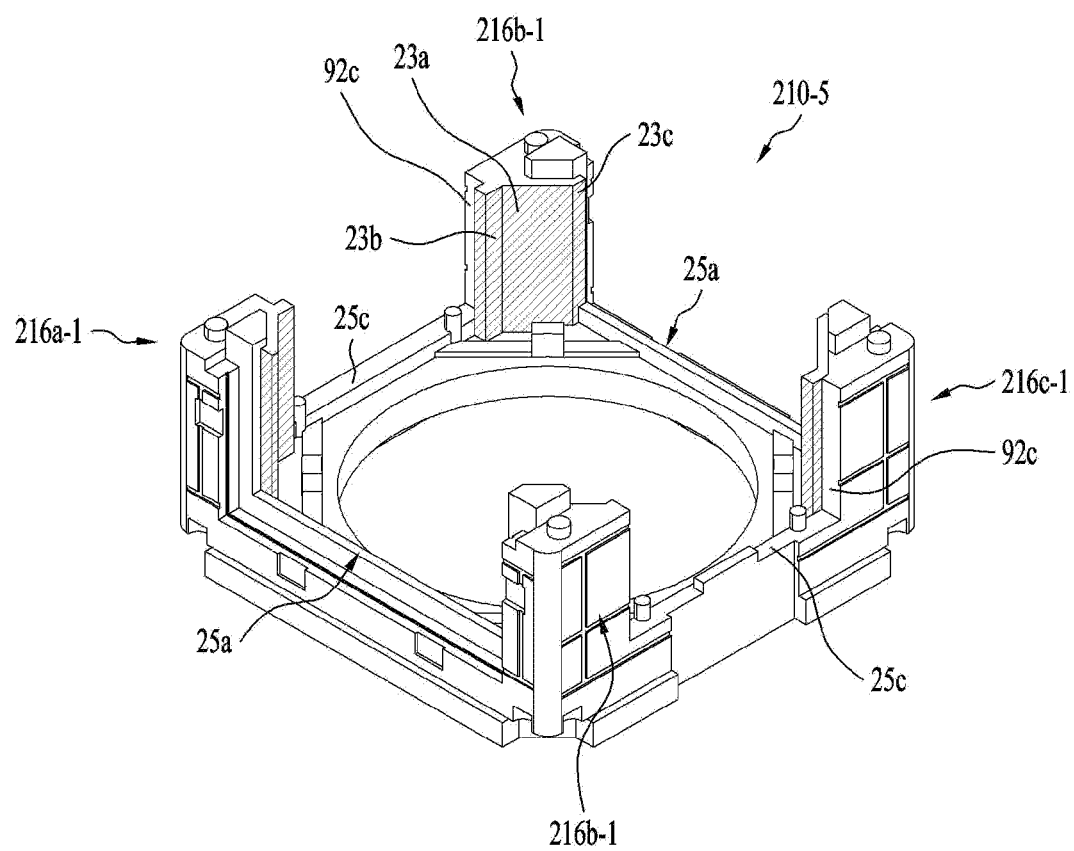
FIG. 23 is a perspective view of a base according to a further embodiment.

FIG. 23 is a perspective view of a base 210-5 according to a further embodiment.

The base 210-5 shown in FIG. 23 may be a modification of the base 210-4 shown in FIG. 21.

The base 210-5 may include a body including an opening and first to fourth corner sections positioned around the opening, a first post 216a-1 disposed at the first corner section, a second post 216b-1 disposed at the second corner section, a third post 216c-1 disposed at the third corner section and a fourth post 216d-1 disposed at the fourth corner section. The descriptions regarding to the body of the base 210-2 may be applied to the body of the base 210-5.

At least one of the first to fourth posts 216a-1 to 216d-1 may include a first side surface 23a, which faces the first outer surface of the bobbin 110, and a second side surface 23b, which is bent from one end of the first side surface 23a.

At least one of the posts may further include a third side surface 23c, which is bent from the other end of the first side surface 23a.

The second side surface 23b may extend in a direction parallel to or opposite a direction toward the fourth post 216d-1 from the first post 216a-1.

For example, the second side surface 23b may project from the side surface 92c of at least one post. The side surface of the post may be one of the side surfaces of the first post 216a-1 and the fourth post 216d-1, which face each other, and the side surfaces of the second post 216b-1 and the third post 216c-1, which face each other.

The side surface 23b of at least one post may extend so as to face the second outer surface of the bobbin 110.

The first outer surface of the bobbin 110 may be the outer surface of the bobbin 110 that faces at least one post or the outer surface of the first side section 110b-1 of the bobbin 110.

The second outer surface of the bobbin 110 may be the outer surface that abuts the first outer surface of the bobbin 110 and that is parallel to a direction toward the fourth post 216d-1 from the first post 216a-1.

The transverse length of the second side surface 23b may be smaller than the transverse length of the first side surface 23a.

At the initial position of the bobbin 110, the first side surface 23a of at least one post may overlap the coil 120 in a direction toward the second corner section 216b-1 from the first corner section 216a-1, and may overlap the coil 120 in a direction toward the fourth corner section 216d-1 from the first corner section 216a-1.

The outer surfaces of the posts 216a to 216d of each of the bases 210-2 to 210-5 and the outer surfaces of the side sections 218a to 218d of the body 213 and the inner surfaces of the side plates of the cover member 300 may be bonded or secured to each other by means of an adhesive member, for example, UV-bondable member.

The outer surfaces of the posts 216a to 216d of each of the bases 210-2 to 210-5 and the outer surfaces of the side sections 218a to 218d of the body 213 may have guide grooves 61, configured to allow the adhesive member to be easily and uniformly applied, formed therein.

Each of the guide grooves 61 may include a first guide groove 61a, which extends horizontally, and a second guide groove 61b, which extends vertically. The first guide groove 61a and the second guide groove 61b may abut each other, and may each have a stripe shape.

For example, the first guide groove 61a may include two or more linear grooves, which are spaced apart from each other and are parallel to each other.

For example, the second guide groove 61b may include two or more linear grooves, which are spaced apart from each other and are parallel to each other.

At least one of the first guide groove 61a and the second guide groove 61b may abut the adhesive injection recess 47b. The adhesive member, which is injected into the adhesive injection recesses 47b, may easily move to the side sections 218a and 218c of the body 213 of each of the bases 210-2 to 210-5 through the grooves 41a and 41b, thereby increasing the bonding force between the first and second magnets 130-1 and 130-2 and each of the bases 210-2 to 210-5.

Furthermore, the adhesive member, which is injected into the adhesive injection recesses 47b, may easily move to the outer surfaces of each of the bases 210-2 to 210-5 through the guide grooves 61, thereby increasing the bonding force between each of the bases 210-2 to 210-5 and the cover member 300.

The first projection, which corresponds to the first stepped portion 25a in FIGS. 1 to 23, may be described using the term "projection" because it projects from the upper surface of the body 213, and the second projection, which corresponds to the second stepped portion 25b, may be described using the term "projection" because it projects from the side surface 92a of the post. However, the disclosure is not limited thereto. In other words, the "projection" may alternatively be the term "groove portion". For example, a first grooved portion may be represented as being provided in the upper surface of the body 213 between the first post 216a and the second post 216b and between the third post 216c and the fourth post 216d, and a second grooved portion may be represented as being provided in the side surfaces of the posts 216a to 216d that face the first and second magnets 130-1 and 130-2.

Figure 24:
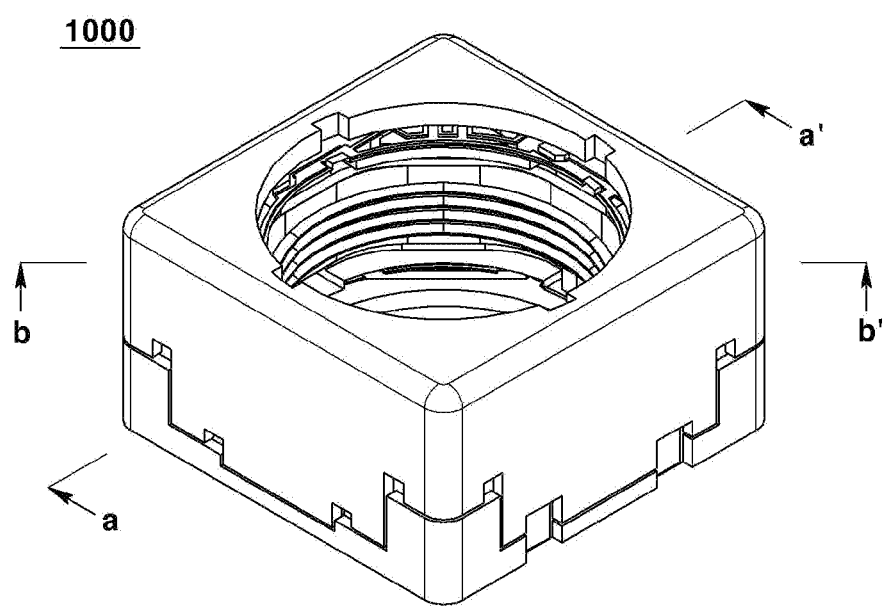
FIG. 24 is a perspective view of a lens moving apparatus according to a further embodiment.
Figure 25:
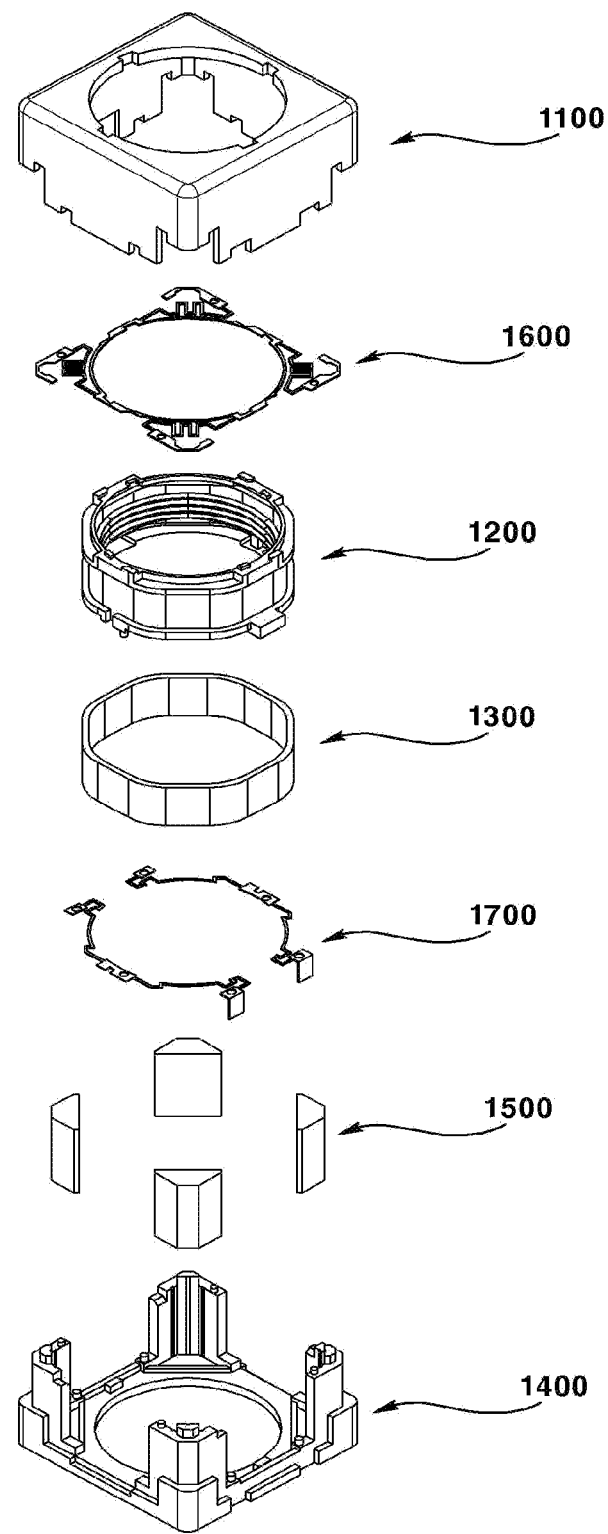
FIG. 25 is an exploded perspective view of the lens moving apparatus shown in FIG. 24.
Figure 26:
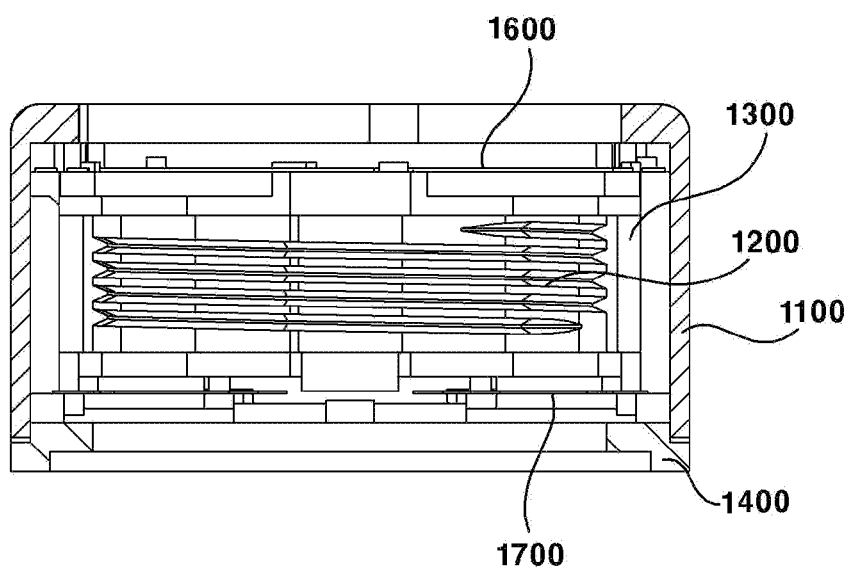
FIG. 26 is a cross-sectional view of the lens moving apparatus shown in FIG. 24, which is taken along line a-a'.
Figure 27:
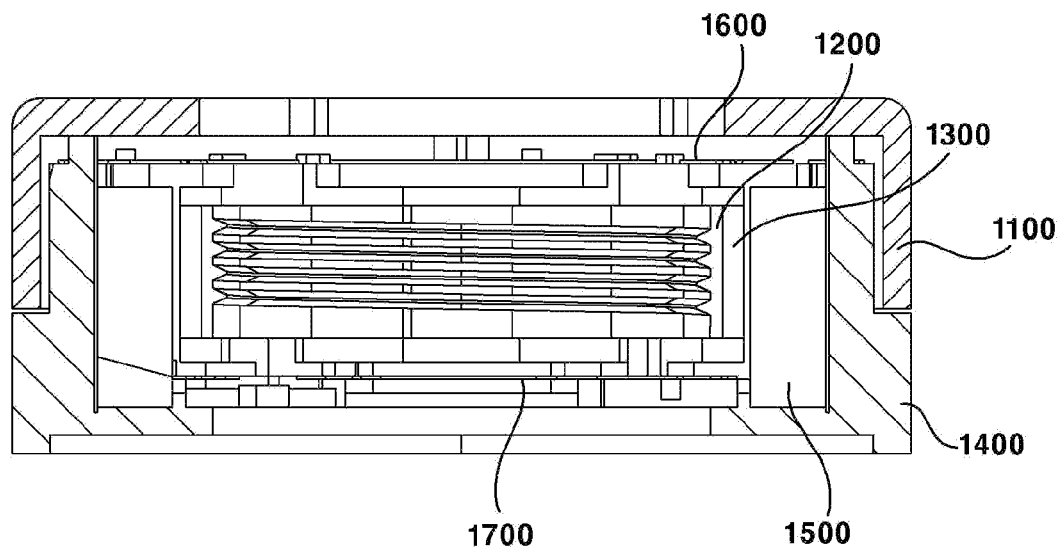
FIG. 27 is a cross-sectional view of the lens moving apparatus shown in FIG. 24, which is taken along line b-b'.
Figure 28:
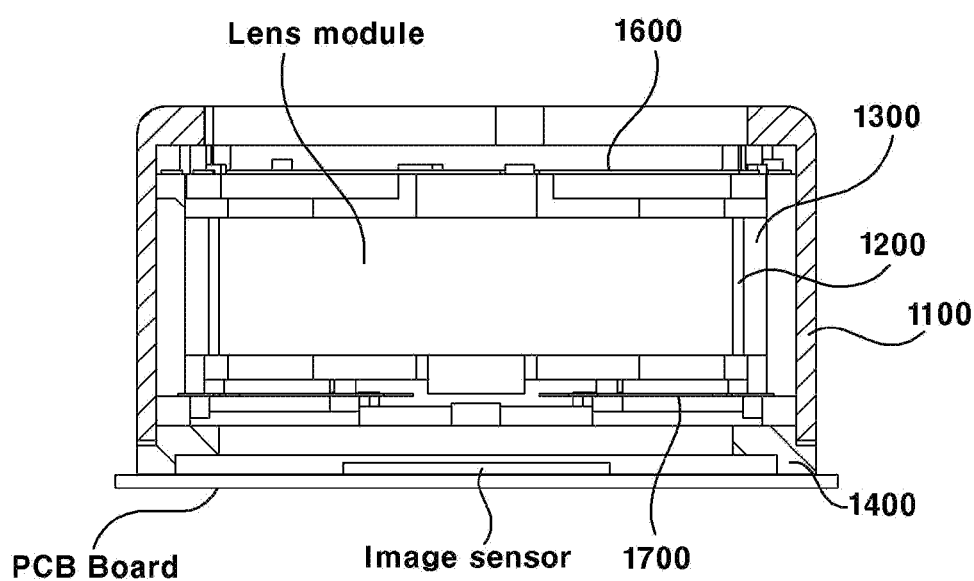
FIG. 28 is a cross-sectional view of the camera module seen in FIG. 26 according to an embodiment.
Figure 29:
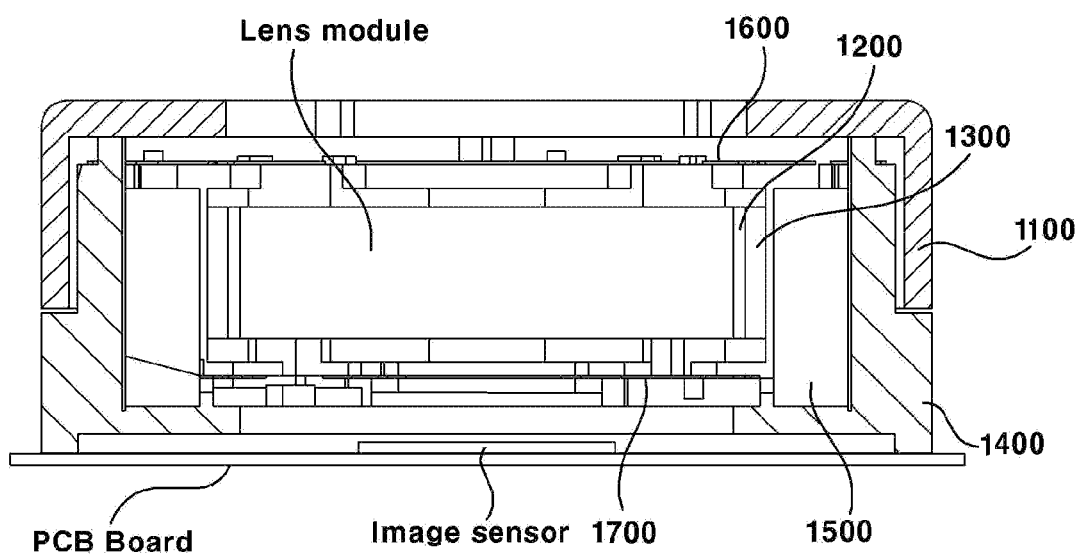
FIG. 29 is a cross-sectional view of the camera module seen in FIG. 27 according to an embodiment.
Figure 30:
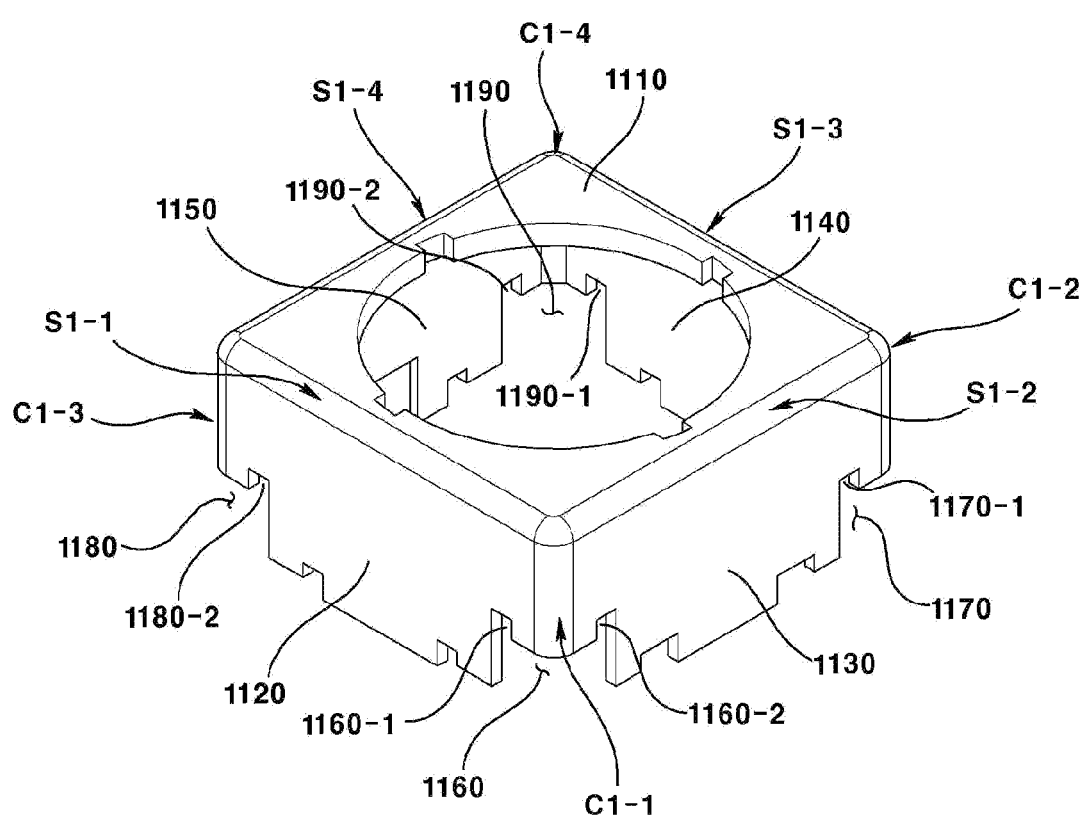
FIG. 30 is a perspective view of a cover of the lens moving apparatus.
Figure 31:
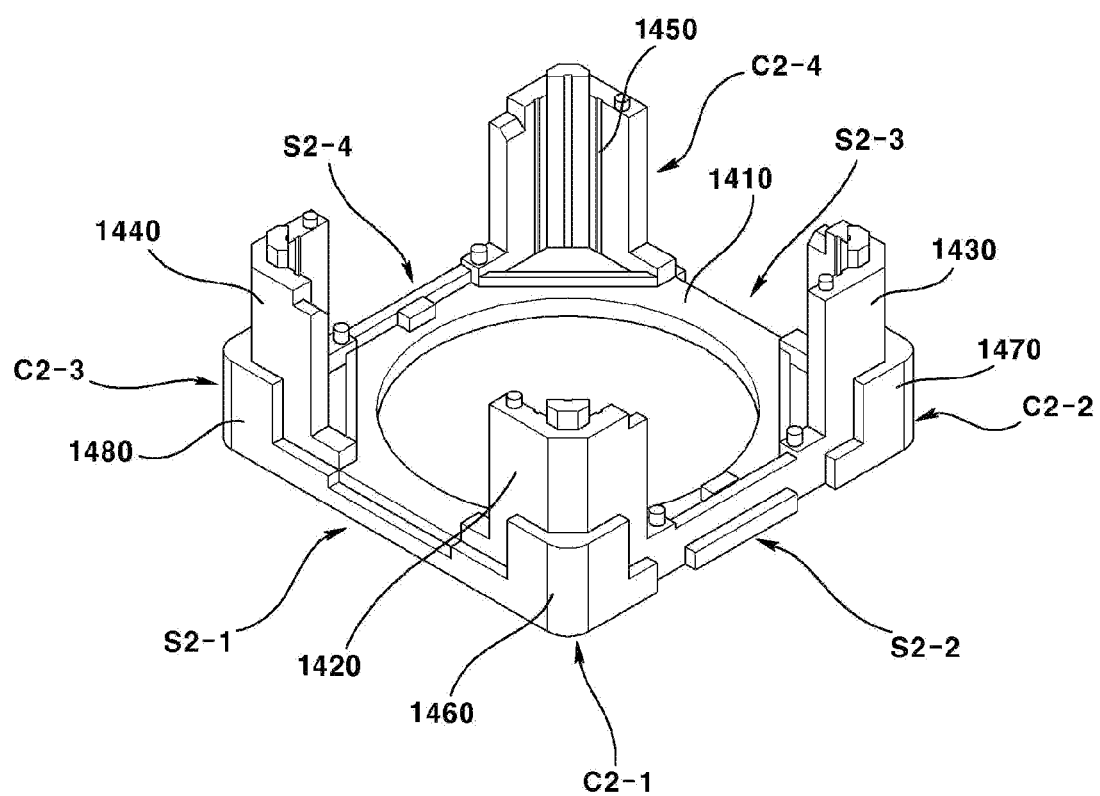
FIG. 31 is a perspective view of a base of the lens moving apparatus.
Figure 32:
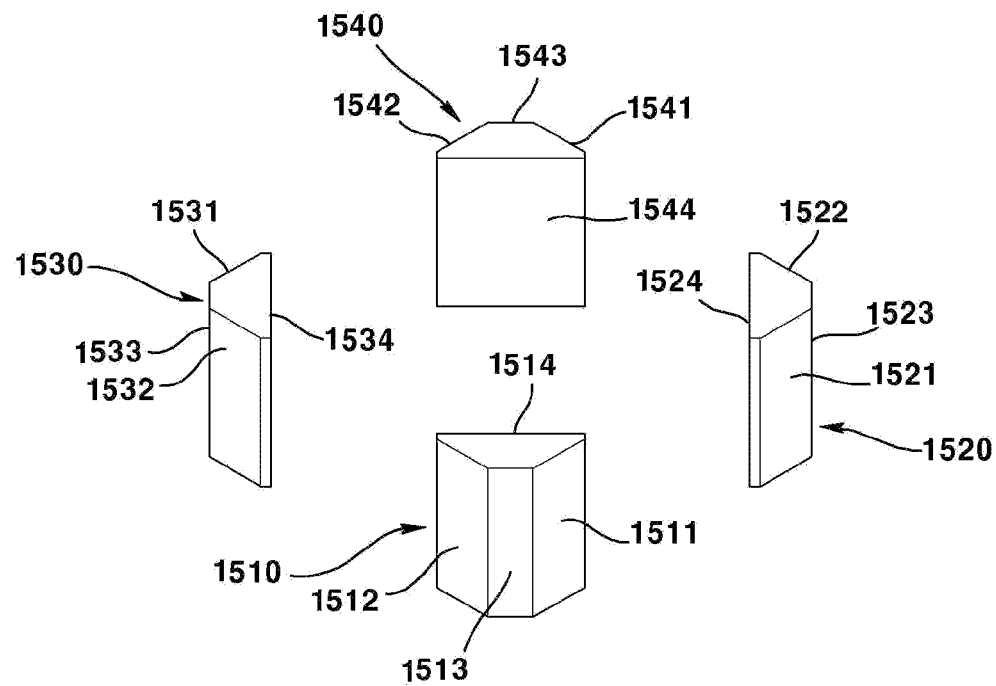
FIG. 32 is an exploded perspective view of the base of a magnet of the lens moving apparatus.
Figure 32:
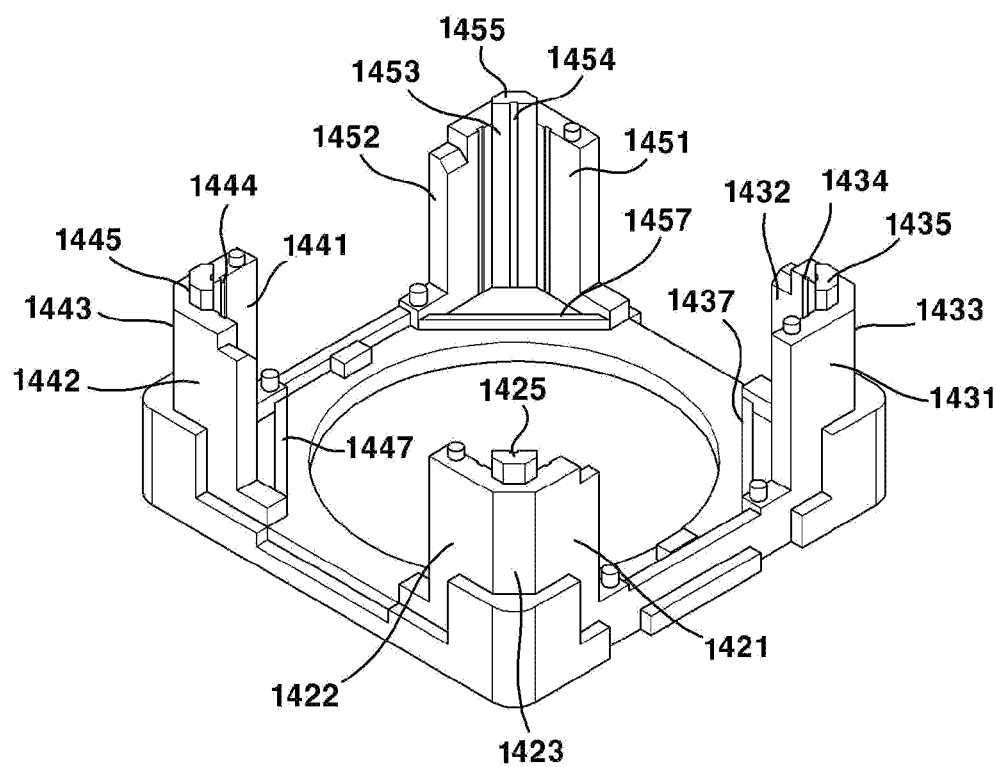
Figure 33:
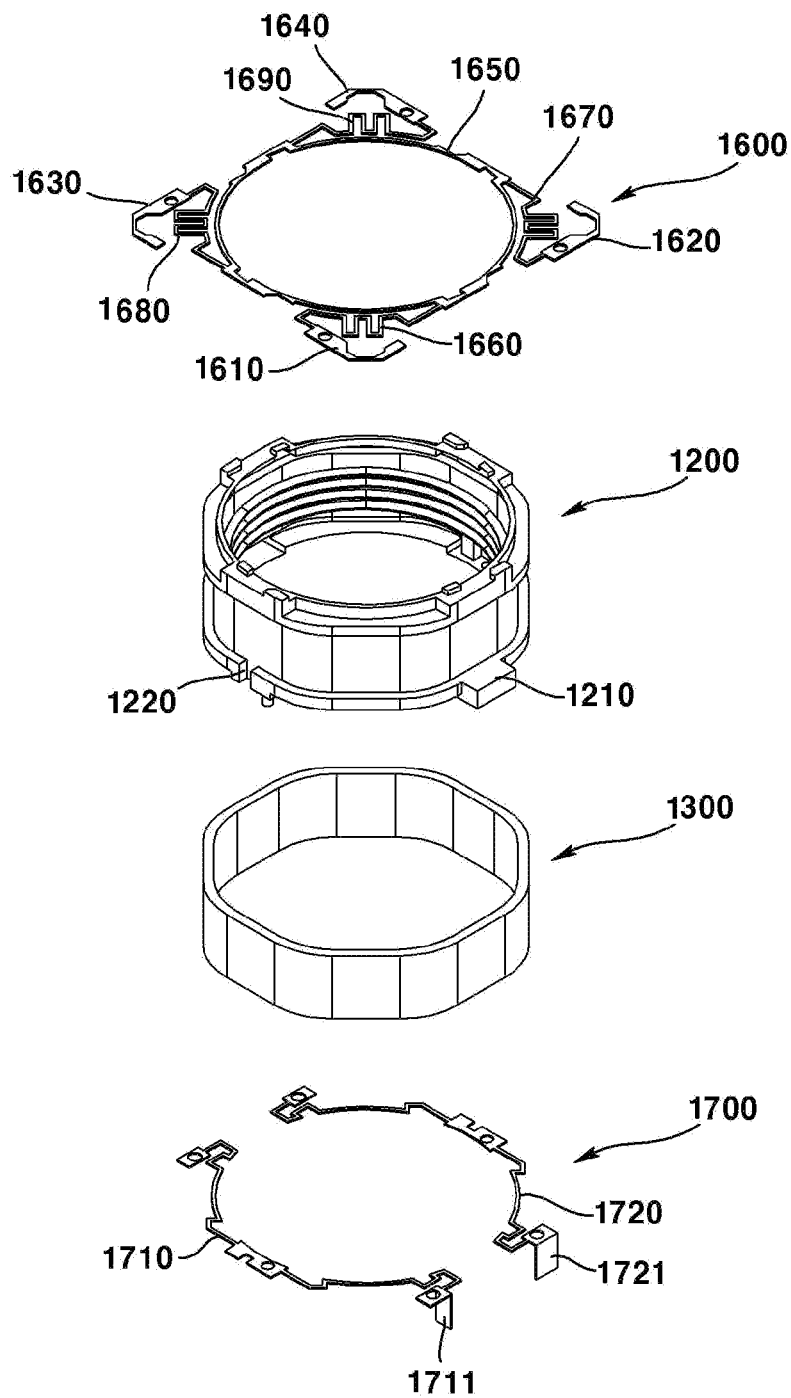
FIG. 33 is an exploded perspective view of a bobbin, a coil, an upper elastic member and a lower elastic member of the lens moving apparatus.

FIG. 24 is a perspective view of a lens moving apparatus 1000 according to a further embodiment. FIG. 25 is an exploded perspective view of the lens moving apparatus 1000 shown in FIG. 24. FIG. 26 is a cross-sectional view of the lens moving apparatus 1000 shown in FIG. 24, which is taken along line a-a'. FIG. 27 is a cross-sectional view of the lens moving apparatus 1000 shown in FIG. 24, which is taken along line b-b'. FIG. 28 is a cross-sectional view of the camera module seen in FIG. 26 according to an embodiment. FIG. 29 is a cross-sectional view of the camera module seen in FIG. 27 according to an embodiment. FIG. 30 is a perspective view of a cover 1100 of the lens moving apparatus 1000. FIG. 31 is a perspective view of a base 1400 of the lens moving apparatus 1000. FIG. 32 is an exploded perspective view of the base 1400 of a magnet 1500 of the lens moving apparatus 1000. FIG. 33 is an exploded perspective view of a bobbin 1200, a coil 1300, an upper elastic member 1600 and a lower elastic member 1700 of the lens moving apparatus 1000.

In the lens moving apparatus 1000, the bobbin 1200 may be elastically supported by the base 1400 in an up-and-down direction, and the bobbin 1200 may be moved in an up-and-down direction by electromagnetic interaction between a first driving unit 1300 disposed at the bobbin 1200 and a second driving unit 1500 disposed at the base 1400. Here, the lens module may be moved in an up-and-down direction (in the optical-axis direction) in conjunction with the bobbin 1200. As a result, an AF function may be performed.

The lens moving apparatus 1000 may include the cover 1100, the bobbin 1200, the first driving unit 1300, the base 1400, the second driving unit 1500, the upper elastic member 1600 and the lower elastic member 1700.

The first driving unit 1300 may be a "magnet" or a "coil" depending on the electromagnetic design condition. The second driving unit 1500 may be a "magnet" or a "coil" depending on the electromagnetic design conditions. If the first driving unit 1300 is a "magnet", the second driving unit 1500 may be a "coil". If the first driving unit 1300 is a "coil", the second driving unit 1500 may be a "magnet". Accordingly, although there are two cases, the following description will be given assuming that the first driving unit 1300 is the "coil 1300" and the second driving unit 1500 is the "magnet 1500". In the other case, the first driving unit may be a "magnet" and the second driving unit may be a "coil".

The cover 1100 may be an exterior member for the lens moving apparatus 1000. The base 1400 may be disposed below the cover 1100. The cover 1100 may be coupled to the base so as to define an internal space therebetween. The bobbin 1200, the coil 1300, the magnet 1500, the upper elastic member 1600 and the lower elastic member 1700 may be disposed in the cover 1100.

The cover 1100 may include a metal material. The cover 1100 may block the introduction of electromagnetic waves to the inside thereof from the outside thereof or the radiation of electromagnetic waves to the outside thereof from the inside thereof. Accordingly, the cover 1100 may be referred to as a "cover member" or a "shield can". However, the material of the cover 1100 is not limited thereto. In an example, the cover 110 may include a plastic material.

The cover may include a top plate 1110, a first side plate 1120, a second side plate 1130, a third side plate 1140, a fourth side plate 1150, a first corner portion C1-1, a second corner portion C1-2, a third corner portion C1-3 and a fourth corner portion C1-4. The top plate 1110, the first side plate 1120, the second side plate 1130, the third side plate 1140, the fourth side plate 1150, the first corner portion C1-1, the second corner portion C1-2, the third corner portion C1-3 and the fourth corner portion C1-4 of the cover 1100 may be integrally formed.

The top plate 1110 of the cover 1100 may be configured to have the form of a square plate with rounded corners. A hole may be formed in the center of the top plate 1110 so as to be aligned with the optical axis. The top plate 1110 may include a first side edge S1-1, a second side edge S1-2, a third side edge S1-3 and a fourth side edge S1-4.

The first side plate 1120, the second side plate 1130, the third side plate 1140 and the fourth side plate 1150 may extend downwards from the top plate 1110.

The first side plate 1120 may be curved or bent at the first side edge S1-1 and may extend downwards therefrom. The second side plate 1130 may be curved or bent at the second side edge S1-2 and may extend downwards therefrom. The third side plate 1140 may be curved or bent at the third side edge S1-3 and may extend downwards therefrom. The fourth side plate 1150 may be curved or bent at the fourth side edge S1-4 and may extend downwards therefrom.

Consequently, the cover 1100 may be configured to have the form of a rectangular parallelepiped in which the upper surface has a hole, the lower surface is open and the corners are rounded. The lower opening in the cover 1100 may be closed by the base 1400.

Each of the first side plate 1120, the second side plate 1130, the third side plate 1140 and the fourth side plate 1150 may have the approximate form of a rectangular plate. The first side plate 1120 faces the third side plate 1140 so as to be parallel thereto. The second side plate 1130 faces the fourth side plate 1150 so as to be parallel to each other. The second side plate 1130 and the fourth side plate 1150 may be disposed between the first side plate 1120 and the third side plate 1140, or vice versa.

The first side plate 1120 may be disposed at one side of the first corner portion C1-1. The second side plate 1130 may be disposed at the other side of the first corner portion C1-1. The first corner portion C1-1 may be disposed between the first side plate 1120 and the second side plate 1130.

The second side plate 1130 may be disposed at one side of the second corner portion C1-2. The third side plate 1140 may be disposed at the other side of the second corner portion C1-2. The second corner portion C1-2 may be disposed between the second side plate 1130 and the third side plate 1140.

The third side plate 1140 may be disposed at one side of the fourth corner portion C1-4. The fourth side plate 1150 may be disposed at the other side of the fourth corner portion C1-4. The fourth corner portion C1-4 may be disposed between the third side plate 1140 and the fourth side plate 1150.

The fourth side plate 1150 may be disposed at one side of the third corner portion C1-3. The first side plate 1120 may be disposed at the other side of the third corner portion C1-3. The third corner portion C1-3 may be disposed between the fourth side plate 1150 and the first side plate 1120.

The cover 1100 may include a first groove 1160. The first groove 1160 may be formed in the lower surfaces of the first side plate 1120, the first corner portion C1-1 and the second side plate 1130 so as to be depressed upwards. A first support 1460 of the base 1400 may be disposed in the first groove 1160. Here, the lower surface of the first side plate 1120, the lower surface of the first corner portion C1-1 and the lower surface of the second side plate 1130, which are formed by the first groove 1160, may be in contact with or may be coupled to the upper surface of the first support 1460.

The first groove 1160 may include a first-of-first groove 1160-1 and a second-of-first groove 1160-2. The first-of-first groove 1160-1 may be positioned at the first side plate 1120, and the second-of-first groove 1160-2 may be positioned at the second side plate 1130. The first-of-first groove 1160-1 may be formed so as to extend upwards from at least a portion of the lower surface of the first side plate 1120 that is formed by the first groove 1160. The second-of-first groove 1160-2 may be formed so as to extend upwards from at least a portion of the lower surface of the second side plate 1130 that is formed by the first groove 1160. An adhesive may be applied to the first-of-first groove 1160-1 and the second-of-first groove 1160-2.

The cover 1100 may include a second groove 1170. The second groove 1170 may be formed in the lower surfaces of the second side plate 1130, the second corner portion C1-2 and the third side plate 1140 so as to be depressed upwards. A second support 1470 of the base 1400 may be disposed in the second groove 1170. Here, the lower surface of the second side plate 1130, the lower surface of the second corner portion C1-2 and the lower surface of the third side plate 1140, which are formed by the second groove 1170, may be in contact with or may be coupled to the upper surface of the second support 1470.

The second groove 1170 may include a first-of-second groove 1170-1 and a second-of-second groove (not shown). The first-of-second groove 1170-1 may be positioned at the second side plate 1130, and the second-of-second groove may be positioned at the third side plate 1140. The first-of-second groove 1170-1 may be formed so as to extend upwards from at least a portion of the lower surface of the second side plate 1130 that is formed by the second groove 1170. The second-of-second groove may be formed so as to extend upwards from at least a portion of the lower surface of the third side plate 1140 that is formed by the second groove 1170. An adhesive may be applied to the first-of-second groove 1170-1 and the second-of-second groove.

The cover 1100 may include a third groove 1180. The third groove 1180 may be formed in the lower surfaces of the first side plate 1120, the third corner portion C1-3 and the fourth side plate 1150 so as to be depressed upwards. A third support 1480 of the base 1400 may be disposed in the third groove 1180. Here, the lower surface of the first side plate 1120, the lower surface of the third corner portion C1-3 and the lower surface of the fourth side plate 1150, which are formed by the third groove 1180, may be in contact with or may be coupled to the upper surface of the third support 1480.

The third groove 1180 may include a first-of-third groove (not shown) and a second-of-third groove 1180-2. The first-of-third groove may be positioned at the fourth side plate 1150, and the second-of-third groove may be positioned at the first side plate 1120. The first-of-third groove may be formed so as to extend upwards from at least a portion of the lower surface of the fourth side plate 1150 that is formed by the third groove 1180. The second-of-third groove 1180-2 may be formed so as to extend upwards from at least a portion of the lower surface of the first side plate 1120 that is formed by the third groove 1180. An adhesive may be applied to the first-of-third groove and the second-of-third groove 1180-2.

The cover 1100 may include a fourth groove 1190. The fourth groove 1190 may be formed in the lower surfaces of the third side plate 1140, the fourth corner portion C1-4 and the fourth side plate 1150 so as to be depressed upwards. A fourth support of the base 1400 may be disposed in the fourth groove 1190. Here, the lower surface of the third side plate 1140, the lower surface of the fourth corner portion C1-4 and the lower surface of the fourth side plate 1150 that are formed by the fourth groove 1190 may be in contact with or may be coupled to the upper surface of the fourth support.

The fourth groove 1190 may include a first-of-fourth groove 1190-1 and a second-of-fourth groove 1190-2. The first-of-fourth groove 1190-1 may be positioned at the third side plate 1140, and the second-of-fourth groove 1190-2 may be positioned at the fourth side plate 1150. The first-of-fourth groove 1190-1 may be formed so as to extend upwards from at least a portion of the lower surface of the third side plate 1140 that is formed by the fourth groove 1190. The second-of-fourth groove 1190-2 may be formed so as to extend upwards from at least a portion of the lower surface of the fourth side plate 1150 that is formed by the fourth groove 1190. An adhesive may be applied to the first-of-fourth groove 1190-1 and the second-of-fourth groove 1190-2.

In a modification (not shown), the cover 1100 may have the form of a cylinder. Here, the first corner portion C1-1, the second corner portion C1-2, the third corner portion C1-3 and the fourth corner portion C1-4 may be four specific points, which are circumferentially spaced apart from one another, and the first side plate 1120, the second side plate 1130, the third side plate 1140 and the fourth side plate 1150 may be four side plates, which are respectively disposed among the first corner portion C1-1, the second corner portion C1-2, the third corner portion C1-3 and the fourth corner portion C1-4.

The bobbin 1200 may be disposed inside the body of an optical device. The bobbin 1200 may be disposed in the cover 1100 and the base 1400. The lens module may be disposed in the bobbin 1200. The bobbin 1200 and the lens module may be coupled to each other, and the lens module may be moved in conjunction with the bobbin 1200 when the bobbin 1200 is moved. The upper elastic member 1600 may be disposed above the bobbin 120. The lower elastic member 1700 may be disposed below the bobbin 1200. The bobbin 1200 may be elastically supported by the base 1400 in an up-and-down direction (in the optical-axis direction) by means of the upper elastic member 1600 and the lower elastic member 1700.

The coil 1300 may be disposed on the outer peripheral surface of the bobbin 1200. The coil 1300 may have the form of a "coil block". The coil 1300 may be an "electromagnet". The coil 1300 may electromagnetically interact with the magnet 1500 to provide driving force for the bobbin 1200. One end and the other end of the coil 1300 may be exposed from the bobbin.

The coil 1300 may be disposed so as to face or be aligned with the magnet 1500. The coil 1300 may electromagnetically interact with the magnet 1500. When current is applied to the coil 1300, the magnet 1500 may electromagnetically interact with the magnet 1500 to generate electromagnetic force.

The coil 1300 may be conductively connected to the lower elastic member 1700. One end of the coil 1300 may be conductively connected to a first lower elastic member 1710. The other end of the coil 1300 may be conductively connected to a second lower elastic member 1720. The coil 1300 may receive current from the lower elastic member 1700 to generate electromagnetic force. As a result, the bobbin 1200 may be driven in the vertical direction (in the optical-axis direction) so as to perform an "AF function".

The base 1400 may be an exterior member for the lens moving apparatus 1000. The cover 1100 may be disposed above the base 1400. The base 1400 may be coupled to the cover 1100 so as to define an internal space therebetween. the bobbin 1200, the coil 1300, the magnet 1500, the upper elastic member 1600 and the lower elastic member 1700 may be disposed inside the base 1400. The base 1400 may be an injection-molded plastic component.

The base may include a body 1410, a first projection 1420, a second projection 1430, a third projection 1440, a fourth projection 1450, a first support 1460, a second support 1470, a third support 1480 and a fourth support (not shown).

The body 1410 may have the form of a square plate in which a hole is centrally formed in the optical-axis direction. The body 1410 may include a first side edge s2-1, a second side edge s2-2, a third side edge s2-3, a fourth side edge s2-4, a first corner portion C2-1, a second corner portion C2-2, a third corner portion C2-3 and a fourth corner portion C2-4.

The first side edge S2-1 may be positioned so as to correspond to (face or overlap) the first side plate 1120 in the vertical direction, and the second side edge S2-2 may be positioned so as to correspond to (face or overlap) the second side plate 1130 in the vertical direction. The third side edge S3-3 may be positioned so as to correspond to (face or overlap) the third side plate 1140 in the vertical direction, and the fourth side edge S2-4 may be positioned so as to correspond to (face or overlap) the fourth side plate 1150 in the vertical direction. The first corner portion C2-1 may be positioned so as to correspond to (face or overlap) the first corner portion C1-1 of the cover 1100, and the second corner portion C2-2 may be positioned so as to correspond to (face or overlap) the second corner portion C1-2 of the cover 1100 in the vertical direction. The third corner portion C2-3 may be positioned so as to correspond to (face or overlap) the third corner portion C1-3 of the cover 1100 in the vertical direction, and the fourth corner portion C2-4 may be positioned so as to correspond (face or overlap) the fourth corner portion C1-4 of the cover 1100 in the vertical direction.

The first corner portion C2-1 of the base 1400 may be positioned adjacent to the second corner portion C2-2 and the third corner portion C2-3 of the base 1400. The second corner portion C2-2 of the base 1400 may be positioned adjacent to the first corner portion C2-1 and the fourth corner portion C2-4 of the base 1400. The third corner portion C2-3 of the base 1400 may be positioned adjacent to the first corner portion C2-1 and the fourth corner portion C2-4 of the base 1400. The fourth corner portion C2-4 of the base 1400 may be positioned adjacent to the second corner portion C2-2 and the third corner portion C2-3 of the base 1400.

The fourth corner portion C2-4 of the base 1400 may be positioned opposite the first corner portion C2-1 of the base 1400. The second corner portion C2-2 of the base 1400 may be positioned opposite the third corner portion C2-3 of the base 1400.

The first side edge S2-1 of the base 1400 may be positioned between the first corner portion C2-1 and the third corner portion C2-3 of the base 1400. The first side edge S2-1 of the base 1400 may connect the first corner portion C2-1 of the base 1400 to the third corner portion C2-3 of the base 1400.

The second side edge S2-2 of the base 1400 may be positioned between the first corner portion C2-1 and the second corner portion C2-2 of the base 1400. The second side edge S2-2 of the base 1400 may connect the first corner portion C2-1 of the base 1400 to the second corner portion C2-2 of the base 1400.

The third side edge S2-3 of the base 1400 may be positioned between the second corner portion C2-2 and the fourth corner portion C2-4 of the base 1400. The third side edge S2-3 of the base 1400 may connect the second corner portion C2-2 of the base 1400 to the fourth corner portion C2-4 of the base 1400.

The fourth side edge S2-4 of the base 1400 may be positioned between the third corner portion C2-3 and the fourth corner portion C2-4 of the base 1400. The fourth side edge S2-4 of the base 1400 may connect the third corner portion C2-3 of the base 1400 to the fourth corner portion C2-4 of the base 1400.

When the cover 1100 is coupled to the base 1400, the upper surface of the first side edge S2-1 and the lower surface of the first side plate 1120 may be in contact with or coupled to each other, the upper surface of the second side edge S2-2 and the lower surface of the second side plate 1130 may be in contact with or coupled to each other, the upper surface of the third side edge S2-3 and the lower surface of the third side plate 1140 may be in contact with or coupled to each other, and the upper surface of the fourth side edge S2-4 and the lower surface of the fourth side plate 1150 may be in contact with or coupled to each other.

An adhesive may be applied to the contact areas between the side edges S2-1, S2-2, S2-3 and S2-4 of the base 1400 and the side plate 1120, 1130, 1140 and 1150 of the cover 1100.

The first projection 1420, the second projection 1430, the third projection 1440 and the fourth projection 1450 may project upwards from the body 410. The first projection 1420 and the first support 1460 may be positioned at the first corner portion C2-1 of the base 1400. The second projection 1430 and the second support 1470 may be positioned at the second corner portion C2-2. The third projection 1440 and the third support 1480 may be positioned at the third corner portion C2-3. The fourth projection 1450 and the fourth support (not shown) may be positioned at the fourth corner portion C2-4.

Here, the first projection 1420 may be positioned inside the first support 1460, and the second projection 1430 may be positioned inside the second support 1470. The third projection 1440 may be positioned inside the third support 1480, and the fourth projection 1450 may be positioned inside the fourth support.

The first support 1460 may be positioned outside the first projection 1420, and the second support 1470 may be positioned outside the second projection 1430. The third support 1480 may be positioned outside the third projection 1440, and the fourth support may be positioned outside the fourth projection 1450.

In other words, the plurality of projections 1420, 1430, 1440 and 1450 of the base 1400 may be positioned closer to the central vertical axis of the base 1400 than the plurality of supports 1460, 1470 and 1480 of the base 1400. Furthermore, the plurality of supports 1460, 1470 and 1480 of the base 1400 may be positioned farther from the central vertical axis of the base 1400 than the plurality of projections 1420, 1420, 1440 and 1450 of the base 1400.

The vertical length (height) of the first projection 1420, the second projection 1430, the third projection 1440 and the fourth projection 1450 may be larger than the vertical length (height) of the first support 1460, the second support 1470, the third support 1480 and the fourth support.

Specifically, the plurality of projections 1420, 1430, 1440 and 1450 of the base 1400 may be formed so as to be higher than the plurality of supports 1460, 1470 and 1480 of the base 1400.

The first projection 1420 may be provided with a first magnet 1510. The second projection 1430 may be provided with a second magnet 1520. The third projection 1440 may be provided with a third magnet 1530. The fourth projection 1450 may be provided with a fourth magnet 1540.

The first projection 1420 may include a first-of-first side wall 1421 disposed along the first side edge S2-1 of the base 1400, a second-of-first side wall 1422 disposed along the second side edge S2-2 of the base 1400, a third-of-first side wall 1423 disposed between the first-of-first side wall 1421 and the second-of-first side wall 1422, at least one first groove (not shown), which is positioned at at least one of the first-of-first side wall 1421, the second-of-first side wall 1422 and the third-of-first side wall 1423 and which is formed vertically in the surface that faces the first magnet 1510, a first stroke protrusion 1425, which projects from the upper surface of the third-of-first side wall 1423 and is brought into contact at the upper surface thereof with the lower surface of the top plate 1110, and a first step (not shown), which projects upwards from the body 1410 and connects the lower end of the first-of-first side wall 1421 to the lower end of the second-of-first side wall 1422 in an oblique fashion.

The first-of-first side wall 1421 may extend toward the second corner portion C2-2 from the first corner portion C2-1 of the base 1400. The second-of-first side wall 1422 may extend toward the third corner portion C2-3 from the first corner portion C2-1 of the base 1400.

The first step may connect the lower portion of the first-of-first side wall 1421 to the lower portion of the second-of-first side wall 1422, and may be disposed so as to face the first magnet 1510. The vertical length (height) of the first step may be smaller than the vertical length (height) of the first-of-first side wall 1421, the second-of-first side wall 1422 and the third-of-first side wall 1423.

The first stroke protrusion 1425 may project upwards higher than the upper elastic member 1600. The first stroke protrusion 1425 may face the lower surface of the top plate 1110 of the cover 1100.

The second projection 1430 may include a first-of-second side wall 1421 disposed along the second side edge S2-2 of the base 1400, a second-of-second side wall 1432 disposed along the third side edge S2-3 of the base 1400, a third-of-second side wall 1433 disposed between the first-of-second side wall 1431 and the second-of-second side wall 1432, at least one second groove 1434, which is positioned at at least one of the first-of-second side wall 1431, the second-of-second side wall 1432 and the third-of-second side wall 1433 and which is formed in the optical-axis direction in the surface that faces the second magnet 1520, a second stroke protrusion 1435, which projects upwards from the upper surface of the third-of-second side wall 1433 and which is brought into contact at the upper end thereof with the lower surface of the top plate 1110, and a second step 1437, which projects upwards from the body 1410 and which connects the lower end of the first-of-second side wall 1431 and the lower end of the second-of-second side wall 1432 in an oblique fashion.

The first-of-second side wall 1431 may extend toward the first corner portion C2-1 of the base 1400 from the second corner portion C2-2 of the base 1400. The second-of-second side wall 1432 may extend toward the fourth corner portion C2-4 of base 1400 from the second corner portion C2-2 of the base 1400.

The second step 1437 may connect the lower portion of the first-of-second side wall 1431 to the lower portion of the second-of-second side wall 1432, and may be disposed so as to face the second magnet 1520. The vertical length (height) of the second step 1437 may be smaller than the vertical length (height) of the first-of-second side wall 1431, the second-of-second side wall 1432 and the third-of-second side wall 1433.

The second stroke protrusion 1435 may project upwards higher than the upper elastic member 1600. The second stroke protrusion 1435 may face the lower surface of the top plate 1110 of the cover 1100.

The third projection 1440 may include a first-of-third side wall 1441 disposed along the fourth side edge S2-4 of the base 1400, a second-of-third side wall 1442 disposed along the first side edge S3-1 of the base 1400, a third-of-third side wall 1443 disposed between the first-of-third side wall 1441 and the second-of-third side wall 1442, at least one third groove 1444, which is positioned at at least one of the first-of-third side wall 1441, the second-of-third side wall 1442 and third-of-third side wall 1443 and which is formed in the optical-axis direction in the surface that faces the third magnet 1530, a third stroke protrusion 1445, which projects upwards from the upper surface of the third-of-third side wall 1443 and which is brought into contact at the upper surface thereof with the lower surface of the top plate 1110, and a third step 1447, which projects upwards from the body 1410 and which connects the lower end of the first-of-third side wall 1441 to the lower end of the second-of-third side wall 1442 in an oblique fashion.

The first-of-third side wall 1441 may extend toward the fourth corner portion C2-4 of the base 1400 from the third corner portion C2-3 of the base 1400. The second-of-third side wall 1442 may extend toward the first corner portion C2-1 of the base 1400 from the third corner portion C2-3 of the base 1400.

The third step 1447 may connect the lower portion of the first-of-third side wall 1441 to the lower portion of the second-of-third side wall 1442, and may be disposed so as to face the third magnet 1530. The vertical length (height) of the third step 1447 may be smaller than the vertical length (height) of the first-of-third side wall 1441, the second-of-third side wall 1442 and the third-of-third side wall 1443.

The third stroke protrusion 1445 may project higher than the upper elastic member 1600. The third stroke protrusion 1445 may face the lower surface of the top plate 1110 of the cover 1100.

The fourth projection 1450 may include a first-of-fourth side wall 1451 disposed along the third side edge S2-3 of the base 1400, a second-of-fourth side wall 1452 disposed along the fourth side edge S2-4 of the base 1400, a third-of-fourth side wall 1453 disposed between the first-of-fourth side wall 1451 and the second-of-fourth side wall 1452, at least one fourth groove 1454, which is positioned at at least one of the first-of-fourth side wall 1451, the second-of-fourth side wall 1452 and the third-of-fourth side wall 1453 and which is formed in the optical-axis direction in the surface that faces the fourth magnet 1540, a fourth stroke protrusion 1455, which projects upwards from the upper surface of the third-of-fourth side wall 1453 and which is brought into contact at the upper surface thereof with the lower surface of the top plate 1110, and a fourth step 1457, which projects upwards from the body 1410 and which connects the lower end of the first-of-fourth side wall 1451 to the lower end of the second-of-fourth side wall 1452 in an oblique fashion.

The first-of-fourth side wall 1451 may extend toward the second corner portion C2-2 of the base 1400 from the fourth corner portion C2-4 of the base 1400. The second-of-fourth side wall 1452 may extend toward the third corner portion C2-3 from the fourth corner portion C2-4 of the base 1400.

The fourth step 1447 may connect the lower portion of the first-of-fourth side wall 1451 to the lower portion of the second-of-fourth side wall 1452, and may be disposed so as to face the fourth magnet 1540. The vertical length (height) of the fourth step 1457 may be smaller than the vertical length (height) of the first-of-fourth side wall 1451, the second-of-fourth side wall 1452 and the third-of-fourth side wall 1452.

The fourth stroke protrusion 1455 may project higher than the upper elastic member 1600. The fourth stroke protrusion 1455 may face the lower surface of the top plate 1110 of the cover 1100.

The magnet 1500 may be disposed at the base 1400. The magnet 1500 may face the coil 1300. The magnet 1500 may perform electromagnetic interaction with the coil 1300 to provide the bobbin 120 with driving force. The magnet 1500 may include the first magnet 1510, the second magnet 1520, the third magnet 1530 and the fourth magnet 1540. Each of the first magnet 1510, the second magnet 1520, the third magnet 1530 and the fourth magnet 1540 may be a "permanent magnet".

The first magnet 1510 may be disposed at the first projection 1420. The second magnet 1520 may be disposed at the second projection 1430. The third magnet 1530 may be disposed at the third projection 1440. The fourth magnet 1540 may be disposed at the fourth projection 1450.

The first magnet 1510 may include a first-of-first surface 1511, a second-of-first surface 1512, a third-of-first surface 1513 and a fourth-of-first surface 1514. The first-of-first surface 1511 may face the inner surface of the first-of-first side wall 421 of the first projection 1420. The first-of-first surface 1511 may be coupled to or may be in contact with the inner surface of the first-of-first side wall 421. The second-of-first surface 1512 may face the inner surface of the second-of-first side wall 422 of the first projection 1420. The second-of-first surface 1512 may be coupled to or may be in contact with the inner surface of the second-of-first side wall 422 of the first projection 1420. The third-of-first surface 1513 may face the inner surface of the third-of-first side wall 423 of the first projection 1420. The third-of-first surface 1513 may be coupled to or may be in contact with the inner surface of the third-of-first side wall 423 of the first projection 1420. When the first projection 1420 is coupled to the first magnet 1510, an adhesive may be applied to the first groove (not shown) of the first projection 1420. The fourth-of-first surface 1514 may face the outer surface of the coil 1300. The lower portion of the fourth-of-first surface 1514 may face the inner surface of the first step (not shown). The lower portion of the fourth-of-first surface 1514 may be coupled to or may be in contact with the inner surface of the first step.

The second magnet 1520 may include a first-of-second surface 1521, a second-of-second surface 1522, a third-of-second surface 1523 and a fourth-of-second surface 1524. The first-of-second surface 1521 may face the inner surface of the first-of-second side wall 431 of the second projection 1430. The first-of-second surface 1521 may be coupled to or may be in contact with the inner surface of the first-of-second side wall 1431. The second-of-second surface 1522 may face the inner surface of the second-of-second side wall 1432 of the second projection 1430. The second-of-second surface 1522 may be coupled to or may be in contact with the inner surface of the second-of-second side wall 1432 of the second projection 1430. The third-of-second surface 1523 may face the inner surface of the third-of-second side wall 1433 of the second projection 1430. The third-of-second surface 1523 may be coupled to or may be in contact with the inner surface of the third-of-second side wall 1433 of the second projection 1430. When the second projection 1430 is coupled to the second magnet 1520, an adhesive may be applied to the second groove 1432 in the second projection 1430. The fourth-of-second surface 1524 may face the outer surface of the coil 1300. The lower portion of the fourth-of-second surface 1524 may face the inner surface of the second step 1437. The lower portion of the fourth-of-second surface 1524 may be coupled to or may be in contact with the inner surface of the second step 1437.

The third magnet 1530 may include a first-of-third surface 1531, a second-of-third surface 1532, a third-of-third surface 1533 and a fourth-of-third surface 1534. The first-of-third surface 1531 may face the inner surface of the first-of-third side wall 1441 of the third projection 1440. The first-of-third surface 1531 may be coupled to or may be in contact with the inner surface of the first-of-third side wall 1441. The second-of-third surface 1532 may face the inner surface of the second-of-third side wall 1442 of the third projection 1440. The second-of-third surface 1532 may be coupled to or may be in contact with the inner surface of the second-of-third side wall 1442 of the third projection 1440. The third-of-third surface 1533 may face the inner surface of the third-of-third side wall 1443 of the third projection 1440. The third-of-third surface 1533 may be coupled to or may be in contact with the inner surface of the third-of-third side wall 1443 of the third projection 1440. When the third projection 1440 is coupled to the third magnet 1530, an adhesive may be applied to the third groove 1442 in the third projection 1440. The fourth-of-third surface 1534 may face the outer surface of the coil 1300. The lower portion of the fourth-of-third surface 1534 may face the inner surface of the third step 1447. The lower portion of the fourth-of-third surface 1534 may be coupled to or may be in contact with the inner surface of the third step 1447.

The fourth magnet 1540 may include a first-of-fourth surface 1541, a second-of-fourth surface 1542, a third-of-fourth surface 1543 and a fourth-of-fourth surface 1544. The first-of-fourth surface 1541 may face the inner surface of the first-of-fourth side wall 1451 of the fourth projection 1450. The first-of-fourth surface 1541 may be coupled to or may be in contact with the inner surface of the first-of-fourth side wall 1451. The second-of-fourth surface 1542 may face the inner surface of the second-of-fourth side wall 1452 of the fourth projection 1450. The second-of-fourth surface 1542 may be coupled to or may be in contact with the inner surface of the second-of-fourth side wall 1452 of the fourth projection 1450. The third-of-fourth surface 1543 may face the inner surface of the third-of-fourth side wall 1453 of the fourth projection 1450. The third-of-fourth surface 1543 may be coupled to or may be in contact with the inner surface of the third-of-fourth side wall 1453 of the fourth projection 1450. When the fourth projection 1450 is coupled to the fourth magnet 1540, an adhesive may be applied to the fourth groove 1454 in the fourth projection 1450. The fourth-of-fourth surface 1544 may face the outer surface of the coil 1300. The lower portion of the fourth-of-fourth surface 1544 may face the inner surface of the fourth step 1457. The lower portion of the fourth-of-fourth surface 1544 may be coupled to or may be in contact with the inner surface of the fourth step 1457.

The upper elastic member 1600 may be a plate spring. The upper elastic member 1600 may be a metal. The upper elastic member 1600 may be non-magnetic. Accordingly, the upper elastic member 1600 may not be affected by the magnetic force of the magnet 1500 or the electromagnetic force of the coil 1300.

The upper elastic member 1600 may be disposed above the base 1400. The upper elastic member 1600 may be disposed above the bobbin 1200. The upper elastic member 1600 may be coupled both to the base 1400 and to the bobbin 1200. The upper elastic member 1600 may elastically connect the base 1400 to the bobbin 1200. The upper elastic member 1600 may elastically support the bobbin 1200.

The upper elastic member 1600 may include a first upper elastic member 1610, a second upper elastic member 1620, a third upper elastic member 1630, a fourth upper elastic member 1640, a fifth upper elastic member 1650, a sixth upper elastic member 1660, a seventh upper elastic member 1670, an eighth upper elastic member 1680 and a ninth upper elastic member 1690.

The fifth upper elastic member 1650 may be disposed inside the first upper elastic member 1610, the second upper elastic member 1620, the third upper elastic member 1630 and the fourth upper elastic member 1640. The first upper elastic member 1610, the second upper elastic member 1620, the third upper elastic member 1630 and the fourth upper elastic member 1640 may be disposed outside the fifth upper elastic member 1650.

The sixth upper elastic member 1660 may connect the first upper elastic member 1610 to the fifth upper elastic member 1650. The seventh upper elastic member 1670 may connect the second upper elastic member 1620 to the fifth upper elastic member 1650. The eighth upper elastic member 1680 may connect the third upper elastic member 1630 to the fifth upper elastic member 1650. The ninth upper elastic member 1690 may connect the fourth upper elastic member 1640 to the fifth upper elastic member 1650.

The first upper elastic member 1610 may be disposed above the first projection 1420. The lower surface of the first upper elastic member 1610 may be coupled to or may be in contact with the upper surface of the first projection 1420. The second upper elastic member 1620 may be disposed above the second projection 1430. The lower surface of the second upper elastic member 1620 may be coupled to or may be in contact with the upper surface of the second projection 1430. The third upper elastic member 1630 may be disposed above the third projection 1440. The lower surface of the third upper elastic member 1630 may be coupled to or may be in contact with the upper surface of the third projection 1440. The fourth upper elastic member 1640 may be disposed above the fourth projection 1450. The lower surface of the fourth upper elastic member 1640 may be coupled to or may be in contact with the upper surface of the fourth projection 1450. The fifth upper elastic member 1650 may be disposed below the bobbin 1200. The upper surface of the fifth upper elastic member 1650 may be coupled to or may be in contact with the lower surface of the bobbin 1200.

The lower elastic member 1700 may be a plate spring. The lower elastic member 1700 may be a metal. The lower elastic member 1700 may be non-magnetic. Accordingly, the lower elastic member 1700 may not be affected by the magnetic force of the magnet 1130 or the electromagnetic force of the coil 1300. The lower elastic member 1700 may be conductively connected to the coil 1300. The lower elastic member 1700 may be conductively connected to the substrate of the camera module. The lower elastic member 1700 may conductively connect the coil 1300 and the substrate. Accordingly, it is possible to supply current to the coil 1300 through the lower elastic member 1700 from the substrate. Here, the direction, the wavelength, the intensity and the like of the current supplied to the coil 1300 may be controlled.

The lower elastic member 1700 may be disposed at the body 1410 of the base 1400. The lower elastic member 1700 may be disposed below the bobbin 1200. The lower elastic member 1700 may be coupled both to the base 1400 and to the bobbin 1200. The lower elastic member 1700 may elastically connect the base 1400 to the bobbin 1200. The lower elastic member 1700 may elastically support the bobbin 1200.

The lower elastic member 1700 may include the first lower elastic member 1710 and the second lower elastic member 1720. The first lower elastic member 1710 and the second lower elastic member 1720 may be spaced apart from each other. The first lower elastic member 1710 may be disposed below the bobbin 1200, and may be disposed above the bobbin 1410 of the base 1400. The upper surface of the first lower elastic member 1710 may be coupled to or may be in contact with the lower surface of the bobbin 1200 and the upper surface of the body 1410 of the base 1400. The second lower elastic member 1720 may be disposed below the bobbin 1200. The upper surface of the second lower elastic member 1720 may be coupled to or may be in contact with the lower surface of the bobbin 1200 and the upper surface of the body 1410 of the base 1400.

The first lower elastic member 1710 may be conductively connected to one leader line of the coil 1300. The second lower elastic member 1720 may be conductively connected to the other leader line of the coil 1300. The first lower elastic member 1710 may include a first terminal 1711. The first terminal 1711 may extend downwards from the first lower elastic member 1710. The first terminal 1711 may be conductively connected to the substrate of the camera module. The second lower elastic member 1720 may include a second terminal 1712. The second terminal 1712 may extend downwards from the second lower elastic member 1720. The second terminal 1712 may be conductively connected to the substrate of the camera module. The substrate, the first lower elastic member 1710, the coil 1300 and the second lower elastic member 1720 may define a single circuit. As a result, current may flow through the coil 1300.

Meanwhile, the lens moving apparatuses according to the above-described embodiments may be used in various fields, such as, for example, those of a camera module or an optical device.

For example, the lens moving apparatus 1000 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device or the like, the disclosure is not limited thereto. Furthermore, any device capable of taking images or photographs is possible.

Figure 34:
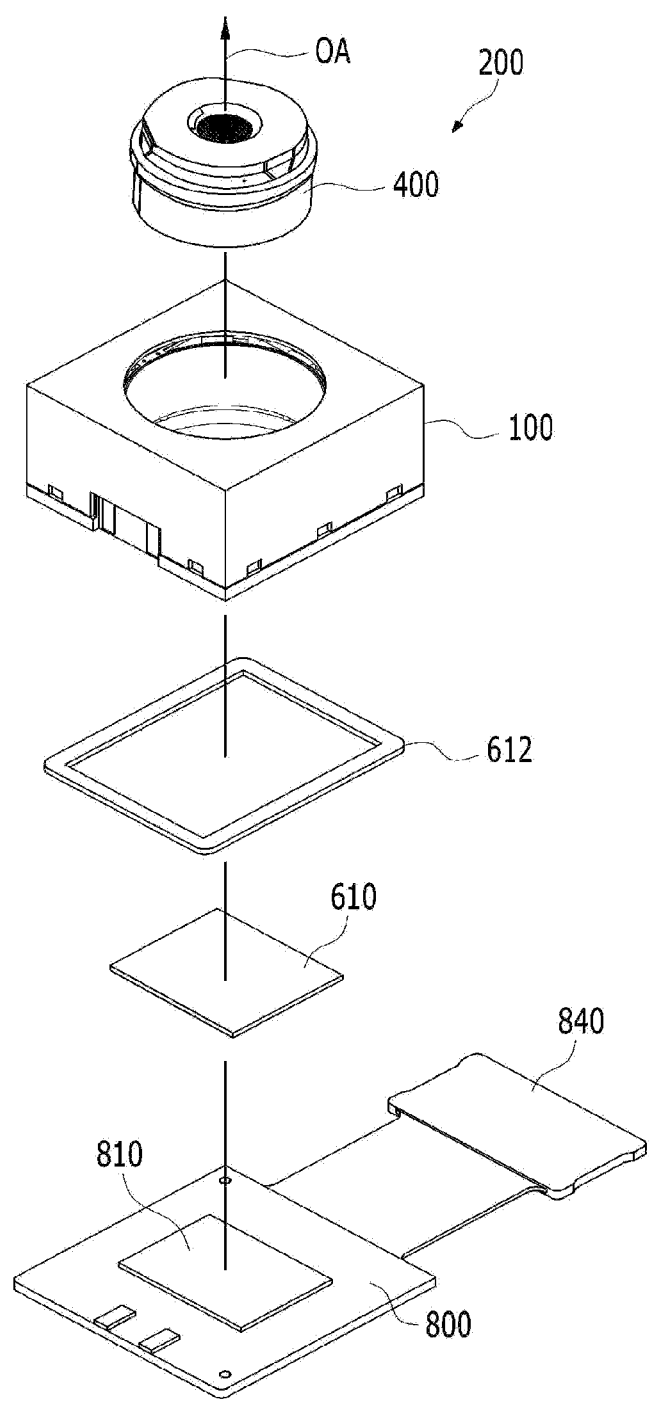
FIG. 34 is an exploded perspective view illustrating a camera module according to an embodiment.

FIG. 34 is an exploded perspective view illustrating a camera module 200 according to an embodiment.

Referring to FIG. 34, the camera module 200 may include a lens or a lens module 400, the lens moving apparatus 100, an adhesive member 612, a filter 610, a circuit board 800, an image sensor 810, and a connector 840.

The lens module 400 may include a lens and/or a lens barrel, and may be mounted in the bobbin 110 of the lens moving apparatus 100.

For example, the lens module 400 may include one or more lenses, and a lens barrel configured to accommodate the lenses. However, one component of the lens module is not limited to the lens barrel, and any component is possible as long as it has a holder structure capable of supporting one or more lenses. The lens module may be coupled to the lens moving apparatus 1000 and may be moved therewith.

For example, the lens module 400 may be coupled to the lens moving apparatus 100, 1000 through threaded engagement. For example, the lens module 400 may be coupled to the lens moving apparatus 100, 1000 by means of an adhesive (not shown). The light, which has passed through the lens module 400, may be radiated to the image sensor 810 through the filter 610.

The adhesive member 612 may couple or attach the base 210, 1400 of the lens moving apparatus 100, 1000 to the circuit board 800. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 of the lens moving apparatus 100.

For example, the base 210 may be provided on the lower surface thereof with a mount portion on which the filter 610 is mounted. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in light, which is introduced through the lens moving apparatus 100, 1000, and may convert the received image into an electric signal.

The image sensor 810 may be positioned such that the optical axis thereof is aligned with the optical axis of the lens module 400. Accordingly, the image sensor may obtain the light, which has passed through the lens module 400. The image sensor 810 may output the radiated light as an image. The image sensor 810 may be, for example, a CCD (charge coupled device), MOS (metal oxide semi-conductor), CPD or CID. However, the kind of the image sensor is not limited thereto.

The filter 610 and the image sensor 810 may be disposed so as to be spaced apart from each other in the state of facing each other in the first direction.

The connector 840 may be conductively connected to the circuit board 800, and may be have a port that is intended to be conductively connected to an external device.

Figure 35:
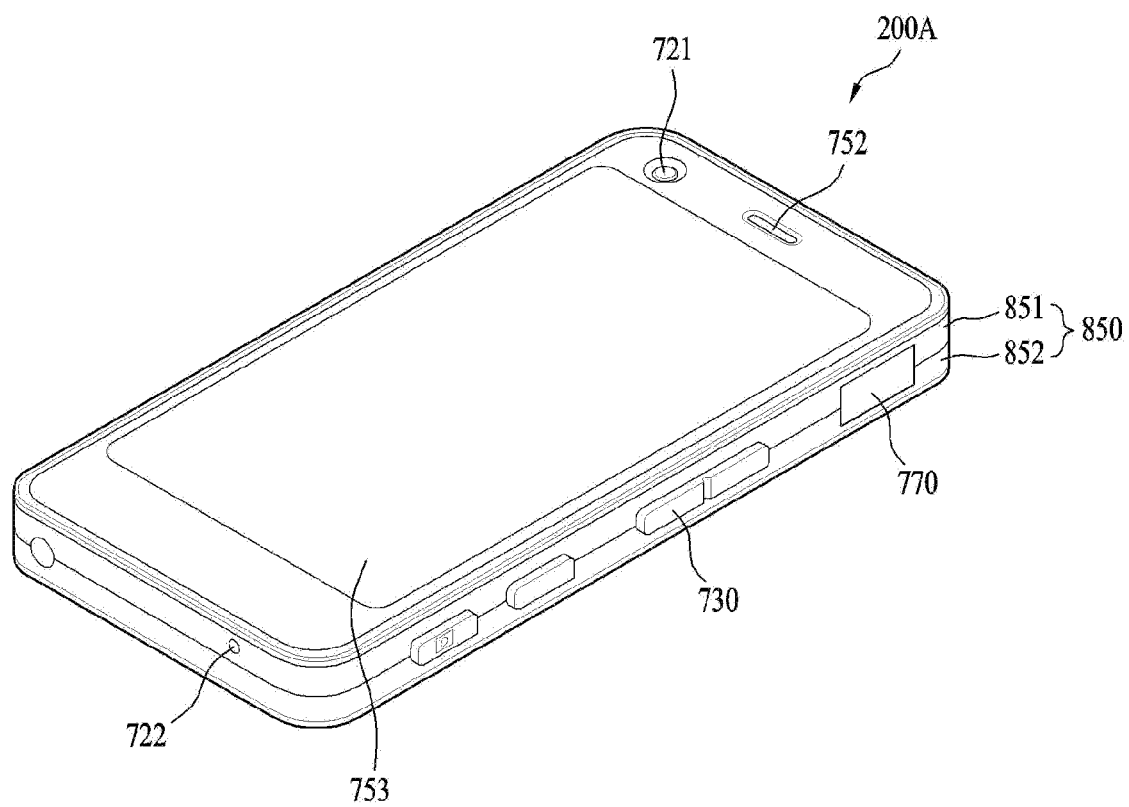
FIG. 35 is a perspective view of a portable terminal according to an embodiment.
Figure 36:
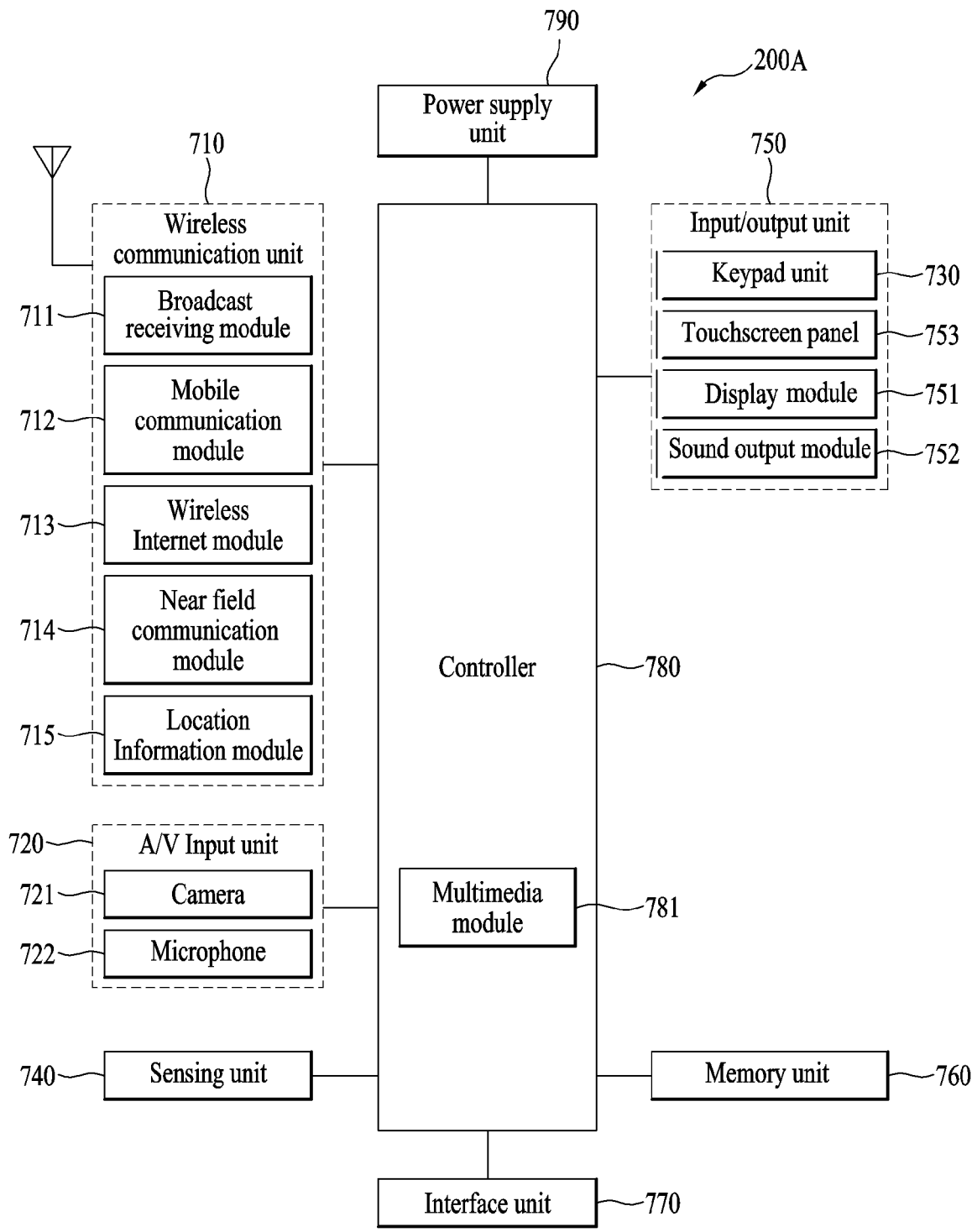
FIG. 36 is a view illustrating the configuration of the portable terminal illustrated in FIG. 35.

FIG. 35 is a perspective view illustrating a portable terminal 200A according to an embodiment. FIG. 36 is a view illustrating the configuration of the portable terminal 200A illustrated in FIG. 35.

Referring to FIGS. 35 and 36, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 35 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment shown in FIG. 34.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780 or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments are applicable to a lens moving apparatus capable of stably securing a magnet, simplifying the structure thereof and reducing the number of components, and a camera module and an optical device each including the same.

The invention claimed is:

1. A lens moving apparatus comprising:
   a base comprising:
      a body, the body including a first corner portion, a second corner portion, a third corner portion, and a fourth corner portion;
      a first post protruding from the first corner portion;
      a second post protruding from the second corner portion;
      a third post protruding from the third corner portion; and
      a fourth post protruding from the fourth corner portion;
   a bobbin disposed inside the first to fourth posts;
   a coil disposed on the bobbin;
   a magnet comprising a first magnet unit disposed on a first side portion of the body between the first post and the second post and a second magnet unit disposed on a second side portion of the body between the third post and the fourth post; and
   a lower elastic member coupled to a lower portion of the bobbin and to the base, the lower elastic member comprising first and second lower springs spaced apart from each other,
   wherein the magnet is not disposed on a third side portion of the body between the first and fourth posts and is not disposed on a fourth side portion of the body between the second and third posts,
   wherein the base comprises two first protrusions disposed on the third side portion of the body so as to be spaced apart from each other, and
   wherein each of the first and second lower springs comprises an inner frame coupled to the lower portion of the bobbin, an outer frame coupled to the base, and a frame connection portion connecting the inner frame and the outer frame, and
   wherein the first lower spring comprises:
      a first connection terminal bent from a first region of the outer frame of the first lower spring and disposed on an outer side surface of the third side portion of the body; and
      a first through hole disposed on the third side portion of the body and coupled to one of the two first protrusions, and
   wherein the second lower spring comprises:
      a second connection terminal bent from a second region of the outer frame of the second lower spring and disposed on the outer side surface of the third side portion of the body; and
      a second through hole disposed on the third side portion of the body and coupled to another one of the two first protrusions, and
   wherein the first through hole is disposed at the outer frame of the first lower spring and between the first region and the fourth post, and the second through hole is disposed at the outer frame of the second lower spring and between the second region and the first post.

2. The lens moving apparatus according to claim 1, wherein the base comprises a first projection positioned between the first and fourth posts and projecting from the body, and
   wherein the two first protrusions protrude from an upper surface of the first projection of the base.

3. The lens moving apparatus according to claim 2, wherein the base comprises a second projection positioned between the second and third posts and projecting from the body.

4. The lens moving apparatus according to claim 3, wherein the base comprises two second protrusions disposed on the second projection,
   wherein the first lower spring comprises a third through hole disposed on the fourth side portion of the body and coupled to the one of the two second protrusions, and
   wherein the second lower spring comprises a fourth through hole disposed on the fourth side portion of the body and coupled to another one of the two second protrusions.

5. The lens moving apparatus according to claim 1, comprising an upper elastic member coupled to the first to fourth posts.

6. The lens moving apparatus according to claim 1, wherein the coil is electrically connected to the first and second lower springs.

7. The lens moving apparatus according to claim 1, wherein one end of the coil is coupled to the inner frame of the first lower spring and another end of the coil is coupled to the inner frame of the second lower spring.

8. The lens moving apparatus according to claim 1, wherein the first and second connection terminals are positioned below the first and second through holes and the two first protrusions.

9. The lens moving apparatus according to claim 1, wherein the bobbin is configured to move in an optical axis direction by an interaction between the magnet and the coil, and
   wherein the coil has a ring shape surrounding an outer surface of the bobbin.

10. The lens moving apparatus according to claim 1, wherein the lower elastic member is disposed between the first magnet unit and the second magnet unit, and spaced apart from the magnet.

11. The lens moving apparatus according to claim 1, wherein one end of the first magnet unit is coupled to the first post and another end of the first magnet unit is coupled to the second post, and
wherein one end of the second magnet unit is coupled to the third post and another end of the second magnet unit is coupled to the fourth post.

12. The lens moving apparatus according to claim 1, wherein the base comprises:
a first stepped portion having a depth from an outer surface of the first side portion of the body, wherein the first stepped portion is positioned between the first post and the second post;
a second stepped portion having a depth from each of outer surfaces of the first and second posts;
a third stepped portion having a depth from an outer surface of the second side portion the body, wherein the third stepped portion is positioned between the third post and the fourth post; and
a fourth stepped portion having a depth from each of outer surfaces of the third and fourth posts,
wherein the first magnet unit is disposed in the first and second stepped portions, and the second magnet unit is disposed in the third and fourth stepped portions.

13. A camera module comprising:
a lens;
the lens moving apparatus according to claim 1; and
an image sensor.

14. The lens moving apparatus according to claim 1, wherein the first through hole of the lower elastic member does not overlap the magnet in a direction parallel to an optical axis.

15. The lens moving apparatus according to claim 1, wherein the first and second through holes of the lower elastic member do not overlap the magnet in a direction parallel to an optical axis.

16. The lens moving apparatus according to claim 1, wherein the two first protrusions are disposed between the first and fourth posts, and the first and second connection terminals are disposed on an outer surface of a region of the third side portion of the body positioned between the two first protrusions.

17. The lens moving apparatus according to claim 1, wherein the base comprises a guide protrusion disposed at the third side portion thereof, and disposed between the first region of the outer frame of the first lower spring and the second region of the outer frame of the second lower spring, and
wherein the outer frame of the first lower spring comprises a first extension extending toward the guide protrusion from the first region, and the outer frame of the second lower spring comprises a second extension extending toward the guide protrusion from the second region.

18. A lens moving apparatus comprising:
a base comprising:
a body including a first corner portion, a second corner portion, a third corner portion, and a fourth corner portion;
a first post protruding from the first corner portion;
a second post protruding from the second corner portion;
a third post protruding from the third corner portion; and
a fourth post protruding from the fourth corner portion;
a bobbin disposed inside the first to fourth posts;
a coil disposed on the bobbin;
a magnet comprising a first magnet unit disposed on a first side portion of the body between the first post and the second post and a second magnet unit disposed on a second side portion of the body between the third post and the fourth post; and
a lower elastic member coupled to a lower portion of the bobbin and to the base and comprising first and second lower springs spaced apart from each other,
wherein each of the first and second lower springs comprises an inner frame coupled to the lower portion of the bobbin, an outer frame coupled to the base, and a frame connection portion connecting the inner frame and the outer frame,
wherein the outer frame of the first lower spring comprises a first through hole disposed between the first and fourth posts and a second through hole disposed between the second and third posts and the outer frame of the second lower spring comprises a third through hole disposed between the first and fourth posts and a fourth through hole disposed between the second and third posts,
wherein the magnet is not disposed on a third side portion of the body between the first and fourth posts and is not disposed on a fourth side portion of the body between the second and third posts, and
wherein the base comprises:
two first protrusions disposed between the first and fourth posts and coupled to the first and third through holes of the outer frames of the first and second lower springs; and
two second protrusions disposed between the second and third posts and coupled to the second and fourth through holes of the outer frames of the first and second lower springs,
wherein the first lower spring comprises a first connection terminal bent from a first region of the outer frame of the first lower spring and disposed on an outer side surface of the third side portion of the body and the second lower spring comprises a second connection terminal bent from a second region of the outer frame of the second lower spring and disposed on the outer side surface of the third side portion of the body, and
wherein the first through hole is disposed at the outer frame of the first lower spring and between the first region and the fourth post, and the third through hole is disposed at the outer frame of the second lower spring and between the second region and the first post.

19. The lens moving apparatus according to claim 18, wherein the first to fourth through holes of the lower elastic member do not overlap the magnet in a direction parallel to an optical axis.

* * * * *